US011228891B2

United States Patent
King-Berkman et al.

(10) Patent No.: US 11,228,891 B2
(45) Date of Patent: Jan. 18, 2022

(54) SYSTEMS AND METHODS FOR EMERGENCY MEDICAL COMMUNICATIONS

(71) Applicant: RapidSOS, Inc., New York, NY (US)

(72) Inventors: Hirsch Meir King-Berkman, New City, NY (US); Tiana Pidgeon, New York, NY (US); Michael John Martin, Long Island City, NY (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 16/920,394

(22) Filed: Jul. 2, 2020

(65) Prior Publication Data

US 2021/0006961 A1 Jan. 7, 2021

Related U.S. Application Data

(60) Provisional application No. 62/870,255, filed on Jul. 3, 2019.

(51) Int. Cl.
*H04M 11/04* (2006.01)
*H04W 4/90* (2018.01)
(Continued)

(52) U.S. Cl.
CPC ............ *H04W 4/90* (2018.02); *H04W 4/022* (2013.01); *H04W 76/50* (2018.02)

(58) Field of Classification Search
None
See application file for complete search history.

(56) References Cited

U.S. PATENT DOCUMENTS 5,379,337 A  1/1995 Castillo et al.
5,563,931 A  10/1996 Bishop et al.
(Continued)

FOREIGN PATENT DOCUMENTS

CA  2662606 A1  10/2009
CA  2697986 A1  9/2010
(Continued)

OTHER PUBLICATIONS

Abel et al. Semantics + Filtering + Search = Twitcident exploring information in social web streams. HT'12—Proceedings of 23rd ACM Conference on Hypertext and Social Media (10 pgs) (Jun. 25-28, 2012).
(Continued)

*Primary Examiner* — Gary Lafontant
(74) *Attorney, Agent, or Firm* — Wilson Sonsini Goodrich & Rosati

(57) ABSTRACT

Described herein are systems, devices, methods, and media for connecting a user for providing emergency response assistance to victims and emergency service providers. In some embodiments, a method for automatically populating an incident report includes the steps of: generating a victim code for display at a first electronic device; receiving an emergency data request comprising the victim code from a second electronic device associated with an emergency service provider (ESP) personnel; gathering emergency data associated with the victim code; transmitting the emergency data associated with the victim code to the second electronic device associated with the ESP personnel; and automatically populating, at the second electronic device associated with the ESP personnel, one or more fields of an incident report using the emergency data associated with the victim code.

20 Claims, 14 Drawing Sheets

(51) Int. Cl.
*H04W 76/50* (2018.01)
*H04W 4/021* (2018.01)

(56) References Cited

U.S. PATENT DOCUMENTS

| | | | |
|---|---|---|---|
| 6,014,555 A | 1/2000 | Tendler |
| 6,133,853 A | 10/2000 | Obradovich et al. |
| 6,249,674 B1 | 6/2001 | Verdonk |
| 6,256,489 B1 | 7/2001 | Lichter et al. |
| 6,363,138 B1 | 3/2002 | Aprile |
| 6,459,782 B1 | 10/2002 | Bedrosian et al. |
| 6,477,362 B1 | 11/2002 | Raith et al. |
| 6,510,315 B1 | 1/2003 | Arnson |
| 6,556,816 B1 | 4/2003 | Gafrick et al. |
| 6,571,092 B2 | 5/2003 | Faccin et al. |
| 6,574,323 B1 | 6/2003 | Manuel et al. |
| 6,587,545 B1 | 7/2003 | Antonucci et al. |
| 6,600,812 B1 | 7/2003 | Gentillin et al. |
| 6,628,933 B1 | 9/2003 | Humes |
| 6,680,998 B1 | 1/2004 | Bell et al. |
| 6,707,421 B1 | 3/2004 | Drury et al. |
| 6,731,610 B2 | 5/2004 | Sajikawa et al. |
| 6,993,118 B2 | 1/2006 | Antonucci et al. |
| 7,054,611 B2 | 5/2006 | Eisner et al. |
| 7,058,385 B2 | 6/2006 | Lauper |
| 7,177,400 B2 | 2/2007 | Eisner et al. |
| 7,224,773 B2 | 5/2007 | Croak et al. |
| 7,271,704 B2 | 9/2007 | McSheffrey et al. |
| 7,313,402 B1 | 12/2007 | Rahman |
| 7,324,801 B2 | 1/2008 | Droste et al. |
| 7,409,044 B2 | 8/2008 | Leduc |
| 7,436,938 B2 | 10/2008 | Savaglio et al. |
| 7,437,143 B1 | 10/2008 | Williams |
| 7,519,351 B2 | 4/2009 | Malone, III et al. |
| 7,565,131 B2 | 7/2009 | Rollender |
| 7,676,215 B2 | 3/2010 | Chin et al. |
| 7,848,733 B2 | 12/2010 | Bull et al. |
| 7,937,067 B2 | 5/2011 | Maier et al. |
| 7,949,326 B2 | 5/2011 | Gallagher et al. |
| 8,009,810 B2 | 8/2011 | Seidberg et al. |
| 8,041,335 B2 | 10/2011 | Khetawat et al. |
| 8,041,341 B1 | 10/2011 | Malackowski et al. |
| 8,045,954 B2 | 10/2011 | Barbeau et al. |
| 8,102,972 B2 | 1/2012 | Poremba |
| 8,244,205 B2 | 8/2012 | Wu |
| 8,249,546 B1 | 8/2012 | Shah et al. |
| 8,289,953 B2 | 10/2012 | Ray et al. |
| 8,306,501 B2 | 11/2012 | Moodbidri et al. |
| 8,326,260 B1 | 12/2012 | Bradish et al. |
| 8,369,488 B2 | 2/2013 | Sennett et al. |
| 8,396,970 B2 | 3/2013 | Black et al. |
| 8,401,565 B2 | 3/2013 | Sandberg et al. |
| 8,417,090 B2 | 4/2013 | Fleming |
| 8,417,212 B2 | 4/2013 | Cepuran et al. |
| 8,442,481 B2 | 5/2013 | Maier et al. |
| 8,442,482 B2 | 5/2013 | Maier et al. |
| 8,509,729 B2 | 8/2013 | Shaw |
| 8,516,122 B2 | 8/2013 | Piett et al. |
| 8,625,578 B2 | 1/2014 | Roy et al. |
| 8,644,301 B2 | 2/2014 | Tamhankar et al. |
| 8,682,279 B2 | 3/2014 | Rudolf et al. |
| 8,682,281 B2 | 3/2014 | Dunn et al. |
| 8,755,767 B2 | 6/2014 | Maier et al. |
| 8,811,935 B2 | 8/2014 | Faccin et al. |
| 8,918,075 B2 | 12/2014 | Maier et al. |
| 9,014,657 B2 | 4/2015 | Rohde et al. |
| 9,078,092 B2 | 7/2015 | Piett et al. |
| 9,094,816 B2 | 7/2015 | Maier et al. |
| 9,402,159 B1 | 7/2016 | Self et al. |
| 9,408,051 B2 | 8/2016 | Finney et al. |
| 9,420,099 B1 | 8/2016 | Krishnan et al. |
| 9,544,750 B1 | 1/2017 | Self et al. |
| 9,635,534 B2 | 4/2017 | Maier et al. |
| 9,693,213 B2 | 6/2017 | Self et al. |
| 9,736,670 B2 | 8/2017 | Mehta et al. |
| 10,002,375 B1 | 6/2018 | Scythes et al. |
| 10,142,213 B1 | 11/2018 | Hart et al. |
| 10,142,469 B2 | 11/2018 | Klaban |
| 10,701,542 B2 | 6/2020 | Martin et al. |
| 2001/0051849 A1 | 12/2001 | Boone |
| 2004/0203572 A1 | 10/2004 | Aerrabotu et al. |
| 2004/0229620 A1 | 11/2004 | Zhao et al. |
| 2005/0190892 A1 | 9/2005 | Dawson et al. |
| 2005/0285181 A1 | 12/2005 | Yasui et al. |
| 2006/0085275 A1 | 4/2006 | Stokes et al. |
| 2006/0109960 A1 | 5/2006 | D'Evelyn et al. |
| 2006/0293024 A1 | 12/2006 | Benco et al. |
| 2007/0003024 A1 | 1/2007 | Olivier et al. |
| 2008/0081646 A1 | 4/2008 | Morin et al. |
| 2009/0134982 A1 | 5/2009 | Robertson et al. |
| 2009/0186596 A1 | 7/2009 | Kaltsukis |
| 2009/0214000 A1 | 8/2009 | Patel et al. |
| 2010/0093305 A1 | 4/2010 | Reich et al. |
| 2010/0190468 A1* | 7/2010 | Scott ............... H04M 1/72457 455/404.2 |
| 2011/0029600 A1 | 2/2011 | Theimer |
| 2011/0071880 A1 | 3/2011 | Spector |
| 2011/0086607 A1 | 4/2011 | Wang et al. |
| 2012/0002792 A1 | 1/2012 | Chang |
| 2012/0040636 A1 | 2/2012 | Kazmi |
| 2012/0256745 A1 | 10/2012 | Piett et al. |
| 2013/0052983 A1 | 2/2013 | Fletcher et al. |
| 2013/0065569 A1 | 3/2013 | Leipzig et al. |
| 2013/0072144 A1 | 3/2013 | Berger et al. |
| 2013/0084824 A1 | 4/2013 | Hursey |
| 2013/0102351 A1 | 4/2013 | Mo |
| 2013/0203373 A1 | 8/2013 | Edge |
| 2013/0226369 A1 | 8/2013 | Yorio et al. |
| 2013/0260710 A1 | 10/2013 | Hr |
| 2013/0309994 A1 | 11/2013 | Hellwig et al. |
| 2014/0142979 A1 | 5/2014 | Mitsunaga |
| 2014/0155017 A1 | 6/2014 | Fan et al. |
| 2014/0164505 A1 | 6/2014 | Daly et al. |
| 2014/0359008 A1 | 12/2014 | Finney et al. |
| 2015/0085997 A1 | 3/2015 | Biage et al. |
| 2015/0099481 A1 | 4/2015 | Maitre et al. |
| 2016/0173689 A1 | 6/2016 | Klaban |
| 2016/0210581 A1 | 7/2016 | Braun |
| 2016/0316493 A1 | 10/2016 | Davis et al. |
| 2016/0353266 A1 | 12/2016 | Winkler et al. |
| 2017/0012815 A1 | 1/2017 | Nekrestyanov et al. |
| 2017/0099579 A1 | 4/2017 | Ryan et al. |
| 2017/0124670 A1 | 5/2017 | Becker et al. |
| 2017/0150335 A1 | 5/2017 | Self et al. |
| 2017/0161614 A1 | 6/2017 | Mehta et al. |
| 2017/0238129 A1 | 8/2017 | Maier et al. |
| 2017/0287085 A1 | 10/2017 | Smith et al. |
| 2017/0310827 A1 | 10/2017 | Mehta et al. |
| 2017/0359712 A1 | 12/2017 | Meredith et al. |
| 2018/0020091 A1 | 1/2018 | Self et al. |
| 2018/0160267 A1 | 6/2018 | Immendorf et al. |
| 2018/0352408 A1 | 12/2018 | Baer et al. |
| 2019/0020993 A1 | 1/2019 | Nguyen |
| 2019/0130719 A1 | 5/2019 | D'Amico |
| 2019/0166480 A1 | 5/2019 | Rauner |
| 2019/0253861 A1 | 8/2019 | Horelik et al. |
| 2019/0306664 A1 | 10/2019 | Mehta et al. |
| 2019/0320310 A1 | 10/2019 | Horelik et al. |
| 2019/0380020 A1 | 12/2019 | Pellegrini et al. |
| 2020/0100084 A1 | 3/2020 | Martin et al. |
| 2020/0126174 A1 | 4/2020 | Halse et al. |
| 2020/0314240 A1 | 10/2020 | Leavitt et al. |
| 2020/0314623 A1 | 10/2020 | Pellegrini et al. |
| 2021/0037368 A1 | 2/2021 | Leavitt et al. |

FOREIGN PATENT DOCUMENTS

| | | | |
|---|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CA | 2697986 C | 5/2018 |

(56) References Cited

FOREIGN PATENT DOCUMENTS

| | | | | |
|---|---|---|---|---|
| CN | 106021508 A | 10/2016 | | |
| KR | 20140093568 A | 7/2014 | | |
| KR | 101612423 B1 | 4/2016 | | |
| KR | 20170100422 A | 9/2017 | | |
| WO | WO-0022593 A1 | 4/2000 | | |
| WO | WO-0165763 A2 | 9/2001 | | |
| WO | WO-0167419 A2 | 9/2001 | | |
| WO | WO-2004057853 A2 * | 7/2004 | ........ | H04M 3/42042 |
| WO | WO-2007109599 A2 | 12/2007 | | |
| WO | WO-2014063121 A1 | 4/2014 | | |
| WO | WO-2014074420 A1 | 5/2014 | | |
| WO | WO-2015196155 A1 | 12/2015 | | |
| WO | WO-2017083571 A1 | 5/2017 | | |
| WO | WO-2019113129 A1 | 6/2019 | | |
| WO | WO-2020172612 A1 | 8/2020 | | |
| WO | WO-2020205033 A1 | 10/2020 | | |

OTHER PUBLICATIONS

Chowdhury et al. Tweet4act: Using incident-specific profiles for classifying crisis-related messages. Proceedings of the 10th International ISCRAM Conference (pp. 834-839) (2013).

Homeland Security Science and Technology. Using Social Media for Enhanced Situational Awareness and Decision Support. Virtual Social Medial Working Group and DHS First Responders Group. (44 pgs.) (Jun. 2014).

Marcus et al. TwitInfo: Aggregating and Visualizing Microblogs for Event Exploration. ACM CHI Conference May 7-12, 2011, 2011 (10 pgs).

Meier. MatchApp: Next Generation Disaster Response App? iRevolution (12 pgs.) (Feb. 27, 2013).

National Emergency Number Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (May 8, 2012).

PCT/US2018/063935 International Search Report and Written Opinion dated Mar. 22, 2019.

PCT/US2019/027538 International Search Report and Written Opinion dated Aug. 2, 2019.

PCT/US2020/013176 International Search Report and Written Opinion dated May 8, 2020.

Song. Next Generation Emergency Call System with Enhanced Indoor Positioning, Columbia University. Thesis [online] [retrieved Apr. 20, 2020 from<url:https://scholar.google.co.kr/citations/?user=h_4uUqAAAAAJ&hl=ko (156 pgs) (2014)</url:<a>.

U.S. Appl. No. 16/209,892 Office Action dated Feb. 8, 2019.
U.S. Appl. No. 16/271,634 Office Action dated Dec. 16, 2019.
U.S. Appl. No. 16/271,634 Office Action dated Jun. 13, 2019.
U.S. Appl. No. 16/384,600 Office Action dated Apr. 2, 2020.
U.S. Appl. No. 16/436,810 Office Action dated Aug. 9, 2019.
U.S. Appl. No. 16/436,810 Office Action dated Dec. 17, 2019.
U.S. Appl. No. 16/740,207 Office Action dated Aug. 17, 2020.
U.S. Appl. No. 16/740,207 Office Action dated Mar. 11, 2020.
U.S. Appl. No. 16/384,600 Office Action dated Oct. 2, 2020.
PCT/US2019/036403 International Search Report and Written Opinion dated Oct. 4, 2019.
U.S. Appl. No. 16/378,363 Office Action dated Feb. 17, 2021.
U.S. Appl. No. 16/684,366 Office Action dated Dec. 23, 2020 .
U.S. Appl. No. 16/834,914 Office Action dated Dec. 2, 2020 .

* cited by examiner

Nick Of Time 1101

1187B

1105     Log Out

Search 1187A    Clear

Care Provider: Charles Messier, MD

Medical Information 1118A

| Medical Info | |
|---|---|
| Allergies | Nuts, eggs |
| Birthday | 1972-5-1 |
| Blood Type | A+ |
| Disabilities | Mute |
| Gender | Male |
| Height | 75 inches |
| Medical Conditions | Heart murmur, Asthma |
| Medical Notes | Has had open heart surgery |

Contact Information 1118B

| Contact #1 | Debbie Jones |
|---|---|
| Relationship | Mother |
| Phone Number | 15884443232 |
| Contact #2 | Jerry Jones |
| Relationship | Father |
| Phone Number | 15884445656 |

All Patients
Children's Hospital

- Nga To 1112A
  1/23/19 at 4:07PM
- James Jones 1112B
  1/23/19 at 3:59PM
- Bryan Corn 1112C
  1/23/19 at 3:54PM
- Carissa Phoel 1112D
  1/23/19 at 3:49PM
- Ivan Ng 1112E
  1/23/19 at 3:45PM

SYSTEMS AND METHODS FOR EMERGENCY MEDICAL COMMUNICATIONS

CROSS-REFERENCE

This application claims the benefit of U.S. Provisional Application No. 62/870,255, filed Jul. 3, 2019, which is hereby incorporated herein by reference.

BACKGROUND OF THE INVENTION

A person in an emergency situation may request help using a mobile communication device such as a cell phone to dial a designated emergency number like 9-1-1 or a direct access phone number for the local emergency service provider (e.g., an emergency dispatch center). This call is assigned to one or more first responders by the emergency service provider. However, these communications are typically limited to audio calls with narrow functionality since most emergency service providers that receive emergency calls currently lack the capacity for more sophisticated communications. When emergency responders (e.g., first responders) arrive at the scene of an emergency, they often have little or no information about the person in the emergency.

SUMMARY OF THE INVENTION

One advantage provided by the systems, servers, devices, methods, and media of the instant application is the ability to provide a victim code (e.g., a unique identifier) that can be used to identify a person in an emergency (hereinafter, "victim"). It is contemplated that a victim code can be provided in numerous forms, such as in the form of an alphanumeric or QR code, for example. In some embodiments, the victim code can be displayed on a first electronic device (e.g., the victim's electronic device) and scanned by, or otherwise inputted into, a second electronic device (e.g., a bystander's or first responder's electronic device). When the victim code is inputted into the second electronic device, the second electronic device is prompted to transmit an electronic notification including the victim code to an emergency management system (EMS), which can then use the victim code to identify the victim in order to provide emergency assistance. In some embodiments, an emergency responder (e.g., a first responder) can use a victim code to identify a victim and receive emergency information regarding the victim from an emergency management system (EMS). Similarly, in some embodiments, a victim code can be used by the EMS to determine the proper emergency responder to provide emergency information regarding a victim to.

Another advantage provided by the systems, servers, devices, methods, and media of the instant application is the ability to use a victim's location and medical insurance information to determine preferred medical service providers (e.g., hospitals covered by the victim's medical insurance) proximal to the victim's location. Information regarding the preferred medical service providers proximal to the victim's location (e.g., locations of or directions to the preferred medical service providers) can then be sent to one or more recipients, such as the victim or a first responder providing care to the victim. The information regarding the preferred medical service providers can then be used to route the victim to the most optimal medical service provider for the victim during an emergency.

Another advantage provided by the systems, servers, devices, methods, and media of the instant application is the ability to provide emergency information regarding a victim to an emergency service provider (ESP) or emergency responder (e.g., a first responder) and use the emergency information to automatically populate one or more fields of an incident report associated with the victim. In some embodiments, the emergency information regarding a victim is used to automatically populate one or more fields of an electronic patient care report (ePCR) when a first responder is providing care to the victim, potentially saving the first responder critical time in which the first responder could be providing care to the victim instead of filling out the ePCR. In some embodiments, an emergency management system (EMS) transmits emergency information regarding a victim to a first responder's electronic device after the first responder uses their device to input a victim code associated with the victim.

In one aspect, disclosed herein is an emergency communication system comprising: (a) an emergency information database comprising a plurality of datasets associated with a plurality of user identifiers; (b) a server comprising a processor, a network element, and non-transitory computer readable storage medium having instructions that, when executed by the processor, cause the processor to: (i) receive a communication signal comprising a data request from an emergency responder communication device, wherein the emergency data request comprises a user identifier and an emergency location; (ii) query the emergency information database to retrieve a dataset associated with the user identifier, wherein the dataset comprises one or more emergency response parameters; (iii) determine, using the emergency location and the one or more emergency response parameters, one or more medical service providers having one or more provider locations in proximity to the emergency location; and (iv) transmit a communication signal comprising the one or more provider locations associated with the one or more medical service providers to the emergency responder communication device. In some embodiments, the emergency location is a device location for a second communication device associated with the user identifier, wherein the server is configured to receive the device location for the second communication device and determine the one or more medical providers having one or more provider locations in proximity to the device location. In some embodiments, the communication signal comprising the one or more provider locations further comprises a map showing the one or more provider locations, the emergency location, and an estimated time to arrival or distance based on the one or more provider locations and the emergency location. In some embodiments, the emergency location is provided to the communication device as a dispatch location. In some embodiments, the emergency location is a current location of a second communication device provided to the emergency responder communication device as a dispatch location after the emergency responder communication device scans a victim code presented on the display of the second communication device, wherein the second communication device is associated with the user identifier. In some embodiments, the data request comprises at least two user identifiers. In some embodiments, the processor is further caused to transmit the one or more provider locations to the emergency responder communication device within one or more SMS text messages. In some embodiments, processor is further caused to receive the communication signal comprising the data request as generated by a mobile application or web application on the emergency responder communication device. In some embodiments, the mobile or web application is an electronic patient care report (ePCR) application. In some embodiments, the one or more provider locations are provided to the emergency responder communication device for display within a graphical user interface (GUI) of the mobile or web application on the emergency responder communication device. In some embodiments, the one or more provider locations are provided to the emergency responder communication display for display within an interactive map within the GUI of the mobile or web application. In some embodiments, the user identifier received from the emergency responder communication device is associated with a victim code presented on a display of a second communication for scanning by the emergency responder communication device. In some embodiments, the processor is further configured to provide the victim code for display by the second communication device. In some embodiments, the victim code is locally stored on the second communication device. In some embodiments, the processor is further caused to generate the victim code in response to receiving an emergency alert from the second communication device. In some embodiments, the emergency communications system receives the emergency alert after the emergency alert is generated in response to a user accessing a medical ID screen on the second communication device. In some embodiments, the victim code is presented on the display of the second communication device in the form of a matrix barcode. In some embodiments, the one or more medical service providers associated with one or more respective provider locations proximal to the device location is determined by: (a) retrieving a list of medical service providers and filtering the list of medical service providers using the device location and the one or more emergency parameters associated with the user identifier to identify one or more medical service providers suitable for addressing an emergency; and (b) calculating a distance from the device location to the provider location for each of the medical service providers on the list of medical service providers preferred under the medical insurance information associated with the user identifier. In some embodiments, the one or more emergency response parameters comprise medical insurance information associated with the user identifier.

In another aspect, disclosed herein is a computer-implemented method comprising: (a) providing an emergency information database comprising a plurality of datasets associated with a plurality of user identifiers; (b) receiving a communication signal comprising a data request from an emergency responder communication device, wherein the emergency data request comprises a user identifier and an emergency location; (c) querying the emergency information database to retrieve a dataset associated with the user identifier, wherein the dataset comprises one or more emergency response parameters; (d) determining, using the emergency location and the one or more emergency response parameters, one or more medical service providers having one or more provider locations in proximity to the emergency location; and (e) transmitting a communication signal comprising the one or more provider locations associated with the one or more medical service providers to the emergency responder communication device. In some embodiments, the emergency location is a device location for a second communication device associated with the user identifier, wherein the server is configured to receive the device location for the second communication device and determine the one or more medical providers having one or more provider locations in proximity to the device location.

In some embodiments, the communication signal comprising the one or more provider locations further comprises a map showing the one or more provider locations, the emergency location, and an estimated time to arrival or distance based on the one or more provider locations and the emergency location. In some embodiments, the emergency location is provided to the communication device as a dispatch location. In some embodiments, the emergency location is a current location of a second communication device provided to the emergency responder communication device as a dispatch location after the emergency responder communication device scans a victim code presented on the display of the second communication device, wherein the second communication device is associated with the user identifier. In some embodiments, the data request comprises at least two user identifiers. In some embodiments, the processor is further caused to transmit the one or more provider locations to the emergency responder communication device within one or more SMS text messages. In some embodiments, processor is further caused to receive the communication signal comprising the data request as generated by a mobile application or web application on the emergency responder communication device. In some embodiments, the mobile or web application is an electronic patient care report (ePCR) application. In some embodiments, the one or more provider locations are provided to the emergency responder communication device for display within a graphical user interface (GUI) of the mobile or web application on the emergency responder communication device. In some embodiments, the one or more provider locations are provided to the emergency responder communication display for display within an interactive map within the GUI of the mobile or web application. In some embodiments, the user identifier received from the emergency responder communication device is associated with a victim code presented on a display of a second communication for scanning by the emergency responder communication device. In some embodiments, the processor is further configured to provide the victim code for display by the second communication device. In some embodiments, the victim code is locally stored on the second communication device. In some embodiments, the processor is further caused to generate the victim code in response to receiving an emergency alert from the second communication device. In some embodiments, the emergency communications system receives the emergency alert after the emergency alert is generated in response to a user accessing a medical ID screen on the second communication device. In some embodiments, the victim code is presented on the display of the second communication device in the form of a matrix barcode. In some embodiments, the one or more medical service providers associated with one or more respective provider locations proximal to the device location is determined by: (a) retrieving a list of medical service providers and filtering the list of medical service providers using the device location and the one or more emergency parameters associated with the user identifier to identify one or more medical service providers suitable for addressing an emergency; and (b) calculating a distance from the device location to the provider location for each of the medical service providers on the list of medical service providers preferred under the medical insurance information associated with the user identifier. In some embodiments, the one or more emergency response parameters comprise medical insurance information associated with the user identifier.

In another aspect, disclosed herein is non-transitory computer readable storage medium comprising instructions that, when executed by a processor, cause the processor to: (a) maintain an emergency information database comprising a plurality of datasets associated with a plurality of user identifiers; (b) receive a communication signal comprising a data request from an emergency responder communication device, wherein the emergency data request comprises a user identifier and an emergency location; (c) query the emergency information database to retrieve a dataset associated with the user identifier, wherein the dataset comprises one or more emergency response parameters; (d) determine, using the emergency location and the one or more emergency response parameters, one or more medical service providers having one or more provider locations in proximity to the emergency location; and (e) transmit a communication signal comprising the one or more provider locations associated with the one or more medical service providers to the emergency responder communication device. In some embodiments, the emergency location is a device location for a second communication device associated with the user identifier, wherein the server is configured to receive the device location for the second communication device and determine the one or more medical providers having one or more provider locations in proximity to the device location. In some embodiments, the communication signal comprising the one or more provider locations further comprises a map showing the one or more provider locations, the emergency location, and an estimated time to arrival or distance based on the one or more provider locations and the emergency location. In some embodiments, the emergency location is provided to the communication device as a dispatch location. In some embodiments, the emergency location is a current location of a second communication device provided to the emergency responder communication device as a dispatch location after the emergency responder communication device scans a victim code presented on the display of the second communication device, wherein the second communication device is associated with the user identifier. In some embodiments, the data request comprises at least two user identifiers. In some embodiments, the processor is further caused to transmit the one or more provider locations to the emergency responder communication device within one or more SMS text messages. In some embodiments, processor is further caused to receive the communication signal comprising the data request as generated by a mobile application or web application on the emergency responder communication device. In some embodiments, the mobile or web application is an electronic patient care report (ePCR) application. In some embodiments, the one or more provider locations are provided to the emergency responder communication device for display within a graphical user interface (GUI) of the mobile or web application on the emergency responder communication device. In some embodiments, the one or more provider locations are provided to the emergency responder communication display for display within an interactive map within the GUI of the mobile or web application. In some embodiments, the user identifier received from the emergency responder communication device is associated with a victim code presented on a display of a second communication for scanning by the emergency responder communication device. In some embodiments, the processor is further configured to provide the victim code for display by the second communication device. In some embodiments, the victim code is locally stored on the second communication device. In some embodiments, the processor is further caused to generate the victim code in response to receiving an emergency alert from the second communication device. In some embodiments, the emergency communications system receives the emergency alert after the emergency alert is generated in response to a user accessing a medical ID screen on the second communication device. In some embodiments, the victim code is presented on the display of the second communication device in the form of a matrix barcode. In some embodiments, the one or more medical service providers associated with one or more respective provider locations proximal to the device location is determined by: (a) retrieving a list of medical service providers and filtering the list of medical service providers using the device location and the one or more emergency parameters associated with the user identifier to identify one or more medical service providers suitable for addressing an emergency; and (b) calculating a distance from the device location to the provider location for each of the medical service providers on the list of medical service providers preferred under the medical insurance information associated with the user identifier. In some embodiments, the one or more emergency response parameters comprise medical insurance information associated with the user identifier.

In another aspect, disclosed herein is a method for providing medical assistance, the method comprising: (a) receiving a medical data request from a first electronic device, wherein the emergency data request comprises a user identifier and an emergency location; (b) retrieving medical insurance information associated with the user identifier; (c) determining, using the emergency location and the medical insurance information associated with the user identifier, one or more preferred medical service providers associated with one or more provider locations proximal to the emergency location; and (d) transmitting the one or more provider locations associated with the one or more preferred medical service providers to the first electronic device for providing medical assistance. In some embodiments, the emergency location is a device location of the first electronic device. In some embodiments, the emergency location is a device location of a second electronic device associated with the user identifier, wherein the server is configured to receive the device location of the second electronic device and determine the one or more preferred medical providers having one or more provider locations in proximity to the device location. In some embodiments, the emergency location is provided to the first electronic device as a dispatch location. In some embodiments, the emergency location is a current location of a second electronic device and provided to the first electronic device as a dispatch location, wherein the second electronic device generates the emergency location in response to scanning a victim code presented on the display of a second electronic device associated with the user identifier. In some embodiments, the emergency location is a current location of a second communication device provided to the emergency responder communication device as a dispatch location after the emergency responder communication device scans a victim code presented on a display of the second communication device, wherein the second communication device is associated with the user identifier In some embodiments, the user identifier comprises one or more of a phone number, a name, a date of birth, a social security number, a driver's license number, a patient or medical ID, medical insurance ID, and medical insurance group ID. In some embodiments, the one or more provider locations are transmitted to the first electronic device within one or more SMS text messages. In some embodiments, the medical data request is generated by a mobile application or web application on the first electronic device. In some embodiments, the communication signal comprising the data request is received from a mobile application or web application on the emergency responder communication device. In some embodiments, the mobile or web application is an electronic patient care report (ePCR) application. In some embodiments, the method further comprises displaying the one or more provider locations within a graphical user interface (GUI) of the mobile or web application on the first electronic device. In some embodiments, the one or more provider locations are provided to the emergency responder communication device for display within a graphical user interface (GUI) of the mobile or web application on the emergency responder communication device. In some embodiments, the one or more provider locations are provided to the emergency responder communication device for display within a map within the GUI of the mobile or web application. In some embodiments, the first electronic device obtains the user identifier by scanning a victim code presented on the display of a second electronic device associated with the user identifier. In some embodiments, the user identifier received from the emergency responder communication device is associated with a victim code presented on a display of a second communication for scanning by the emergency responder communication device. In some embodiments, the method further comprises providing a victim code for display at the second electronic device. In some embodiments, the victim code is locally stored on the second electronic device. In some embodiments, the victim code is generated in response to receiving an emergency alert from the second electronic device. In some embodiments, the emergency alert is generated in response to a user accessing a medical ID screen on the second electronic device. In some embodiments, the victim code is presented on the display of the second electronic device in the form of a matrix barcode. In some embodiments, determining the one or more preferred medical service providers associated with one or more respective provider locations proximal to the emergency location comprises: (a) retrieving a list of medical service providers preferred under the medical insurance information associated with the user identifier, wherein each medical service provider on the list of medical service providers preferred under the medical insurance information associated with the user identifier is associated with a respective provider location; and (b) calculating a distance from the emergency location to the provider location for each of the medical service providers on the list of medical service providers preferred under the medical insurance information associated with the user identifier.

In another aspect, disclosed herein is an emergency communication system comprising: (a) an emergency information database comprising medical insurance information associated with a plurality of user identifiers; (b) a server comprising a processor, a network element, and non-transitory computer readable storage medium having instructions that, when executed by the processor, cause the processor to: (i) receive a medical data request from a first electronic device, wherein the emergency data request comprises a user identifier and an emergency location; (ii) retrieve medical insurance information associated with the user identifier; (iii) determine, using the emergency location and the medical insurance information associated with the user identifier, one or more preferred medical service providers associated with one or more provider locations proximal to the emergency location; and (iv) transmit the one or more provider locations associated with the one or more preferred medical service providers to the first electronic device for providing medical assistance. In some embodiments, the emergency location is a device location of the first electronic device. In some embodiments, the emergency location is a device location of a second electronic device associated with the user identifier, wherein the server is configured to receive the device location of the second electronic device and determine the one or more preferred medical providers having one or more provider locations in proximity to the device location. In some embodiments, the emergency location is provided to the first electronic device as a dispatch location. In some embodiments, the emergency location is a current location of a second electronic device and provided to the first electronic device as a dispatch location, wherein the second electronic device generates the emergency location in response to scanning a victim code presented on the display of a second electronic device associated with the user identifier. In some embodiments, the emergency location is a current location of a second communication device provided to the emergency responder communication device as a dispatch location after the emergency responder communication device scans a victim code presented on a display of the second communication device, wherein the second communication device is associated with the user identifier In some embodiments, the user identifier comprises one or more of a phone number, a name, a date of birth, a social security number, a driver's license number, a patient or medical ID, medical insurance ID, and medical insurance group ID. In some embodiments, the one or more provider locations are transmitted to the first electronic device within one or more SMS text messages. In some embodiments, the medical data request is generated by a mobile application or web application on the first electronic device. In some embodiments, the communication signal comprising the data request is received from a mobile application or web application on the emergency responder communication device. In some embodiments, the mobile or web application is an electronic patient care report (ePCR) application. In some embodiments, the processor is further caused to display the one or more provider locations within a graphical user interface (GUI) of the mobile or web application on the first electronic device. In some embodiments, the one or more provider locations are provided to the emergency responder communication device for display within a graphical user interface (GUI) of the mobile or web application on the emergency responder communication device. In some embodiments, the one or more provider locations are provided to the emergency responder communication device for display within a map within the GUI of the mobile or web application. In some embodiments, the first electronic device obtains the user identifier by scanning a victim code presented on the display of a second electronic device associated with the user identifier. In some embodiments, the user identifier received from the emergency responder communication device is associated with a victim code presented on a display of a second communication for scanning by the emergency responder communication device. In some embodiments, the processor is further caused to provide a victim code for display at the second electronic device. In some embodiments, the victim code is locally stored on the second electronic device. In some embodiments, the victim code is generated in response to receiving an emergency alert from the second electronic device. In some embodiments, the emergency alert is generated in response to a user accessing a medical ID screen on the second electronic device. In some embodiments, the victim code is presented on the display of the second electronic device in the form of a matrix barcode. In some embodiments, the one or more preferred medical service providers associated with one or more respective provider locations proximal to the emergency location is determined by: (a) retrieving a list of medical service providers preferred under the medical insurance information associated with the user identifier, wherein each medical service provider on the list of medical service providers preferred under the medical insurance information associated with the user identifier is associated with a respective provider location; and (b) calculating a distance from the emergency location to the provider location for each of the medical service providers on the list of medical service providers preferred under the medical insurance information associated with the user identifier.

In another aspect, disclosed herein is non-transitory computer readable storage medium comprising instructions that, when executed by a processor, cause the processor to: (a) receive a medical data request from a first electronic device, wherein the emergency data request comprises a user identifier and an emergency location; (b) retrieve medical insurance information associated with the user identifier; (c) determine, using the emergency location and the medical insurance information associated with the user identifier, one or more preferred medical service providers associated with one or more provider locations proximal to the emergency location; and (d) transmit the one or more provider locations associated with the one or more preferred medical service providers to the first electronic device for providing medical assistance. In some embodiments, the emergency location is a device location of the first electronic device. In some embodiments, the emergency location is a device location of a second electronic device associated with the user identifier, wherein the server is configured to receive the device location of the second electronic device and determine the one or more preferred medical providers having one or more provider locations in proximity to the device location. In some embodiments, the emergency location is provided to the first electronic device as a dispatch location. In some embodiments, the emergency location is a current location of a second electronic device and provided to the first electronic device as a dispatch location, wherein the second electronic device generates the emergency location in response to scanning a victim code presented on the display of a second electronic device associated with the user identifier. In some embodiments, the emergency location is a current location of a second communication device provided to the emergency responder communication device as a dispatch location after the emergency responder communication device scans a victim code presented on a display of the second communication device, wherein the second communication device is associated with the user identifier In some embodiments, the user identifier comprises one or more of a phone number, a name, a date of birth, a social security number, a driver's license number, a patient or medical ID, medical insurance ID, and medical insurance group ID. In some embodiments, the one or more provider locations are transmitted to the first electronic device within one or more SMS text messages. In some embodiments, the medical data request is generated by a mobile application or web application on the first electronic device. In some embodiments, the communication signal comprising the data request is received from a mobile application or web application on the emergency responder communication device. In some embodiments, the mobile or web application is an electronic patient care report (ePCR) application. In some embodiments, the processor is further caused to display the one or more provider locations within a graphical user interface (GUI) of the mobile or web application on the first electronic device. In some embodiments, the one or more provider locations are provided to the emergency responder communication device for display within a graphical user interface (GUI) of the mobile or web application on the emergency responder communication device. In some embodiments, the one or more provider locations are provided to the emergency responder communication device for display within a map within the GUI of the mobile or web application. In some embodiments, the first electronic device obtains the user identifier by scanning a victim code presented on the display of a second electronic device associated with the user identifier. In some embodiments, the user identifier received from the emergency responder communication device is associated with a victim code presented on a display of a second communication for scanning by the emergency responder communication device. In some embodiments, the processor is further caused to provide a victim code for display at the second electronic device. In some embodiments, the victim code is locally stored on the second electronic device. In some embodiments, the victim code is generated in response to receiving an emergency alert from the second electronic device. In some embodiments, the emergency alert is generated in response to a user accessing a medical ID screen on the second electronic device. In some embodiments, the victim code is presented on the display of the second electronic device in the form of a matrix barcode. In some embodiments, the one or more preferred medical service providers associated with one or more respective provider locations proximal to the emergency location is determined by: (a) retrieving a list of medical service providers preferred under the medical insurance information associated with the user identifier, wherein each medical service provider on the list of medical service providers preferred under the medical insurance information associated with the user identifier is associated with a respective provider location; and (b) calculating a distance from the emergency location to the provider location for each of the medical service providers on the list of medical service providers preferred under the medical insurance information associated with the user identifier.

In another aspect, disclosed herein is a communication device comprising a processor and non-transitory computer readable storage medium comprising instructions that, when executed by a processor, cause the processor to: (a) provide a medical emergency screen accessible from a lock screen of a user communication device; (b) receive input indicative of an emergency through the medical emergency screen; (c) send an emergency alert comprising a location of the user communication device to an emergency communication system; (d) receive a victim code from the emergency communication system in response to the emergency alert; and (e) display the victim code on a screen of the user communication device, wherein the victim code is configured to be scanned by an emergency responder communication device and used to access medical insurance information corresponding to the victim code at the emergency communication system.

In another aspect, disclosed herein is a computer-implemented method comprising: (a) providing a medical emergency screen accessible from a lock screen of a user communication device; (b) receiving input indicative of an emergency through the medical emergency screen; (c) sending an emergency alert comprising a location of the user communication device to an emergency communication system; (d) receiving a victim code from the emergency communication system in response to the emergency alert; and (e) displaying the victim code on a screen of the user communication device, wherein the victim code is configured to be scanned by an emergency responder communication device and used to access medical insurance information corresponding to the victim code at the emergency communication system.

In another aspect, disclosed herein is non-transitory computer readable storage medium comprising instructions that, when executed by a processor, cause the processor to: (a) provide a medical emergency screen accessible from a lock screen of a user communication device; (b) receive input indicative of an emergency through the medical emergency screen; (c) send an emergency alert comprising a location of the user communication device to an emergency communication system; (d) receive a victim code from the emergency communication system in response to the emergency alert; and (e) display the victim code on a screen of the user communication device, wherein the victim code is configured to be scanned by an emergency responder communication device and used to access medical insurance information corresponding to the victim code at the emergency communication system.

In another aspect, disclosed herein is an emergency communication system comprising: (a) an emergency information database comprising medical insurance information associated with a plurality of victim codes; (b) a server comprising a processor, a network element, and non-transitory computer readable storage medium having instructions that, when executed by the processor, cause the processor to: (i) receive an emergency alert from a user communication device, wherein the emergency alert comprises a location of the user communication device; (ii) generate a victim code in response to the emergency alert, wherein the victim code is configured to be scanned by an emergency responder communication device and used to access medical insurance information corresponding to the victim code at the emergency communication system; (iii) send victim code to the user communication device for display; (iv) receive a victim code from the emergency responder communication device; and (v) send the medical insurance information corresponding to the victim code to the emergency responder communication device.

In another aspect, disclosed herein is a computer-implemented method comprising: (a) receiving an emergency alert from a user communication device, wherein the emergency alert comprises a location of the user communication device; (b) generating a victim code in response to the emergency alert, wherein the victim code is configured to be scanned by an emergency responder communication device and used to access medical insurance information corresponding to the victim code at the emergency communication system; (c) sending victim code to the user communication device for display; (d) receiving a victim code from the emergency responder communication device; and (e) sending the medical insurance information corresponding to the victim code to the emergency responder communication device.

In another aspect, disclosed herein is non-transitory computer readable storage medium comprising instructions that, when executed by a processor, cause the processor to: (a) maintain an emergency information database comprising medical insurance information associated with a plurality of victim codes; (b) receive an emergency alert from a user communication device, wherein the emergency alert comprises a location of the user communication device; (c) generate a victim code in response to the emergency alert, wherein the victim code is configured to be scanned by an emergency responder communication device and used to access medical insurance information corresponding to the victim code at the emergency communication system; (d) send victim code to the user communication device for display; (e) receive a victim code from the emergency responder communication device; and (f) send the medical insurance information corresponding to the victim code to the emergency responder communication device.

In various embodiments, described herein are systems, servers, devices, methods, and media for providing emergency response assistance by an emergency management system (EMS). In one aspect, disclosed herein is a method for providing emergency response assistance by an emergency management system, the method comprising: (a) receiving an emergency alert from a first electronic device, wherein the emergency alert comprises a device identifier and a location associated with the first electronic device; (b) retrieving medical insurance information associated with the device identifier; (c) determining, using the location associated with the first electronic device and the medical insurance information associated with the device identifier, one or more preferred medical service providers proximal to the location associated with the first electronic device; and (d) transmitting locations of the one or more preferred medical service providers proximal to the location associated with the first electronic device to a second electronic device associated with an emergency service provider (ESP) personnel. In some embodiments, the method further comprises: (a) providing a victim code for display at the first electronic device; (b) receiving an emergency data request comprising the victim code from the second electronic device associated with the ESP personnel; and (c) transmitting the locations of the one or more preferred medical service providers to the second electronic device in response to receiving the emergency data request comprising the victim code. In some embodiments, the second electronic device associated with the ESP personnel obtains the victim code by scanning the victim code at a display of the first electronic device. In some embodiments, the victim code is displayed at the display of the first electronic device in the form of a QR code. In some embodiments, the victim code is displayed at the first electronic device when the first electronic device enters an emergency mode. In some embodiments, the victim code is an alphanumeric code. In some embodiments, the victim code is generated in response to receiving the emergency alert. In some embodiments, the locations of the one or more preferred medical service providers are graphically displayed within a map at a display of the second electronic device. In some embodiments, determining the one or more preferred medical service providers proximal to the location associated with the first electronic device further comprises: (a) (a) retrieving a list of medical service providers preferred under the medical insurance information associated with the device identifier; and (b) calculating a distance to the location associated with the device identifier from each of the medical service providers preferred under the medical insurance information associated with the device identifier. In some embodiments, the first electronic device is a mobile phone and wherein the emergency alert is generated in response to an emergency call made from the mobile phone. In some embodiments, the first electronic device is a wearable device and wherein the emergency alert is generated by the wearable device in response to the wearable device autonomously detecting an emergency. In some embodiments, retrieving the medical insurance information associated with the device identifier further comprises transmitting a query comprising the device identifier to a medical information database. In some embodiments, the locations of the one or more preferred medical service providers are transmitted to the second electronic device within an SMS text message.

In one aspect, disclosed herein is a method for providing emergency response assistance by an emergency management system, the method comprising: (a) receiving an emergency alert from a first electronic device, wherein the emergency alert comprises a device identifier and a device location associated with the first electronic device; (b) retrieving medical insurance information associated with the device identifier; (c) determining, using the device location associated with the first electronic device and the medical insurance information associated with the device identifier, a preferred medical service provider associated with a provider location proximal to the device location associated with the first electronic device; and (d) transmitting the provider location associated with the preferred medical service provider to a second electronic device associated with an emergency service provider (ESP) personnel. In some embodiments, the method further comprises: (a) receiving an emergency data request comprising a victim code associated with the first electronic device from the second electronic device associated with the ESP personnel; and (b) transmitting the locations of the one or more preferred medical service providers to the second electronic device in response to receiving the emergency data request comprising the victim code. In some embodiments, the victim code is provided by the EMS for display at the first electronic device. In some embodiments, the victim code is locally stored on the first electronic device. In some embodiments, the victim code is generated and provided to the first electronic device in response to receiving the emergency alert. In some embodiments, the second electronic device associated with the ESP personnel obtains the victim code by scanning the victim code presented on a display of the first electronic device. In some embodiments, the victim code is presented on the display of the first electronic device in the form of a QR code. In some embodiments, the victim code is presented on a display of the first electronic device when the first electronic device enters an emergency mode. In some embodiments, the victim code is an alphanumeric code. In some embodiments, the victim code is a phone number. In some embodiments, the victim code is a driver's license number. In some embodiments, the provider location is graphically displayed within a map on a display of the second electronic device. In some embodiments, determining the preferred medical service provider comprises: (a) retrieving a list of medical service providers preferred under the medical insurance information associated with the device identifier; and (b) calculating a distance to the device location associated with the device identifier from each of the medical service providers preferred under the medical insurance information associated with the device identifier. In some embodiments, the first electronic device is a mobile phone and the emergency alert is generated in response to an emergency call made from the mobile phone. In some embodiments, the first electronic device is a wearable device and the emergency alert is generated by the wearable device in response to the wearable device autonomously detecting an emergency. In some embodiments, the wearable device autonomously detects the emergency based on one or more sensor readings indicating a physiological or environmental parameter is exceeding a defined threshold. In some embodiments, retrieving the medical insurance information associated with the device identifier comprises transmitting a query comprising the device identifier to a medical information database. In some embodiments, the provider location is transmitted to the second electronic device within an SMS text message.

In another aspect, disclosed herein is a method for providing emergency response assistance by an emergency management system, the method comprising: (a) receiving an emergency alert from a first electronic device, wherein the emergency alert comprises a device identifier and a device location associated with the first electronic device; (b) retrieving medical insurance information associated with the device identifier; (c) determining, using the device location associated with the first electronic device and the medical insurance information associated with the device identifier, a preferred medical service provider associated with a provider location proximal to the device location associated with the first electronic device; and (d) transmitting information regarding the preferred medical service provider to the first electronic device for display at the first electronic device. In some embodiments, the method further comprises transmitting the information regarding the preferred medical service provider to a second electronic device associated with the device identifier. In some embodiments, the method further comprises transmitting the information regarding the preferred medical service provider to a second electronic device communicatively coupled to the first electronic device. In some embodiments, the information regarding the preferred medical service provider comprises the provider location associated with the preferred medical service provider.

In another aspect, disclosed herein is a method for providing emergency response assistance by an emergency management system, the method comprising: (a) providing a victim code for display at a first electronic device; (b) receiving an emergency data request from a second electronic device associated with an emergency service provider (ESP) personnel, wherein the emergency data request comprises the victim code; (c) obtaining a device location associated with the first electronic device; (d) retrieving medical insurance information associated with the device identifier; (e) determining, using the device location associated with the first electronic device and the medical insurance information associated with the device identifier, a preferred medical service provider associated with a provider location proximal to the device location associated with the first electronic device; and (f) transmitting the provider location of the preferred medical service provider to the first electronic device. In some embodiments, the method further comprises displaying the provider location on a display of the first electronic device. In some embodiments, the provider location is displayed within a graphical map.

In another aspect, disclosed herein is a method for providing emergency response assistance by an emergency management system, the method comprising: (a) providing a victim code for display at a first electronic device; (b) receiving an emergency data request from a second electronic device associated with an emergency service provider (ESP) personnel, wherein the emergency data request comprises the victim code; (c) obtaining a device location associated with the first electronic device; (d) retrieving medical insurance information associated with the device identifier; (e) determining, using the device location associated with the first electronic device and the medical insurance information associated with the device identifier, a preferred medical service provider associated with a provider location proximal to the device location associated with the first electronic device; and (f) transmitting the provider location of the preferred medical service provider to the second electronic device.

In another aspect, disclosed herein is a method for providing emergency response assistance by an emergency management system, the method comprising: (a) receiving an emergency alert from a first electronic device wherein the emergency alert comprises a device identifier and a device location associated with the first electronic device; (b) retrieving medical insurance information associated with the device identifier; (c) determining, using the device location associated with the first electronic device and the medical insurance information associated with the device identifier, a preferred medical service provider associated with a provider location proximal to the device location associated with the first electronic device; (d) providing a victim code for display at the first electronic device; (e) receiving an emergency data request from a second electronic device associated with an emergency service provider (ESP) personnel, wherein the emergency data request comprises the victim code; and (f) transmitting the provider location associated with the preferred medical service provider to the second electronic device.

In another aspect, disclosed herein is a method for providing emergency response assistance by an emergency management system, the method comprising: (a) providing a victim code for display at a first electronic device; (b) receiving an emergency data request comprising the victim code from a second electronic device; (c) gathering emergency data associated with the victim code; and (d) transmitting the emergency data associated with the victim code to the second electronic device. In some embodiments, the victim code is associated with a device identifier associated with the first electronic device and wherein gathering emergency data associated with the victim code comprises gathering emergency data associated with the device identifier. In some embodiments, the victim code is displayed at the first electronic device when the first electronic device enters an emergency mode. In some embodiments, the second electronic device associated with the ESP personnel obtains the victim code by scanning the victim code presented on a display of the first electronic device. In some embodiments, the victim code is presented on the display of the first electronic device in the form of a QR code. In some embodiments, the victim code is an alphanumeric code. In some embodiments, the victim code is generated in response to receiving the emergency alert. In some embodiments, the second electronic device is associated with an emergency service provider (ESP) personnel. In some embodiments, the method further comprises automatically populating, at the second electronic device associated with the ESP personnel, one or more fields of an incident report using the emergency data associated with the victim code. In some embodiments, the emergency data associated with the victim code comprises an emergency contact associated with the first electronic device or an identifier associated with the first electronic device. In some embodiments, the method further comprises: (a) obtaining a device location associated with the second electronic device; (b) retrieving medical insurance information associated with the victim code; (c) determining, using the device location associated with the second electronic device and the medical insurance information associated with victim code, a preferred medical service provider associated with a provider location proximal to the device location associated with the second electronic device; and (d) transmitting the provider location of the preferred medical service provider to the second electronic device within the emergency data associated with the victim code.

In some embodiments, the emergency data request further comprises the device location associated with the second electronic device.

In another aspect, disclosed herein is a method for automatically populating an incident report, the method comprising: (a) generating a victim code for display at a first electronic device; (b) receiving an emergency data request comprising the victim code from a second electronic device associated with an emergency service provider (ESP) personnel; (c) gathering emergency data associated with the victim code; (d) transmitting the emergency data associated with the victim code to the second electronic device associated with the ESP personnel; and (e) automatically populating, at the second electronic device associated with the ESP personnel, one or more fields of an incident report using the emergency data associated with the victim code. In some embodiments, the incident report is an electronic patient care report (ePCR). In some embodiments, the victim code is displayed at the first electronic device when the first electronic device enters an emergency mode. In some embodiments, the method further comprises detecting an emergency alert generated by the first electronic device and generating the victim code for display at the first electronic device in response to detecting the emergency alert. In some embodiments, the second electronic device associated with the ESP personnel obtains the victim code by scanning the victim code presented on a display of the first electronic device. In some embodiments, the victim code is presented on the display of the first electronic device in the form of a QR code. In some embodiments, the victim code is an alphanumeric code. In some embodiments, gathering the emergency data associated with the victim code comprises transmitting a query comprising an identifier associated with the first electronic device to a medical information database.

In another aspect, disclosed herein is a method for providing emergency response assistance by an electronic device, the method comprising: (a) generating, by an electronic device, an emergency alert comprising a device identifier and a device location associated with the electronic device; (b) transmitting, by the electronic device, the emergency alert to an emergency management system (EMS); and (c) receiving, by the electronic device, information regarding a preferred medical service provider from the EMS. In some embodiments, the preferred medical service is associated with a provider location proximal to the device location associated with the electronic device and the information regarding the preferred medical service provider comprises the provider location. In some embodiments, the method further comprises: (a) receiving, by the electronic device, a victim code from the EMS; and (b) displaying, by the electronic device, the victim code on a display of the electronic device.

In another aspect, disclosed herein is a system for providing emergency response assistance by an emergency management system, the system comprising: (a) a network server executed on one or more processors; and (b) an emergency management system (EMS) communicatively coupled to the network server and configured to: (i) receive an emergency alert from a first electronic device, wherein the emergency alert comprises a device identifier and a device location associated with the first electronic device; (ii) retrieve medical insurance information associated with the device identifier; (iii) determine, using the device location associated with the first electronic device and the medical insurance information associated with the device identifier, a preferred medical service provider associated with a provider location proximal to the location associated with the first electronic device; and (iv) transmit the provider location of the preferred medical service provider to a second electronic device associated with an emergency service provider (ESP) personnel provider. In some embodiments, the EMS is further configured to: (a) receive an emergency data request comprising a victim code from the second electronic device associated with the ESP personnel; and (b) transmit the provider location of the preferred medical service provider to the second electronic device in response to receiving the emergency data request comprising the victim code. In some embodiments, the EMS is further configured to provide the victim code for display at the first electronic device. In some embodiments, the victim code is locally stored on the electronic device. In some embodiments, the EMS is further configured to generate and provide the victim code to the first electronic device in response to receiving the emergency alert. In some embodiments, the second electronic device associated with the ESP personnel obtains the victim code by scanning the victim code presented on a display of the first electronic device. In some embodiments, the victim code is presented on the display of the first electronic device in the form of a QR code. In some embodiments, the victim code is presented on the first electronic device when the first electronic device enters an emergency mode. In some embodiments, the victim code is an alphanumeric code. In some embodiments, the victim code is a phone number. In some embodiments, the victim code is a driver's license number. In some embodiments, the provider location of the preferred medical service provider is graphically displayed within a map presented on a display of the second electronic device. In some embodiments, the EMS is configured to determine the preferred medical service provider associated with a provider location proximal to the location associated with the first electronic device by: (a) retrieving a list of medical service providers preferred under the medical insurance information associated with the device identifier; and (b) calculating a distance to the device location associated with the device identifier from each of the medical service providers preferred under the medical insurance information associated with the device identifier. In some embodiments, the first electronic device is a mobile phone and the emergency alert is generated in response to an emergency call made from the mobile phone. In some embodiments, the first electronic device is a wearable device and the emergency alert is generated by the wearable device in response to the wearable device autonomously detecting an emergency. In some embodiments, the wearable device autonomously detects the emergency based on one or more sensor readings indicating a physiological or environmental parameter is exceeding a defined threshold. In some embodiments, retrieving the medical insurance information associated with the device identifier comprises transmitting a query comprising the device identifier to a medical information database. In some embodiments, the provider location of the preferred medical service provider is transmitted to the second electronic device within an SMS text message.

In another aspect, disclosed herein is a system for providing emergency response assistance by an emergency management system, the system comprising: (a) a network server executed on one or more processors; and (b) an emergency management system (EMS) communicatively coupled to the network server and configured to: (i) receive an emergency alert from a first electronic device, wherein the emergency alert comprises a device identifier and a device location associated with the first electronic device; (ii) retrieve medical insurance information associated with the device identifier; (iii) determine, using the device location associated with the first electronic device and the medical insurance information associated with the device identifier, a preferred medical service provider associated with a provide location proximal to the device location associated with the first electronic device; and (iv) transmit information regarding the preferred medical service provider to the first electronic device for display at the first electronic device. In some embodiments, the EMS is further configured to transmit the information regarding the preferred medical service provider to a second electronic device associated with the device identifier. In some embodiments, the EMS is further configured to transmit the information regarding the preferred medical service provider to a second electronic device communicatively coupled to the first electronic device. In some embodiments, the information regarding the preferred medical service provider comprises the provider location associated with the preferred medical service provider.

In another aspect, disclosed herein is a system for providing emergency response assistance by an emergency management system, the system comprising: (a) a network server executed on one or more processors; and (b) an emergency management system (EMS) communicatively coupled to the network server and configured to: (i) provide a victim code for display at a first electronic device; (ii) receive an emergency data request from a second electronic device associated with an emergency service provider (ESP) personnel, wherein the emergency data request comprises the victim code; (iii) obtain a device location associated with the first electronic device; (iv) retrieve medical insurance information associated with the device identifier; (v) determine, using the device location associated with the first electronic device and the medical insurance information associated with the device identifier, a preferred medical service provider associated with a provider location proximal to the device location associated with the first electronic device; and (vi) transmit the provider location of the preferred medical service provider to the first electronic device. In some embodiments, the provider location is presented on a display of the first electronic device. In some embodiments, the provider location is displayed within a graphical map.

In another aspect, disclosed herein is a system for providing emergency response assistance by an emergency management system, the system comprising: (a) a network server executed on one or more processors; and (b) an emergency management system (EMS) communicatively coupled to the network server and configured to: (i) provide a victim code for display at a first electronic device; (ii) receive an emergency data request from a second electronic device associated with an emergency service provider (ESP) personnel, wherein the emergency data request comprises the victim code; (iii) obtain a device location associated with the first electronic device; (iv) retrieve medical insurance information associated with the device identifier; (v) determine, using the device location associated with the first electronic device and the medical insurance information associated with the device identifier, a preferred medical service provider associated with a provider location proximal to the device location associated with the first electronic device; and (vi) transmit the provider location of the preferred medical service provider to the second electronic device.

In another aspect, disclosed herein is a system for providing emergency response assistance by an emergency management system, the system comprising: (a) a network server executed on one or more processors; and (b) an emergency management system (EMS) communicatively coupled to the network server and configured to: (i) receive an emergency alert from a first electronic device wherein the emergency alert comprises a device identifier and a device location associated with the first electronic device; (ii) retrieve medical insurance information associated with the device identifier; (iii) determine, using the device location associated with the first electronic device and the medical insurance information associated with the device identifier, a preferred medical service provider associated with a provider location proximal to the location associated with the first electronic device; (iv) provide a victim code for display at the first electronic device; (v) receive an emergency data request from a second electronic device associated with an emergency service provider (ESP) personnel, wherein the emergency data request comprises the victim code; and (vi) transmit the provider location associated with the preferred medical service provider to the second electronic device.

In another aspect, disclosed herein is a system for providing emergency response assistance by an emergency management system, the system comprising: (a) a network server executed on one or more processors; and (b) an emergency management system (EMS) communicatively coupled to the network server and configured to: (i) provide a victim code for display at a first electronic device; (ii) receive an emergency data request comprising the victim code from a second electronic device; (iii) gather emergency data associated with the victim code; and (iv) transmit the emergency data associated with the victim code to the second electronic device. In some embodiments, (a) the victim code is associated with a device identifier associated with the first electronic device; and (b) the EMS is further configured to gather emergency data associated with the victim code by gathering emergency data associated with the device identifier. In some embodiments, the victim code is displayed at the first electronic device when the first electronic device enters an emergency mode. In some embodiments, the second electronic device associated with the ESP personnel obtains the victim code by scanning the victim code presented on a display of the first electronic device. In some embodiments, the victim code is presented on the display of the first electronic device in the form of a QR code. In some embodiments, the victim code is an alphanumeric code. In some embodiments, the victim code is generated in response to receiving the emergency alert. In some embodiments, the second electronic device is associated with an emergency service provider (ESP) personnel. In some embodiments, the EMS is further configured to automatically populate, at the second electronic device, one or more fields of an incident report using the emergency data associated with the victim code. In some embodiments, the emergency data associated with the victim code comprises an emergency contact associated with the first electronic device or an identifier associated with the first electronic device. In some embodiments, the EMS is further configured to: (a) obtain a device location associated with the second electronic device; (b) retrieve medical insurance information associated with the victim code; (c) determine, using the device location associated with the second electronic device and the medical insurance information associated with the victim code, a preferred medical service provider associated with a provider location proximal to the device location associated with the second electronic device; and (d) transmit the provider location of the preferred medical service provider to the second electronic device within the emergency data associated with the victim code. In some embodiments, the emergency data request further comprises the device location associated with the second electronic device.

In another aspect, disclosed herein is a system for providing emergency response assistance by an emergency management system, the system comprising: (a) a network server executed on one or more processors; and (b) an emergency management system (EMS) communicatively coupled to the network server and configured to: (i) generate an victim code for display at a first electronic device; (ii) receive an emergency data request comprising the victim code from a second electronic device associated with an emergency service provider (ESP) personnel; (iii) gather emergency data associated with the victim code; (iv) transmit the emergency data associated with the victim code to the second electronic device associated with the ESP personnel; and (v) automatically populate, at the second electronic device associated with the ESP personnel, one or more fields of an incident report using the emergency data associated with the victim code. In some embodiments, the incident report is an electronic patient care report (ePCR). In some embodiments, the victim code is displayed at the first electronic device when the first electronic device enters an emergency mode. In some embodiments, the EMS is further configured to detect an emergency alert generated by the first electronic device and generating the victim code for display at the first electronic device in response to detecting the emergency alert. In some embodiments, the second electronic device associated with the ESP personnel obtains the victim code by scanning the victim code presented on a display of the first electronic device. In some embodiments, the victim code is presented on the display of the first electronic device in the form of a QR code. In some embodiments, the victim code is an alphanumeric code. In some embodiments, the EMS is further configured to gather the emergency data associated with the victim code by transmitting a query comprising an identifier associated with the first electronic device to a medical information database.

In another aspect, disclosed herein is a system for providing emergency response assistance by an electronic device, the system comprising: (a) a network server executed on one or more processors; (b) an emergency management system (EMS) communicatively coupled to the network server; and (c) an electronic device configured to: (i) generate an emergency alert comprising a device identifier and a device location associated with the electronic device; (ii) transmitting the emergency alert to the EMS; and (iii) receiving information regarding a preferred medical service provider from the EMS. In some embodiments, the preferred medical service provider is associated with a provider location proximal to the device location associated with the electronic device and the information regarding the preferred medical service provider comprises the provider location. In some embodiments, the electronic device is further configured to: (a) receive a victim code from the EMS; and (b) display the victim code on a display of the electronic device.

In another aspect, disclosed herein is an electronic communication device comprising at least one processor, a memory, a display, and non-transitory computer readable medium including a software program comprising instructions executable by the at least one processor to perform steps comprising: (a) detect an indication of an emergency based on user input or sensor readings; (b) generate an emergency alert comprising a device identifier and a device location associated with the electronic communication device; (c) send the emergency alert to an emergency management system (EMS); (d) receive a victim code from the EMS or retrieve the victim code from local storage; (e) present the victim code on the display, wherein the victim code is configured to be scanned by a second electronic device associated with an emergency service provider (ESP) personnel. In some embodiments, the victim code is generated by the EMS. In some embodiments, the victim code is locally stored on the electronic device. In some embodiments, the EMS is further configured to generate and provide the victim code to the electronic communication device in response to receiving the emergency alert. In some embodiments, the second electronic device associated with the ESP personnel obtains the victim code by scanning the victim code presented on a display of the first electronic device. In some embodiments, the victim code is presented on the display of the electronic communication device in the form of a QR code. In some embodiments, the electronic communication device is configured to present the victim code on the display when entering an emergency mode. In some embodiments, the victim code is an alphanumeric code. In some embodiments, the victim code is a phone number. In some embodiments, the victim code is a driver's license number. In some embodiments, the electronic communication device is a mobile phone and the emergency alert is generated in response to an emergency call made from the mobile phone. In some embodiments, the electronic communication device is a wearable device and the emergency alert is generated by the wearable device in response to the wearable device autonomously detecting an emergency. In some embodiments, the wearable device autonomously detects the emergency based on one or more sensor readings indicating a physiological or environmental parameter is exceeding a defined threshold. In some embodiments, the provider location of the preferred medical service provider is transmitted to the second electronic device within an SMS text message.

In another aspect, disclosed herein is an electronic communication device comprising at least one processor, a memory, a display, and non-transitory computer readable medium including a software program comprising instructions executable by the at least one processor to perform steps comprising: (a) obtain a victim code from an emergency management system (EMS) or from local storage; (b) present the victim code on the display, wherein the victim code is configured to be scanned by a second electronic device associated with an emergency service provider (ESP) personnel for use in an emergency data request to obtain emergency data comprising medical insurance information; (c) determine a device location for the electronic communication device; (d) send the device location to an emergency management system; (e) receive a provider location of a preferred medical service provider from the EMS, wherein the provider location is based on the device location and medical insurance information associated with the electronic communication device. In some embodiments, the provider location is presented on the display of the electronic communication device. In some embodiments, the provider location is displayed within a graphical map. In some embodiments, the victim code enables the second electronic device to populate one or more fields of an incident report using the emergency data associated with the victim code. In some embodiments, the emergency data associated with the victim code comprises an emergency contact associated with the electronic communication device or an identifier associated with the electronic communication device. In some embodiments, the emergency data request further comprises the device location associated with the second electronic device.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 11 illustrates a graphical user interface of an emergency response application for receiving and displaying emergency data in accordance with one embodiment of the present disclosure.

DETAILED DESCRIPTION

Disclosed herein are systems, devices, media, and methods for providing enhanced emergency communications. Embodiments of the present disclosure take advantage of technological advancements that have allowed for mobile communication devices to generate accurate locations by incorporating multiple technologies embedded in the devices, such as GPS, Wi-Fi, and Bluetooth to create device-based hybrid locations. Device-based hybrid locations are locations calculated on an electronic or communication device, as opposed to locations calculated using a network (e.g., a carrier network). Device-based hybrid locations can be generated using GPS, network-based technologies, Wi-Fi access points, Bluetooth beacons, barometric pressure sensors, dead reckoning using accelerometers and gyrometers, and a variety of crowdsourced and proprietary databases that device operating systems providers are running to enhance location technology. These device-based hybrid locations can be quickly generated during emergency calls.

Furthermore, mobile communication devices (e.g., mobile phones, wearables, IoT devices, smart home devices, vehicle computers, etc.) are often capable of generating or storing additional information that may be useful in responding to emergency situations, such as health data or medical histories. For example, during an emergency, a modern mobile communication device may have access to an implicated person's blood type, preexisting medical conditions, or even the implicated person's current heartrate. In some embodiments, the mobile communication device has access to data from sensors (e.g., health or environmental sensors). For example, a video feed of the emergency via a connected surveillance camera can provide valuable situational awareness regarding the emergency.

Figure 1A:
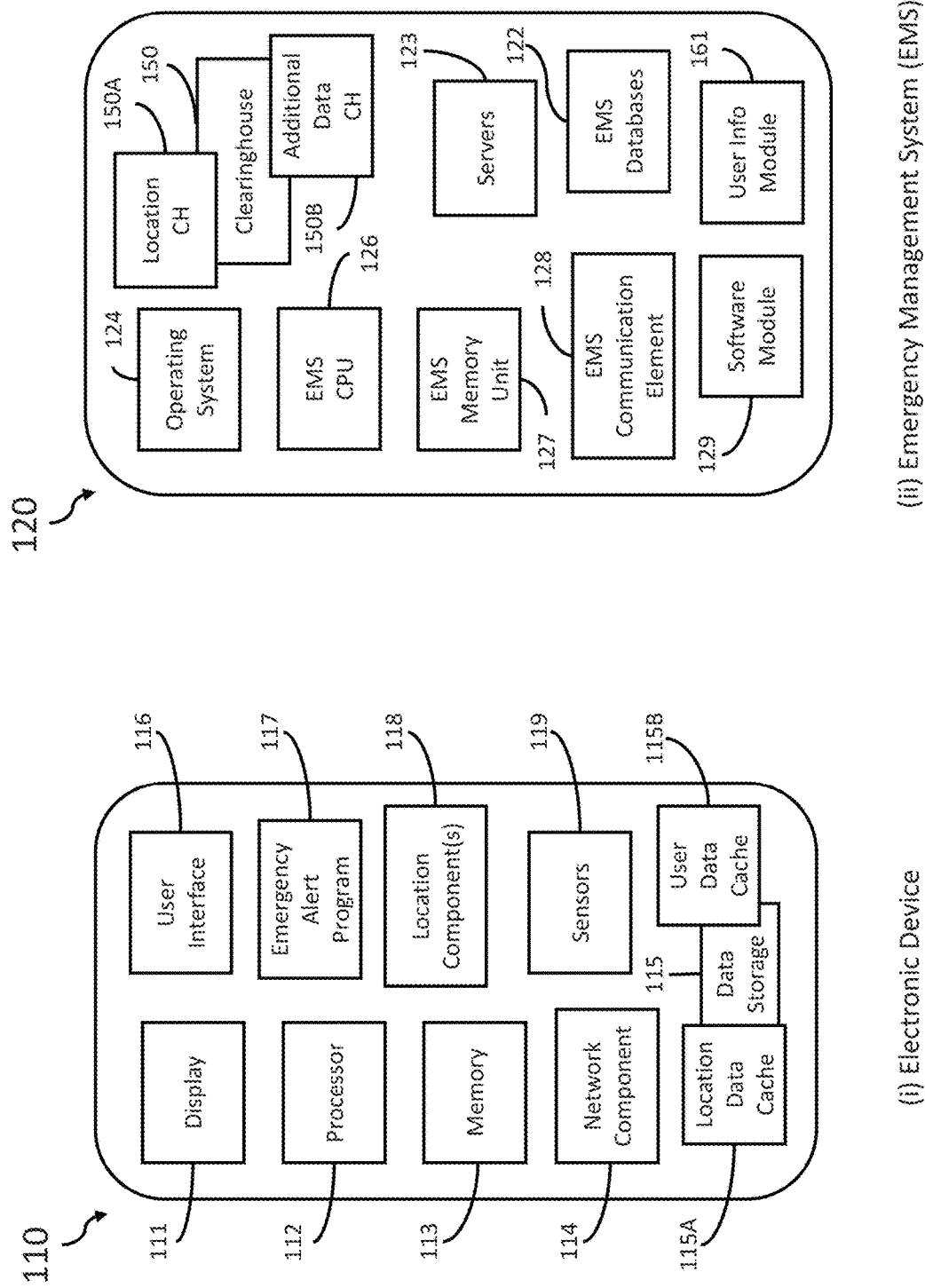
FIG. 1A depicts diagrams of (i) an electronic device and (ii) an emergency management system (EMS) in accordance with one embodiment of the present disclosure.

In certain embodiments, disclosed herein are devices, systems, and methods for managing emergency data for emergency response. FIG. 1A depicts diagrams of (i) an electronic device 110 and (ii) an emergency management system (EMS) 120 in accordance with one embodiment of the present invention. In some embodiments, the electronic device 110 is a digital processing device such as a communication device (e.g., mobile or cellular phone, computer, laptop, etc.). In some embodiments, the electronic device is a wearable device (e.g., a smartwatch). In some embodiments, the electronic device is an Internet of Things (IoT) device, such as a home assistant (e.g., an Amazon Echo) or a connected smoke detector (e.g., a Nest Protect smoke and carbon monoxide alarm). In some embodiments, the electronic device is a walkie-talkie or two-way radio.

In some embodiments, the electronic device 110 includes a display 111, a processor 112, a memory 113 (e.g., an EPROM memory, a RAM, or a solid-state memory), a network component 114 (e.g., an antenna and associated components, Wi-Fi adapters, Bluetooth adapters, etc.), a data storage 115, a user interface 116, an emergency alert program 117, one or more location components 118, and one or more sensors 119. In some embodiments, the processor 112 is implemented as one or more microprocessors, microcomputers, microcontrollers, digital signal processors, central processing units, state machines, logic circuitries, and/or devices that manipulate signals based on operational instructions. Among other capabilities, the processor 112 is configured to fetch and execute computer-readable instructions stored in the memory 113.

In some embodiments, the display 111 is part of the user interface 116 (e.g., a touchscreen is both a display and a user interface in that it provides an interface to receive user input or user interactions). In some embodiments, the user interface 116 includes physical buttons such as an on/off button or volume buttons. In some embodiments, the display 111 and/or the user interface 116 comprises a touchscreen (e.g., a capacitive touchscreen), which is capable of displaying information and receiving user input. In some embodiments, the communication device includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage 115 includes a location data cache 115A and a user data cache 115B. In some embodiments, the location data cache 115A is configured to store locations generated by the one or more location components 118.

In some embodiments, the emergency alert program 117 is an emergency response application or emergency response mobile application. In some embodiments, the emergency alert program 117 is configured to record user data, such as a name, address, or medical data of a user associated with the electronic device 110. In some embodiments, the emergency alert program 117 is configured to detect when an emergency request is generated or sent by the electronic device 110 (e.g., when a user uses the electronic device 110 to make an emergency call). In some embodiments, in response to detecting an emergency request generated or sent by the electronic device 110, the emergency alert program is configured to deliver a notification to the EMS 120. In some embodiments, the notification is an HTTP post containing information regarding the emergency request. In some embodiments, the notification includes a location (e.g., a device-based hybrid location) generated by or for the electronic device 110. In some embodiments, in response to detecting an emergency request generated or sent by the electronic device 110, the emergency alert program is configured to deliver user data to the EMS 120.

In some embodiments, as depicted in FIG. 1A, the emergency management system (EMS) 120 includes an EMS operating system 124, an EMS CPU 126, an EMS memory unit 127, an EMS communication element 128, and one or more software modules 129. In some embodiments, the EMS CPU 126 is implemented as one or more microprocessors, microcomputers, microcontrollers, digital signal processors, central processing units, state machines, logic circuitries, and/or devices that manipulate signals based on operational instructions. Among other capabilities, the EMS CPU 126 is configured to fetch and execute computer-readable instructions stored in the EMS memory unit 127. The EMS memory unit 127 optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The EMS memory unit 127 optionally includes modules, routines, programs, objects, components, data structures, etc., which perform particular tasks or implement particular abstract data types.

In some embodiments, the EMS 120 includes one or more EMS databases 122, one or more servers 123, and a clearinghouse 150. In some embodiments, the clearinghouse 150, as described in further detail below, is an input/output (I/O) interface configured to manage communications and data transfers to and from the EMS 120 and external systems and devices. In some embodiments, the clearinghouse 150 includes a variety of software and hardware interfaces, for example, a web interface, a graphical user interface (GUI), and the like. The clearinghouse 150 optionally enables the EMS 120 to communicate with other computing devices, such as web servers and external data servers (not shown). In some embodiments, the clearinghouse 150 facilitates multiple communications within a wide variety of networks and protocol types, including wired networks, for example, LAN, cable, etc., and wireless networks, such as WLAN, cellular, or satellite. In some embodiments, the clearinghouse 150 includes one or more ports for connecting a number of devices to one another or to another server. In some embodiments, the clearinghouse 150 includes one or more sub-clearinghouses, such as location clearinghouse 150a and additional data clearinghouse 150b, configured to manage the transfer of locations and additional data, respectively. In some embodiments, the EMS 120 additionally includes a user information module 161 that receives and stores user information (e.g., personal information, demographic information, medical information, location information, etc.) within the EMS 120. In some embodiments, users can submit user information through a website, web application, or mobile application, such as during a registration process for an emergency response application. In some embodiments, when the EMS 120 receives emergency data including user information, such as through an emergency alert received by the clearinghouse 150 (as described below), the EMS 120 stores the user information in the user information module 161. In some embodiments, user information stored within the user information module 161 is received by the EMS 120 from a third-party server system, as described below. In some embodiments, user information stored within the user information module 161 is associated with an identifier of a user or an electronic device associated with a user, such as a phone number or an email address.

Figure 1B:
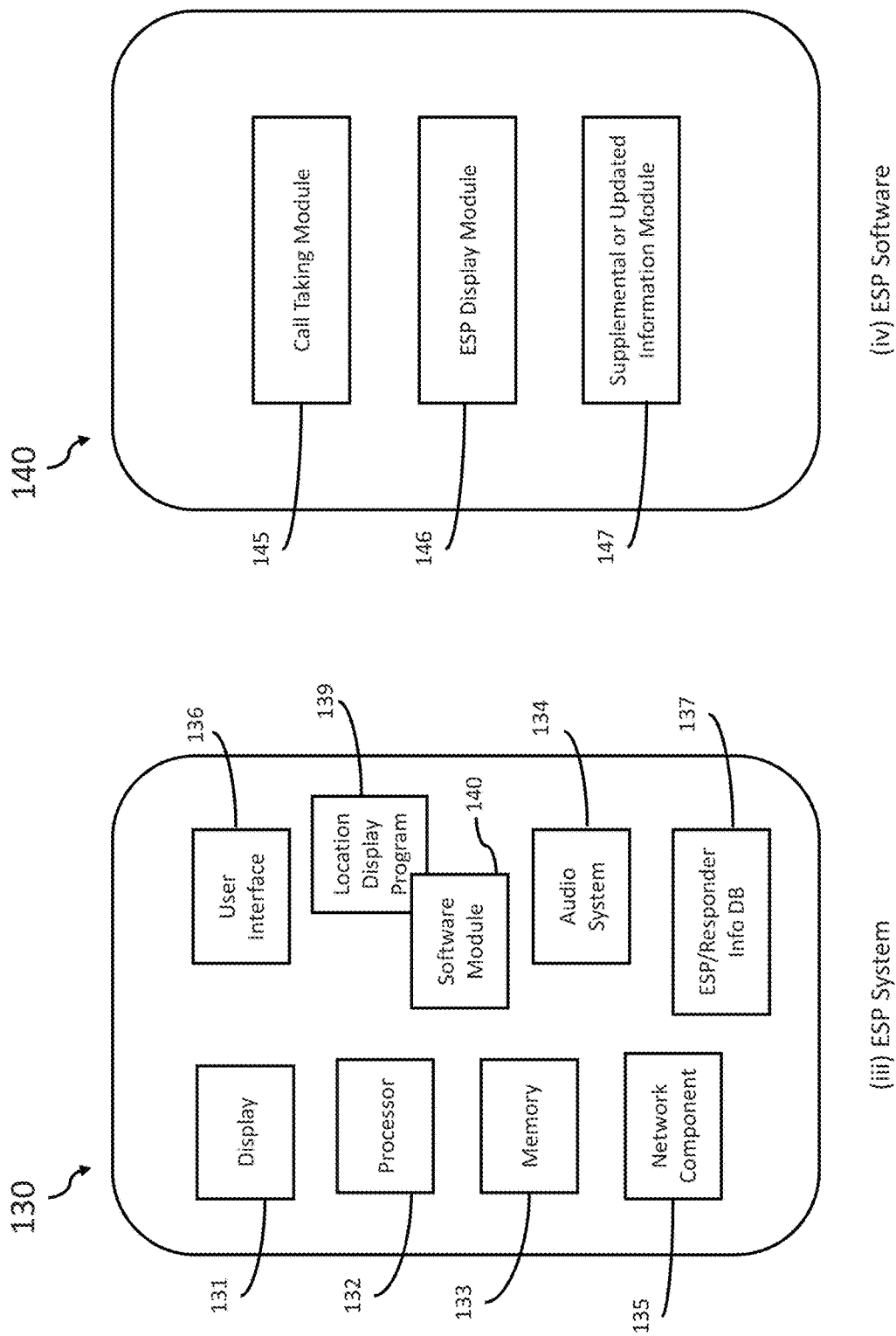
FIG. 1B depicts diagrams of (iii) an emergency service provider (ESP) system and (iv) ESP software in accordance with one embodiment of the present disclosure.

In some embodiments, as depicted in FIG. 1B, an ESP is a public safety answering point (PSAP) system 130 that includes one or more of a display 131, a user interface 136, at least one central processing unit or processor 132, a network component 135, an audio system 134 (e.g., microphone, speaker and/or a call-taking headset), and a computer program such as a PSAP Emergency Display Application or Location Display Program 139. In some embodiments, the PSAP application or program 139 comprises one or more software modules 140. In some embodiments, the PSAP system 130 comprises a database of emergency responders 137, such as medical assets, police assets, fire response assets, rescue assets, safety assets, etc.

In some embodiments, as depicted in FIG. 1B, the PSAP application or program 139 installed on a PSAP system 130 comprising a software module 140 is a call taking module 145, an ESP display module 146, a supplemental or updated information module 147, or a combination thereof. In some embodiments, the PSAP application 139 displays the information on a map (e.g., on the display 131). In some embodiments, location and supplemental information is displayed for emergency service providers (e.g., police, fire, medical, etc.) and/or responders on their devices. It is contemplated that responder devices have optionally installed a responder device program (not shown) similar to PSAP display module 146. In some embodiments, the responder device program displays the emergency location on a map.

Emergency Clearinghouse

In some embodiments, as described above, the emergency management system (EMS) 120 includes a clearinghouse 150 (also referred to as an "Emergency Clearinghouse" or emergency communication system) for storing and retrieving emergency data. In some embodiments, the clearinghouse 150 includes sub-clearinghouses, such as a location clearinghouse 150A and an additional data clearinghouse 150B. In some embodiments, the location clearinghouse 150A includes a location ingestion module and a location retrieval module, as described below with respect to FIG. 2. In some embodiments, the additional data clearinghouse 150B includes an additional data ingestion module and an additional data retrieval module, as described below with respect to FIG. 2. In other embodiments, additional data and location data (e.g., emergency data) are stored in one or more databases in a distributed manner. In some embodiments, the emergency data is stored in an external or third-party server that is accessible to the EMS 120. The clearinghouse 150 optionally functions as an interface that receives and stores emergency data from electronic or communication devices that are then retrieved, transmitted, and/or distributed to recipients (e.g., emergency personnel) before, during, or after emergencies. As described above, the clearinghouse optionally receives emergency data from electronic or communication devices such as mobile phones, wearable devices, laptop or desktop computers, personal assistants, intelligent vehicle systems, home security systems, IoT devices, camera feeds, and other sources. As described above and below, emergency data optionally consists of locations or additional data such as medical history, personal information, or contact information. In some embodiments, during an emergency, an emergency service provider ESP (e.g., a public safety answering point (PSAP)) queries the clearinghouse 150 for emergency data pertaining to an emergency. The clearinghouse 150 then identifies the emergency and any emergency data pertaining to the emergency stored within the clearinghouse 150 and transmits the pertinent emergency data to the requesting ESP. Accordingly, in some embodiments, the clearinghouse 150 acts as a data pipeline for ESPs otherwise without access to emergency data that is critical to most effectively and efficiently responding to an emergency. Accordingly, location data stored within the clearinghouse 150 allows emergency responders to arrive at the scene of an emergency faster, and additional data stored within the clearinghouse 150 allows emergency responders to be better prepared for the emergencies they face.

For example, in one embodiment, an emergency alert is triggered by an electronic device 110 (e.g., by pressing a soft button, a physical button, voice command, or gesture) or autonomously based on sensor data (e.g., smoke alarms). In this example, the user then confirms the emergency and/or provides authorization for sending the emergency alert. Emergency data, such as an enhanced location and additional data regarding the user (e.g., the user's medical history) is delivered by the electronic device 110 to the EMS 120 and stored in the clearinghouse 150 (e.g., in the location clearinghouse 150A and the additional data clearinghouse 150B). In some embodiments, the EMS 120 or clearinghouse 150 formats the emergency data into a format that is compatible with industry standards for storing and sharing emergency data. For example, the emergency data is formatted to be compatible with National Emergency Number Association (NENA) standards. A requesting party (such as an ESP responding to the emergency alert) then queries the clearinghouse 150 with an emergency data request (such as a HTTP GET request). In some embodiments, the emergency data request is in the form of the Location Information Server (LIS) protocol. In response to the emergency data request, the EMS 120 or clearinghouse 150 sends an appropriate response including relevant emergency data to the requesting party via an encrypted pathway. In some embodiments, the emergency data request is in the form of HTTP-Enabled Location Delivery (HELD) and the response from the EMS 120 or clearinghouse 150 is in the form of Presence Information Data Format Location Object (PIDF-LO). In some embodiments, the emergency data request includes an authorization code (also referred to as an "authorization token") in the body, header, or metadata of the request, and the EMS 120 checks that the authorization code is active before providing a response to the requesting party. In some embodiments, authorization is provided in the "Authorization" header of the emergency data request using HTTP Basic Authentication. For example, in some embodiments, authorization is base64-encoded user name and password for an account associated with the requesting party.

In some embodiments, the emergency data request includes credentials or an access key associated with the requesting party, and consults the management portal to determine an appropriate response (e.g., which categories of emergency data should be sent) based on the credentials or access key associated with the requesting party. In some embodiments, emergency data requests are sent over public networks using API access keys or credentials. In some embodiments, Transport Layer Security (TLS) is used in the requests and responses from the EMS 120 for encryption security. In some embodiments, the call taking module 145 includes a call-handling application, which is provided by a third-party vendor. In some embodiments, the call taking module 145 or call handling-application is an emergency response application. In some embodiments, an ESP personnel interacts with the call-handling application to send an emergency data request to the EMS 120. In some embodiments, the response from the EMS 120 is displayed at the ESP display 131.

In some embodiments, an emergency alert or the electronic device 110 from which the emergency alert was generated is associated with a phone number. An example of a request from a requesting party for a location of an electronic device 110 associated with the phone number "+1-555-555-5555" is shown below. Although not shown, credentials or an access key associated with the requesting party are optionally provided in the header of the request (which is optionally encrypted for security).

```
<?xml version="1.0"?>
<locationRequest xmlns="urn:ietf:params:xml:ns:geopriv:held">
  <locationraType exact="false">
     any
  </locationType>
  <device xmlns="urn:ietf:params:xml:ns:geopriv:held:id">
     <uri>tel:+15555555555</uri>
  </device>
</locationRequest>
```

An example of a LIS response from the EMS 120 in a standard format compatible with industry standards, PIDF-LO, is shown below. If the request includes an inactive or expired credential or access key, an error response will be generated.

```
<?xml version="1.0" encoding="utf-8"?>
<held:locationResponse xmlns:gbp="urn:ietf:params:xml:ns:pidf:geopriv10:basicPolicy"
 xmlns:gp="urn:ietf:params:xml:ns:pidf:geopriv10"
 xmlns:gs="http://www.opengis.net/pidflo/1.0"
 xmlns:pidf="urn:ietf:params:xml:ns:pidf"
 xmlns:gml="http://www.opengis.net/gml"
 xmlns:held="urn:ietf:params:xml:ns:geopriv:held">
     <held:locationUriSet expires="2016-11-10 01:31:21.123713">
        <held:locationURI>
          https://api-sandbox.rapidsos.com/v1/location/lbyr/?ref=c786f6b9-5e06-4611-a1c9-fbf9333e5652
        </held:locationURI>
     </held:locationUriSet>
     <pidf:presence entity="tel:+15555555555">
        <pidf:tuple id="vcefda6f4-ec1c-4721-9f41-225d5ff38c09">
           <pidf:status>
              <gp:geopriv>
                 <gp:location-info>
                    <gs:Circle>
                       <gml:pos>37.4219983 -122.084</gml:pos>
                       <gs:radius uom="urn:ogc:def:uom:EPSG::9001">
                       20.0</gs:radius>
                    </gs:Circle>
                    <ca:civicAddress xml:lang="en">
                       <ca:A1>CA</ca:A1>
                       <ca:A3>Mountain View</ca:A3>
                       <ca:RD>Amphitheatre</ca:RD>
                       <ca:STS>Pkwy</ca:STS>
                       <ca:HNO>1600</ca:HNO>
                       <ca:PC>94043</ca:PC>
                       <ca:BLD>Google Bldg 40</ca:BLD>
                    </ca:civicAddress>
                 </gp:location-info>
                 <gp:usage-rules>
                    <gbp:retransmission-allowed>
                    false</gbp:retransmission-allowed>
                 </gp:usage-rules>
              </gp:geopriv>
           </pidf:status>
           <pidf:timestamp>
           2016-09-15T23:59:46.778000+00:00
           </pidf:timestamp>
        </pidf:tuple>
     </pidf:presence>
</held:locationResponse>
```

In some embodiments, as described above, emergency data includes locations and additional data. In some embodiments, emergency data includes one or more emergency data fields (also referred to as "data fields"). In some embodiments, the emergency data fields include: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. In some embodiments, emergency data fields are tagged with tags for specific types of data such as "demographics" or "medical data." For example, in some embodiments, gender, height, weight, ethnicity, profile picture (image-url) are tagged as demographic data. In some embodiments, medical data protected under HIPAA and other laws are tagged as "HIPAA" or "private." In some embodiments, medical data includes information on one or more of allergies, medical condition(s) or illness(es), medication(s), disabilities, blood type, medical note(s), and other medical information. In some embodiments, medical information protected under HIPAA are encrypted and/or anonymized. In some embodiments, some data are tagged as "general" or another similar tag, wherein access is not specifically restricted. In some embodiments, as described below, emergency data fields with common tags are grouped into emergency data categories. For example, in some embodiments, all emergency data fields tagged as demographic data (e.g., gender, height, weight, ethnicity, etc.) are grouped into a "demographics" emergency data category. In some embodiments, an emergency data category includes a plurality of emergency data fields. In some embodiments, an emergency data category includes only a single emergency data field.

An example of an emergency data request for additional data from a requesting party for an electronic device 110 associated with the phone number "+1-777-999-7777" is shown below. Although not shown, credentials or an access key associated with the requesting party are optionally provided in the header of the request.

http://api-demo.rapidsos.com/v1/adr/?caller_id=17779997777&section=device_info

An example of an additional data response from the EMS 120 in a standard format compatible with industry standards, PIDF-LO, is shown below. In some embodiments, if the request includes an inactive or expired access key or set of credentials, an error response will be generated.

HTTP/1.1 200 OK
Date: Tue, 1 Dec. 2016 23:27:30 GMT
Content-Length: 489
Content-Type: application/EmergencyCallData.DeviceInfo+xml
  <dev:EmergencyCallData.DeviceInfo
  xmlns:dev="urn:ietfparams:xml:ns:EmergencyCallData:DeviceInfo">
  <dev:DataProviderReference>d4b3072df.201409182208075@example.org In some embodiments, when the emergency data is stored at a third-party server and receives a request for emergency data from the EMS 120, as a database query, the third-party server formats the requested emergency data and stores this information in an alternate database, and forwards either a response or a reference to the alternate database for accessing the emergency data requested by the EMS 120, which is provided to the PSAP 130 over a hybrid analog and/or a data communication channel, depending on the capabilities of PSAP 130. In some embodiments, the third-party server stores the emergency data, requested by the EMS 120 or directly by the PSAP 130, in the alternate database for a certain period of time after receiving the request for the emergency data regarding a user and any electronic devices 110. In some embodiments, this period of time is a timer value (e.g., a timer countdown or a set time point) defined by the EMS 120 and the third-party server in conjunction with each other prior to the addition of the requested emergency data to the alternate database at the third-party server. In some embodiments, once the timer value has passed and no new requests for the emergency data pertaining to the particular user and the electronic device 110, or other devices associated with the user, are received by the third-party server, then the third-party server marks the particular alternate database entries to be deleted and waits for another, different, time-out interval. In some embodiments, once this particular second time-out interval has also been completed and no new requests for location data for the particular user or associated electronic devices 110 are received by the third-party server, the third-party server removes the specific marked entries from the alternate database in the next cycle of updates for the alternate database. In some embodiments, after adding the emergency data in the alternate database by the third-party server, the third-party server keeps updating the emergency data in the alternate database on a periodic, or as-needed basis, for the purpose of keeping the emergency data about the user or electronic device 110 current for providing the most recent and accurate emergency data to the EMS 120 and the PSAP 130 for the purposes of responding to a request for emergency assistance. In some embodiments, the third-party server is updated by the EMS 120 for all the emergency data pertaining to all users and their associated electronic devices 110 that are served by the EMS 120 at any current time.

In some non-emergency situations, there is a need to access location data, user data, emergency data or sensor data. For example, in some embodiments, a user of an electronic device 110 grants authorization to family members to access location data for the user. Accordingly, when a family member requests location data for a user, access is granted if there is proper authorization. As another example, in some embodiments, a taxi operations company requests and obtains location data of one or more fleet members to keep track of its vehicles (e.g., via onboard vehicle console or terminal).

Various embodiments and applications of the clearinghouse 150 are described in detail herein. However, the embodiments and applications described herein should not be considered exhaustive or limiting in any way.

Figure 2:
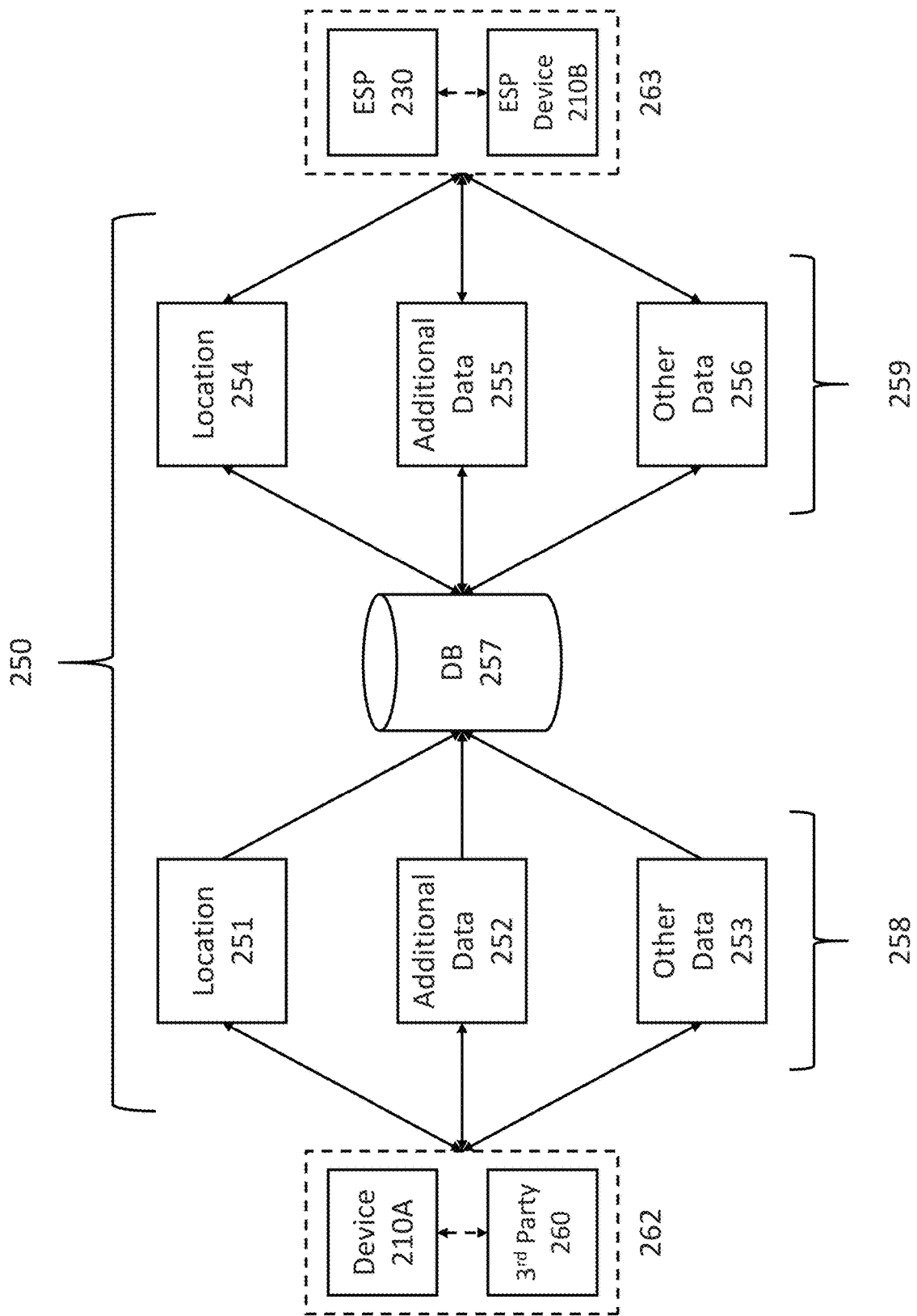
FIG. 2 depicts a diagram of a clearinghouse for emergency data in accordance with one embodiment of the present disclosure.

FIG. 2 depicts an embodiment of an Emergency Clearinghouse 250 for storing and retrieving emergency data. In some embodiments, the clearinghouse 250 includes a set of ingestion modules 258 (also referred to as "ingestion modules") and a set of retrieval modules 259 (also referred to as "retrieval modules"). The set of ingestion modules 258 is configured to receive various forms of emergency data from various emergency data sources 262, such as an electronic device 210A or a third-party server system 260 (hereinafter, "third-party server"). In some embodiments, an electronic device 210A is a communication device (e.g., a mobile phone), a wearable device (e.g., a smartwatch), or an internet of things (IoT) device (e.g., a smart speaker) that can communicate with one or more of the ingestion modules within the set of ingestion modules 258. In some embodiments, a third-party server 260 stores data that is not generated by or stored within an electronic device. For example, in some embodiments, a third-party server includes a database of static medical information that can be sent to the clearinghouse during an emergency. In some embodiments, when the emergency management system 120 detects an emergency (e.g., when a person calls 9-1-1), the clearinghouse can query an emergency data source 262 for emergency data regarding the emergency. For example, in some embodiments, in response to detecting a 9-1-1 call made from a mobile phone, the additional data ingestion module 252 (as described below) sends a query including the phone number of the mobile phone to a third-party server 260 that stores static medical information. The third-party server 260 can then return any available medical information associated with the phone number of the mobile phone to the additional data ingestion module. In some embodiments, multiple ingestion modules within the set of ingestion modules can receive emergency data for a single emergency. For example, in some embodiments, when a person calls 9-1-1 from a mobile phone, the mobile phone can send a device-based hybrid location to the location ingestion module 251 (as described below) and demographic data (as described above) to the additional data ingestion module 252. In some embodiments, the clearinghouse can receive emergency data from multiple emergency data sources 262 for a single emergency. For example, in some embodiments, when a person calls 9-1-1 from a mobile phone, the clearinghouse can receive a location from the mobile phone (such as through the location ingestion module 251) and a heartrate from a smartwatch that the person is wearing (such as through additional data ingestion module 252). Or for example, in some embodiments, when a person calls 9-1-1 from a mobile phone, the clearinghouse can receive a location from the mobile phone and medical information associated with the person from a third-party server 260.

The set of ingestion modules 258 optionally includes a location ingestion module 251, an additional data ingestion module 252, and one or more other data ingestion modules 253. In some embodiments, any of the location ingestion module 251, additional data ingestion module 252, or other data ingestion modules 253 may be included in one single module. In some embodiments, the location ingestion module 251 is an emergency location service ingestion interface for posting or receiving emergency locations. In some embodiments, the location ingestion module 251 is a REST API that receives an HTTP POST including location data when an emergency alert is generated (e.g., when an emergency call is made from a cell phone). The location data includes a location generated concurrently or in response to the generation of the emergency alert. In some embodiments, the location data includes a location generated before the emergency alert. For example, when an emergency call is made from a cell phone, thereby generating an emergency alert, the location ingestion module 251 receives a location recently generated by the phone but before the emergency alert was generated, ensuring that a location for the emergency is available as quickly as possible. In some embodiments, the location data includes a device-based hybrid location generated by an electronic device 210A that generated the emergency alert. In some embodiments, the location data includes a location generated by a second electronic device communicatively coupled to the electronic device that generated the emergency alert. In some embodiments, the location ingestion module 251 is integrated into an electronic device 210A through a mobile application installed on the device 210A or integrated into the firmware or operating system of the electronic device 210A. In some embodiments, location data is transmitted from an electronic device 210A to a third-party server 260 before it is subsequently sent from the third-party server 260 to the location ingestion module 251. In some embodiments, location data is transmitted from a third-party server 260 to an electronic device 210A before it is subsequently sent from the electronic device 210A to the location ingestion module 251.

In some embodiments, the location data is generated by the electronic device 210A before the emergency and is accessible to an ESP during an emergency. For example, a taxi company may have software that transmits the location of its cars or assets to the emergency clearinghouse 250 preemptively. Thus, when an emergency arises, the location of the affected taxi can be made accessible quicker to send help. In some embodiments, the location data is generated by the electronic device 210A after the emergency has commenced and is made accessible to an ESP during the on-going emergency. For example, updated location data of a hijacked taxi is also be periodically transmitted to the emergency clearinghouse 250 and made accessible to an ESP.

In some embodiments, the additional data ingestion module 252 is an interface for posting or receiving static or dynamic emergency profile data (hereinafter, "additional data"). Additional data may include medical data, personal data, demographic data, and health data. For example, medical data may include information relating to a person's medical history, such as past surgeries or preexisting conditions. Personal data may include a person's name, date of birth, height, weight, occupation, address(es) (e.g., home address, work address, etc.), spoken languages, etc. Demographic data may include a person's gender, ethnicity, age, etc. Health data may include information such as a person's blood type or heartrate. Additional data may further include data received from connected devices such as vehicles, IoT devices, and wearable devices. For example, intelligent vehicle systems may generate and send data regarding a crash, such as the speed at which the vehicle was moving just before the collision, where the vehicle was struck, the number of occupants, etc. In some embodiments, the additional data ingestion module 252 is a REST API (e.g., a JSON (JavaScript Object Notation) REST API). For example, in some embodiments, when an emergency call is made from a cell phone, thereby generating an emergency alert, the cell phone receives a heartrate of the person who made the emergency call from a smartwatch worn by the person and communicatively coupled to the cell phone (e.g., Wi-Fi or Bluetooth connectivity). The cell phone sends the heartrate to the additional data ingestion module 252, along with any other additional data, in an HTTP POST.

In some embodiments, the additional data ingestion module 252 is integrated into an electronic device 210A through a mobile application installed on the device 210A or integrated into the firmware or operating system of the electronic device 210A. In some embodiments, additional data is sent to the additional data ingestion module 252 from a network server (e.g., third-party server 260). The additional data ingestion module 252 is accessed by any connected platform that receives data that might be relevant in an emergency. Connected platforms optionally send additional data to the additional data ingestion module 252 at any time. For example, in some embodiments, a website, web application, or mobile application integrated with the additional data ingestion module 252 that allows users to create profiles sends additional data included in the profiles to the additional data ingestion module 252 every time a profile is created or updated. In some embodiments, additional data is transmitted from an electronic device 210A to a third-party server 260 before it is subsequently sent from the third-party server 260 to the additional data ingestion module 252. In some embodiments, additional data is transmitted from a third-party server 260 to an electronic device 210A before it is subsequently sent from the electronic device 210A to the additional data ingestion module 252.

In some embodiments, the set of ingestion modules 258 includes one or more other data ingestion modules 253.

Another data ingestion module 253 is optionally an interface for posting or receiving data relevant to emergencies that is not received by the location ingestion module 251 or the additional data ingestion module 252. In some embodiments, the other data ingestion module 253 receives audio or video streams during an emergency from electronic or communication devices associated with the emergency or proximal to the emergency. For example, an emergency alert is generated by an intelligent vehicle system installed in a vehicle in response to the vehicle experiencing a collision. In this example, the emergency alert is sent to the EMS 120 by the intelligent vehicle system or by an electronic device communicatively coupled to the intelligent vehicle system, such as a cell phone coupled to the intelligent vehicle system via Bluetooth. In response to generating the emergency alert, the intelligent vehicle system additionally begins streaming audio and video from microphones and cameras installed inside or outside of the vehicle to the clearinghouse 250 through the other data ingestion module 253. A cell phone communicatively coupled to the intelligent vehicle system additionally or alternatively streams audio or video from microphones and cameras integrated into the cell phone to the clearinghouse 250 through the other data ingestion module 253. In some embodiments, the one or more other data ingestion modules 253 are REST APIs that are accessed with an HTTP POST.

After receiving any relevant data (e.g., ingestion data), the set of ingestion modules 258 can store the data in one or more clearinghouse databases 257. For example, in some embodiments, the clearinghouse databases 257 include a location database and an additional data database. In some embodiments, as described above, the one or more clearinghouse databases 257 are stored on a third-party server communicatively coupled to or otherwise accessible by the EMS 120. In some embodiments, the ingestion data enters the clearinghouse 250 comprises various data fields and data entries for those data fields. In some embodiments, the clearinghouse 250 maintains a list of expected data fields so that the data entries can be placed under a specific data field. In some embodiments, the set of ingestion modules 258 tags or otherwise associates the data received by the modules with an identifier of a user or device associated with the data. For example, the set of ingestions modules 258 tag the data the received by the modules with a user ID number, an email address, or a phone number (e.g., caller ID). In some embodiments, the ingestion modules 258 tag the data received by the clearinghouse 250 based on the data source (e.g., device name or type, application name, user name, phone number, corporate account, third-party server identifier, etc.).

In some embodiments, an individual or group of individuals are associated with multiple identifiers. For example, the location ingestion module 251 receives a location generated by a phone associated with the phone number +1-555-555-5555, associated with John Doe. The additional data ingestion module 252 also receives a heartrate from a smartwatch associated with the email address johndoe@email.com, also associated with John Doe. In this example, the set of ingestion modules 258 tag the location with the phone number "+1-555-555-5555," tag the heartrate with the email address "johndoe@email.com," and associate both the location and the heartrate with John Doe in the clearinghouse databases 257.

In some embodiments, as depicted in FIG. 2, the clearinghouse 250 includes a set of retrieval modules 259. The set of retrieval modules 259 optionally include a location retrieval module 254, an additional data retrieval module 255, and one or more other data retrieval modules 256. In some embodiments, any of the location retrieval module 254, additional data retrieval module 255, or other data retrieval modules 256 may be included in one single module. In some embodiments, the location retrieval module 254 is an interface for retrieving location data from the clearinghouse databases 257. In some embodiments, the location retrieval module 254 is a JSON REST API that receives a query or request (e.g., in the form of an HTTP GET request) from a requesting party (e.g., an emergency data recipient 263, such as an ESP 230 or ESP device 210B). In some embodiments, an emergency data recipient 263 is an ESP device 210B, such as a first responder's mobile phone or tablet device or an ESP console (e.g., a computer) at an ESP 230, as described above. In some embodiments, the request is sent from a call-taking application (e.g., call taking module 145) integrated into the ESP system 130. In some embodiments, the location retrieval module 254 provides a single GET endpoint for retrieving either the latest or paginated list of locations for a specific caller ID (e.g., an identifier of a user or an electronic device associated with a user, such as a phone number). For example, as described above, a phone number associated with a device 210A from which a location was received is included in the header, body, or metadata of the request sent to the location retrieval module 254. The clearinghouse 250 then retrieves a location or set of locations from the clearinghouse databases 257 and delivers the location or set of locations to the requesting party (e.g., an emergency data recipient 263). In some embodiments, the location retrieval module 254 is a location information server (LIS). In some embodiments, the LIS is a NG911 standards-based XML API for the retrieval of location data from the clearinghouse databases 257. In some embodiments, as described above, the location retrieval module 254 accepts HELD requests from requesting parties and returns location data for a specific caller ID or anonymous reference. In some embodiments, a location or set of locations retrieved from the clearinghouse can be transmitted to an ESP 230 before it is subsequently sent from the ESP 230 to an ESP device 210B.

As depicted in FIG. 2, the set of retrieval modules 259 optionally include an additional data retrieval module 255. In some embodiments, the additional data retrieval module 255 is a JSON REST API for the retrieval of emergency or additional data. As described above, additional data optionally includes medical data, personal data, demographic data, and health data. Additional data also optionally includes data received from connected devices such as vehicles, IoT devices, and wearable devices. In some embodiments, the additional data retrieval module 255 receives a query or request (e.g., in the form of an HTTP GET request) from a requesting party (e.g., an emergency data recipient 263, such as an ESP 230 or ESP device 210B). The additional data then retrieves additional data associated with a specific or particular identifier of a user or an electronic device associated with the user, such as a phone number, and returns the data to the requesting party (e.g., an emergency data recipient 263). In some embodiments, the set of retrieval modules 259 further includes one or more other data retrieval modules 256, which function similarly to the location retrieval module 254 and additional data retrieval module 255, for the retrieval of data stored in the clearinghouse databases 257 not retrieved by the location retrieval module 254 or additional data retrieval module 255. In some embodiments, additional data retrieved from the clearinghouse can be transmitted to an ESP 230 before it is subsequently sent from the ESP 230 to an ESP device 210B.

In some embodiments, a retrieval module within the set of retrieval modules 259 and a corresponding ingestion module within the set of ingestion modules 258 form a sub-clearinghouse. For example, in some embodiments, location ingestion module 251 and location retrieval module 254 combine to form location clearinghouse 150A (as shown in FIG. 1B). Likewise, in some embodiments, additional data ingestion module 252 and additional data retrieval module 255 combine to form additional data clearinghouse 150B. In some embodiments, a requesting party is only given access to a particular sub-clearinghouse. For example, a police officer is only given access to the location clearinghouse 150A, while an EMT (emergency medical technician) is only given access to the additional data clearinghouse 150B. However, a requesting party can be given differential access to the clearinghouse 250, sub-clearinghouses, particular emergency data fields, or particular emergency data categories within the clearinghouse 250 based on any factor or set of factors.

Emergency Data Subscription

As described above, in some embodiments, an emergency management system (EMS) maintains a clearinghouse 250 that obtains and shares emergency data to aid emergency service providers (ESPs) in responding to emergencies. During an emergency, in some embodiments, an emergency data recipient 263 (e.g., an ESP 230 or ESP device 210B) can send an emergency data request to the EMS, and, in response, the EMS can send any available emergency data associated with the emergency to the emergency data recipient 263. In some embodiments, as described above, the emergency data recipient 263 includes an identifier associated with an emergency alert in the emergency data request. The EMS can then use the identifier associated with the emergency alert to retrieve emergency data associated with the emergency alert from the clearinghouse. For example, as described above, an ESP 230 (e.g., a public safety answering point (PSAP)) can receive an emergency alert in the form of a 9-1-1 phone call (representative of an emergency or potential emergency) from a mobile phone associated with a phone number (e.g., (555) 555-5555). The ESP 230 can then send an emergency data request including the phone number (e.g., the identifier of the emergency alert) to the EMS, which can then retrieve any emergency data within the clearinghouse associated with the phone number and return the available emergency data to the requesting ESP 230. This process of returning emergency data to an emergency data recipient 263 in response to an emergency data request is referred to as "pulling" emergency data from the clearinghouse.

However, in some embodiments, the EMS can "push" emergency data from the clearinghouse 250 to an emergency data recipient 263 (e.g., the EMS can send emergency data to an emergency data recipient 263 without receiving an emergency data request). In some embodiments, the EMS pushes emergency data to emergency data recipients 263 using an emergency data subscription system. Using the emergency data subscription, a recipient (or potential recipient) of emergency data from the clearinghouse 250 can subscribe to the clearinghouse 250 for a particular device identifier, user identifier, or ESP account (hereinafter, "subscription"). After subscribing to a subscription, the recipient (e.g., an ESP 230 or an ESP device 210B) may automatically receive updates regarding the subscription without first sending an emergency data request. For example, in some embodiments, if an ESP 230 subscribes to a phone number, whenever the clearinghouse 250 receives updated emergency data associated with the phone number, the clearinghouse 250 can automatically send the updated emergency data associated with the phone number to the ESP 230, without first receiving an emergency data request including the phone number. For example, in some embodiments, if a recipient is subscribed to a particular phone number, and the clearinghouse 250 receives a new or updated location associated with the particular phone number, the clearinghouse 250 will instantly and automatically push the new or updated location associated with the particular phone number to the recipient the moment that the new or updated location is received by the clearinghouse 250, without the recipient having to send an emergency data request. In some embodiments, the EMS establishes a websocket connection with an emergency data recipient 263 in order to push emergency data regarding a subscription to which the emergency data recipient 263 is subscribed. WebSocket is a type of computer communications protocol. A websocket connection is a longstanding internet connection between a client and a server that allows for bidirectional communication between the client and server without the client needing to send data requests to the server, which differentiates the WebSocket computer communications protocol from other types of computer communications protocols such as the HyperTextual Transfer Protocol (HTTP). The WebSocket protocol is often used by chat clients to facilitate user to user webchats. In some embodiments, the EMS establishes a websocket connection with an emergency data recipient 263 (e.g., an ESP 230) in response to receiving an emergency data request. In some embodiments, the EMS establishes a websocket connection with an ESP 230 when an ESP personnel logs into an ESP console. In some embodiments, the EMS establishes a websocket connection with an emergency data recipient 263 when an ESP personnel logs into an emergency response application at an ESP device 210B. In some embodiments a websocket connection established between the EMS and an emergency data recipient 263 is maintained by the EMS for the duration of the ESP personnel's log-in session.

In some embodiments, the EMS automatically subscribes a recipient to a subscription (e.g., a particular device identifier or user identifier) in response to receiving an emergency data request including the subscription or an identifier of the subscription. For example, in some embodiments, when an ESP personnel sends an emergency data request including a phone number to the EMS through their ESP console, the EMS subscribes the ESP personnel to the phone number and establishes a websocket connection with the ESP console. Then, whenever the clearinghouse 250 receives updated emergency data associated with the phone number, the EMS can automatically push the updated emergency data associated with the phone number to the ESP console. For example, an ESP personnel logs into an emergency response application in communication with the EMS on the ESP personnel's ESP console. Subsequently, the ESP personnel receives a 9-1-1 call from a mobile phone and then generates and sends an emergency data request including the phone number of the mobile phone to the EMS through the emergency response application. The EMS then uses the phone number of the mobile phone to retrieve the most recent location associated with the mobile phone received by the clearinghouse and returns the most recent location associated with the mobile phone to the ESP personnel through the emergency response application. The EMS simultaneously subscribes the ESP personnel to the phone number of the mobile phone and establishes a websocket connection between the EMS and the ESP console and automatically pushes any updated emergency data (e.g., locations) associated with the phone number received by the clearinghouse to the emergency response application as soon as the updated emergency data associated with the phone number is received by the clearinghouse 250.

In some embodiments, an ESP is associated with a unique ESP account ID that an ESP 230, ESP personnel, or ESP device 210B can subscribe to. The EMS can then establish a websocket connection with an emergency data recipient 263 subscribed to the unique ESP account ID and push emergency data associated with the unique ESP account ID to the emergency data recipient 263 whenever new or updated emergency data associated with the unique ESP account ID is received by the clearinghouse 250. For example, in some embodiments, when the clearinghouse 250 receives a location associated with an emergency alert (e.g., when a person calls 9-1-1 from a mobile phone and the mobile phone responsively sends a current location of the mobile phone to the clearinghouse 250), the EMS retrieves one or more geofences (as described below) associated with each ESP registered with the EMS and determines which (if any) of the geofences that the location associated with the emergency alert falls within. The EMS then tags the location associated with the emergency alert with the unique ESP account IDs associated with each of the ESPs associated with geofences that the location associated with the emergency alert falls within. For example, if four ESPs are registered with the EMS—ESP A, ESP B, ESP C, and ESP D—and the clearinghouse 250 receives a location associated with an emergency that falls within the one or more of the geofences associated with ESP A and ESP D, the EMS can tag the location associated with the emergency alert with the unique ESP account ID associated with ESP A and the unique ESP account ID associated with ESP D. The EMS can then push the location associated with the emergency alert to any ESPs or ESP personnel with an established websocket connection with the EMS and currently subscribed to either the unique ESP account ID for ESP A or the unique ESP account ID for ESP D. In some embodiments, when an ESP personnel logs into the emergency response application or their ESP console, a communication is sent to the EMS that includes one or more unique ESP account IDs that the ESP personnel or their respective ESP is currently subscribed to.

Emergency Data Geofencing

Figure 3:
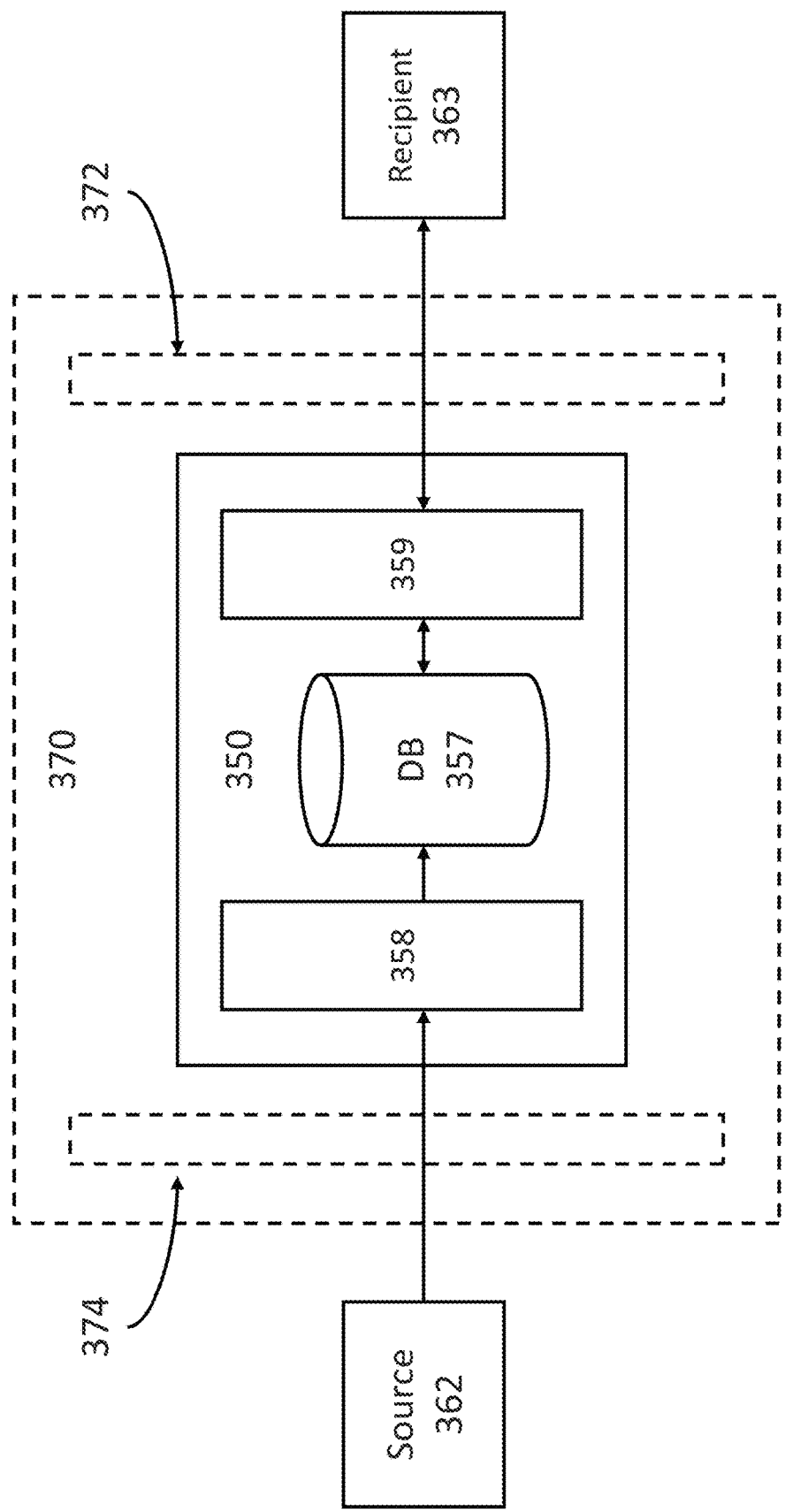
FIG. 3 depicts a diagram of a geofence system applied to a clearinghouse for emergency data in accordance with one embodiment of the present disclosure.

FIG. 3 depicts a diagram of a geofence applied to a clearinghouse for emergency data in accordance with one embodiment of the present invention. In some embodiments, an administrator of an ESP is required to submit a geospatial representation (e.g., a geofence) of a region that the ESP serves before the ESP or a device associated with the ESP can receive data from the clearinghouse. In some embodiments, a geofence module 370 is applied to the clearinghouse 350 to protect potentially sensitive emergency data using geospatial analysis. In some embodiments, as described above with respect to FIG. 2, the clearinghouse 350 includes a set of ingestion modules 358 and a set of retrieval modules 359. The set of ingestion modules can receive emergency data, or other information that can be useful in responding to an emergency, from a variety of sources. For example, in some embodiments, a smartphone sends emergency data to the clearinghouse 350 in the form of an HTTP POST API call in response to a user of the smartphone initiating a 911 emergency call. As depicted in FIG. 3, in some embodiments, when emergency data (e.g., an emergency location or additional emergency data) is sent from an emergency data source 362 to the clearinghouse 350, the emergency data is first processed by a geofence module 370 before being received by the set of ingestion modules 358 within the clearinghouse 350. Similarly, in some embodiments, when an emergency data request is sent from an emergency data recipient 363, the emergency data request is processed by the geofence module 370 before being received by the set of retrieval modules 359 for display on at a computing device of the requesting party.

In some embodiments, as mentioned above, a geofence module 370 is applied to the clearinghouse 350 to protect potentially sensitive emergency data using geofences. Generally, a geofence is a virtual perimeter for a real-world geographic area. A geofence can be dynamically generated—as in a radius around a point location—or a geofence can be a predefined set of boundaries (such as school zones or neighborhood boundaries). The use of a geofence is called geofencing, and one example of usage involves a location-aware device of a location-based service (LBS) user entering or exiting a geofence. Entry or exit from a geofence could trigger an alert to the device's user as well as messaging to the geofence operator. The geofence information, which could contain the location of the device, could be sent to a mobile telephone or an email account.

For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP) or a public safety service (PSS; e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

Geofences can be defined in various ways. For example, in some embodiments, a geofence comprises one or more of the following: a county boundary, a state boundary, a collection of postal/zip codes, a collection of cell sectors, simple shapes, complex polygons, or other shapes or areas. In some embodiments, geofences comprise approximations where the "approximated" geofence encloses an approximation of the authoritative region.

Updates to geofences may be required over time because the authoritative regions may change over time. Geofences may change over time (e.g., a new sub-division has cropped up) and require updates. In some embodiments, the systems and methods described herein allow geofences to be updated (e.g., a PSAP administrator can upload updated geofence GIS shapefiles).

For maintaining the privacy, security and integrity of the data, geofencing may be applied to emergency data. For example, applying geofence filters to the emergency data allows additional avenues for monitoring, both visibility and control, over the clearinghouse to detect anomalies/spikes and reduce the risk of security breaches.

In some embodiments, the emergency data is obtained from an emergency data source 362 (such as an electronic device or third-party server, as described above). On the retrieval side, in some embodiments, an emergency data recipient 363 accesses the clearinghouse 350 by sending an emergency data request to the clearinghouse 350, as described above. An ingestion geofence 374 (also referred to as "upstream filtering") is applied to restrict sending of data from emergency data sources 362 to the clearinghouse 350 from geographical areas that are not covered by the "combined authoritative jurisdiction" (e.g., covered one or more provisioned geofences in the geofence database (not shown)). In some embodiments, the ingestion geofence (also referred to as an "ingress filter") is applied to the ingestion module 358 to protect against accidental breaches of privacy. In some embodiments, the ingestion module 358 of the clearinghouse 350 drops location payloads that do fall within the geographical region covered by the "combined authoritative region."

In some embodiments, the clearinghouse 350 comprises one or more databases 357 (e.g., a database storing emergency data). For example, in some embodiments, the retrieval module 359 obtains emergency data from a clearinghouse database 357 to send to an emergency data recipient 363 (e.g., an ESP) in response to an emergency data request, as described above. In some embodiments, the retrieval geofence 372 (also referred to as an "egress filter") is applied at the retrieval module 359 of the clearinghouse 350. Applying geofencing to retrieved emergency data will protect against abuse and limit the scope of security breaches in cases where credentials have been compromised. In some embodiments, one or more geofences are associated with one or more credentials associated with an ESP agency or organization. In some embodiments, the credentials associated with an ESP agency or organization confers authorization to access data such as emergency data from the clearinghouse. In some embodiments, specific authorization to access data is granted individually to members of a PSAP through tokens derived from the credentials for that PSAP.

In some embodiments, when the retrieval module 359 checks the coordinates of current location data (within retrieved emergency data) associated with a device identifier with the geofence(s) associated with the credentials in an emergency data request. If the current location is within the geofence region (enclosed by the geofence(s)), the current location is returned to the ESP and displayed within the ESP console. If not, the module 359 will return a "not found" message (as opposed to the retrieved location is outside the geofence) to protect privacy.

In some embodiments, geofences can be used for reporting results for internal metrics and monitoring the system. For example, the number of emergency data requests, locations provided, "no location found" etc., can be obtained for a geofence(s) associated with a PSAP. Using single or combined geofences, the emergency data can be obtained on county-wide, city-wide, postal code, course grid (rectangle overlay), state-wide, or country-wide basis. In some embodiments, ingress and egress counters (e.g., percent of emergency sessions where the location data was received, but not queried) and other similar metrics can be calculated and analyzed to identify problems and spikes. In some embodiments, different geofences are used for retrieval and for reporting.

In some embodiments, a buffer (e.g., +10 km) is added to the geofence(s) so that results within the buffer zone are also returned. In many cases, PSAPs have discretion and incentive to respond to emergencies that are beyond their authoritative jurisdiction. As an example, a geofence that is a circular area with a radius of 10 km would have an area of 100 π or ~314 km2, whereas the same area with a 10 km buffer around its circumference would have yield a combined radius of 20 km and a combined area of 400 π or ~1256 km2. In some embodiments, the buffer is from 0.5 km to 5 km, from 0.5 km to 10 km, from 0.5 km to 15 km, from 0.5 km to 20 km, from 0.5 km to 25 km, or from 0.5 km to 30 km. In some embodiments, the buffer is from 1 km to 5 km, from 1 km to 10 km, from 1 km to 15 km, from 1 km to 20 km, or from 1 km to 30 km. In some embodiments, the buffer is at least 0.1 km, at least 0.2 km, at least 0.3 km, at least 0.4 km, at least 0.5 km, at least 0.6 km, at least 0.7 km, at least 0.8 km, at least 0.9 km, at least 1 km, at least 2 km, at least 3 km, at least 4 km, at least 5 km, at least 6 km, at least 7 km, at least 8 km, at least 9 km, at least 10 km, at least 11 km, at least 12 km, at least 9 km, at least 14 km, at least 15 km, at least 16 km, at least 17 km, at least 18 km, at least 19 km, at least 20 km, at least 25 km, or at least 30 km. In some embodiments, the buffer is no more than 0.1 km, no more than 0.2 km, no more than 0.3 km, no more than 0.4 km, no more than 0.5 km, no more than 0.6 km, no more than 0.7 km, no more than 0.8 km, no more than 0.9 km, no more than 1 km, no more than 2 km, no more than 3 km, no more than 4 km, no more than 5 km, no more than 6 km, no more than 7 km, no more than 8 km, no more than 9 km, no more than 10 km, no more than 11 km, no more than 12 km, no more than 9 km, no more than 14 km, no more than 15 km, no more than 16 km, no more than 17 km, no more than 18 km, no more than 19 km, no more than 20 km, no more than 25 km, or no more than 30 km.

Figure 4:
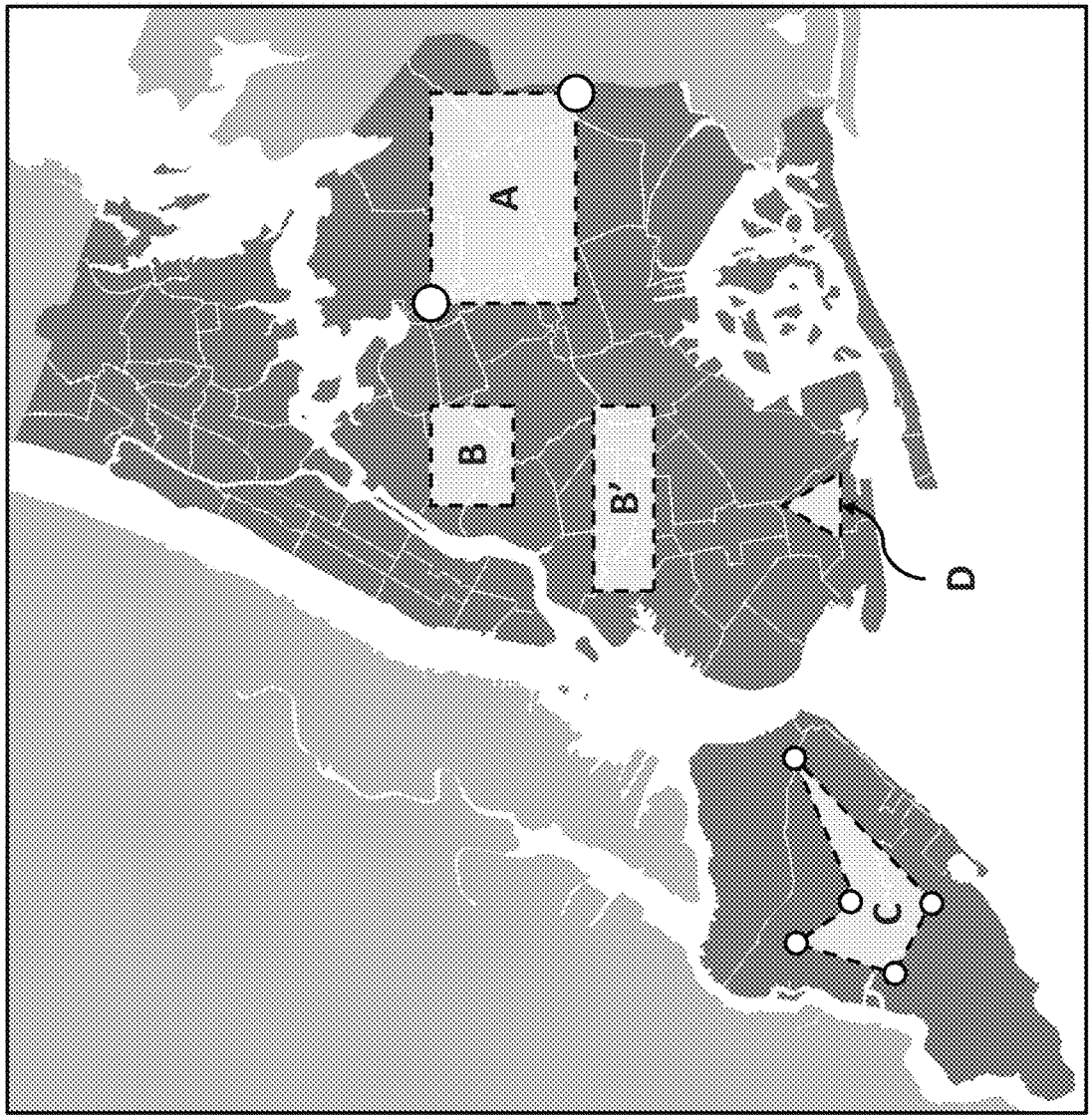
FIG. 4 illustrates various embodiments of geofences in accordance with one embodiment of the present disclosure.

FIG. 4 illustrates examples of geofence approximations that can be submitted as an "authoritative jurisdiction" for a PSAP. One or more geofences enclose the geofenced region which is under the authoritative jurisdiction of a PSAP. In some cases, the geofenced region is a complex polygon, and is optionally approximated using an appropriate simpler shape. For example, a rectangle (A), two disjointed rectangles (B, B'), a polygon with several sides (C) and a triangle (D), may represent different geofenced regions (defined by one or more geofences).

In some embodiments, an administrator of a PSAP submits the complex authoritative jurisdiction as one or more approximate geofence(s) by specifying points. For example, the PSAP administrator can submit geofenced region A by specifying two points—the north-west corner and the south-east corner using a drawing tool provided by the GUI of the emergency response application. In this example, the two points of the geofenced region are set using two latitude-longitude coordinates. In another example, the multiple-sided polygon C is submitted by specifying the five corners. In some embodiments, a PSAP administrator approximates a geofence for a PSAP by drawing one or more polygons using a drawing tool provided by the GUI of the emergency response application. In some embodiments, a geofence is generated using a series of points that are connected (e.g., entering three longitude-latitude points on a map to form a triangular geofence).

Approximating a complex geofenced region has several advantages. The geofence(s) are simple and the calculations can be quicker and less cumbersome for applications where exact calculations are not needed.

In some embodiments, a PSAP administrator can submit a GIS file (e.g., a shapefile) that represents the actual authoritative jurisdiction of the PSAP, which may then be provisioned in a geofence database. It is appreciated that a GIS file defining the authoritative jurisdiction may be saved in one or more industry-acceptable formats such as a shapefile, a GeoJSON file, KML file, etc. In some embodiments, the GIS file includes one or more features such as points, lines, polygons, density, and other shapes. A GeoJSON is open standard GIS file representing geographical features and non-spatial attributes based on JavaScript Object Notation. Some features can include points (such as addresses and locations), line strings (streets, highways and boundaries), polygons (countries, provinces, tracts of land), and multi-part collections of these types. A Keyhole Markup Language (KML) file includes geographic annotations and visualization on internet-based maps on Earth browsers. A shapefile is a vector data format for storing the location, shape, and attributes of geographic features. A shapefile is stored in a set of related files, each of which may contain one feature class (e.g., lines, points, polygons, etc.). In some embodiments, the shapefile is a file with extension .SHP in ESRI file format where SHP is the feature geometry, SHX is the shape index position and DBF is the attribute data.

Various embodiments of the geofence database are contemplated. In some embodiments, one or more databases are searchable using a PSAP identifier, credentials, or other information. In some embodiments, an emergency location is searched through several geofences in the geofence database. In some cases, the geofenced region is shrunk for ease of storage and to simplify calculations.

Victim Identification

As mentioned above, provided herein are systems, servers, devices, methods, and media for identifying a person in an emergency (also referred to as a "victim"). In some embodiments, as described above, an emergency management system (EMS) can receive data (e.g., emergency data) before, during, or after an emergency that may assist emergency service providers (ESPs) in responding to the emergency. To this end, the EMS can provide and maintain a clearinghouse (as described above) that can receive emergency data, store the emergency data in one or more databases, and provide the emergency data to ESPs, either automatically or upon request. For example, in some embodiments, when a person in an emergency calls 9-1-1 from a communication device, the communication device can send a location and any additional data about the person or the emergency (e.g., demographic information about the person) to the clearinghouse. In some embodiments, the EMS (or clearinghouse) can then autonomously determine an appropriate emergency data recipient (e.g., an ESP or an ESP device, such as a first responder's device) to send the location and additional data to (e.g., a public safety answering point (PSAP) nearest to the location) by using the location received from the communication device (e.g., by comparing the location received from the communication device to one or more geofences associated with one or more ESPs, as described below). The EMS (or clearinghouse) can then transmit the location and additional data to the appropriate ESP accordingly. However, the EMS (or clearinghouse) can determine an appropriate emergency data recipient through any other means. In some embodiments, the clearinghouse determines an appropriate emergency data recipient by waiting until it receives an emergency data request from an emergency data recipient. However, there are a number of situations in which determining an appropriate emergency data recipient for a particular emergency presents significant challenges, specifically (a) when the person who triggered an emergency alert (e.g., by calling 9-1-1 or activating a panic button on an electronic device) is not the actual person experiencing the emergency (e.g., when a bystander happens upon a person passed out on the ground and calls 9-1-1 on their behalf), (b) when the emergency data recipient is a first responder's device, or (c) both (a) and (b). In such a situation, the EMS must identify the victim (e.g., the person actually experiencing the emergency) and/or a first responder providing care to the victim in order to determine the appropriate emergency data recipient for the emergency.

Figure 5:
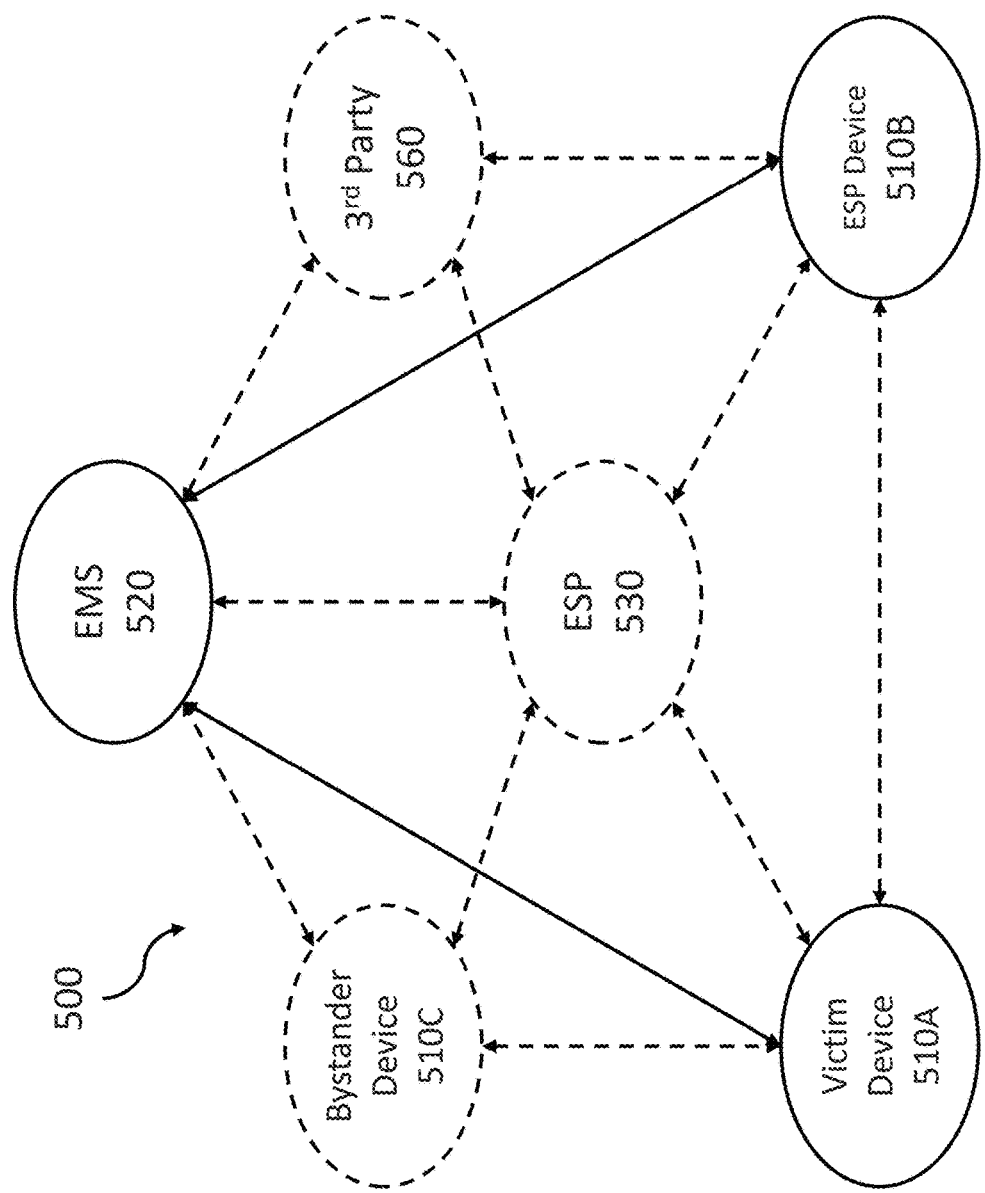
FIG. 5 depicts a diagram of a system for providing emergency assistance by an emergency management system (EMS) in accordance with one embodiment of the present disclosure.

FIG. 5 depicts a diagram of a system 500 for providing emergency assistance by an emergency management system (EMS). Specifically, the system 500 can be used to identify victims (e.g., people in emergencies), identify first responders responding to emergencies, determine appropriate emergency data recipients for specific emergencies, gather emergency data associated with victims, and transmit emergency data to the appropriate emergency data recipients. In some embodiments, the system 500 includes an emergency management system (EMS) 530 (as described above), a victim device 510A, and an ESP device 510B. In some embodiments, the system 500 alternatively or additionally includes an emergency service provider (ESP) 530 (as described above), a bystander device 510C, or a third-party server 560 (as described above). In some embodiments, the EPS device 510B is an ESP console at an ESP 230, such as the computer of a call-taker at a public safety answering point (PSAP). In some embodiments, the ESP device 510B is a personal electronic device of an ESP personnel, such as a first responder's electronic device (e.g., a mobile phone or a tablet device). In some embodiments, the ESP device 510B includes an emergency response application installed on the ESP device 510B, such as a call-taking or CAD program installed on a computer at a PSAP or a mobile application (e.g., an electronic patient care report (ePCR) application, as described below) installed on a mobile device (e.g., a mobile phone or tablet). In some embodiments, the victim device 510A or bystander device 510B is a communication device, such as a mobile phone. In some embodiments, the victim device 510A or bystander device 510B is a wearable device, such as a smartwatch.

As mentioned above, in some embodiments, an EMS 520 can provide and maintain a clearinghouse that can receive emergency data, store the emergency data in one or more databases, and provided the emergency data to emergency data recipients (e.g., an ESP 530 or an ESP device 510B, such as a first responder's electronic device), either automatically or upon request. For example, in some embodiments, when a person in an emergency (hereinafter, "victim") makes an emergency call from their victim device 510A (e.g., by dialing 9-1-1 on the person's mobile phone), ESP 530 receives the emergency call from the telephone number associated with the victim device 510A. The ESP 530 can then send an emergency data request including the telephone number associated with the victim device 510A to the EMS 520. Then, in response to receiving the emergency data request from the ESP 530, the EMS 520 retrieves emergency data associated with the telephone number associated with the victim device 510A (e.g., medical information about the victim, such as the victim's blood type, pre-existing medical conditions, or allergies) and transmits the emergency data to the ESP 530, which the ESP 530 can then use to be more prepared to provide emergency care to the victim. However, when someone who is not the victim (hereinafter, a "bystander") makes an emergency call on behalf of the victim from their bystander device 510C, the ESP 530 receives the emergency call from the telephone number associated with the bystander device 510C. If the ESP 530 then sends an emergency data request including the telephone number associated with the bystander device 510C to the EMS 520, the EMS 520 would only be able to retrieve emergency data associated with the telephone number associated with the bystander device 510C, which would likely not be helpful to the ESP 530 in providing emergency care to the victim. Conversely, the ESP 530 would not receive the emergency data associated with the victim (e.g., medical information about the victim) that likely could be helpful to the ESP 530 in providing emergency care to the victim.

Figure 6A:
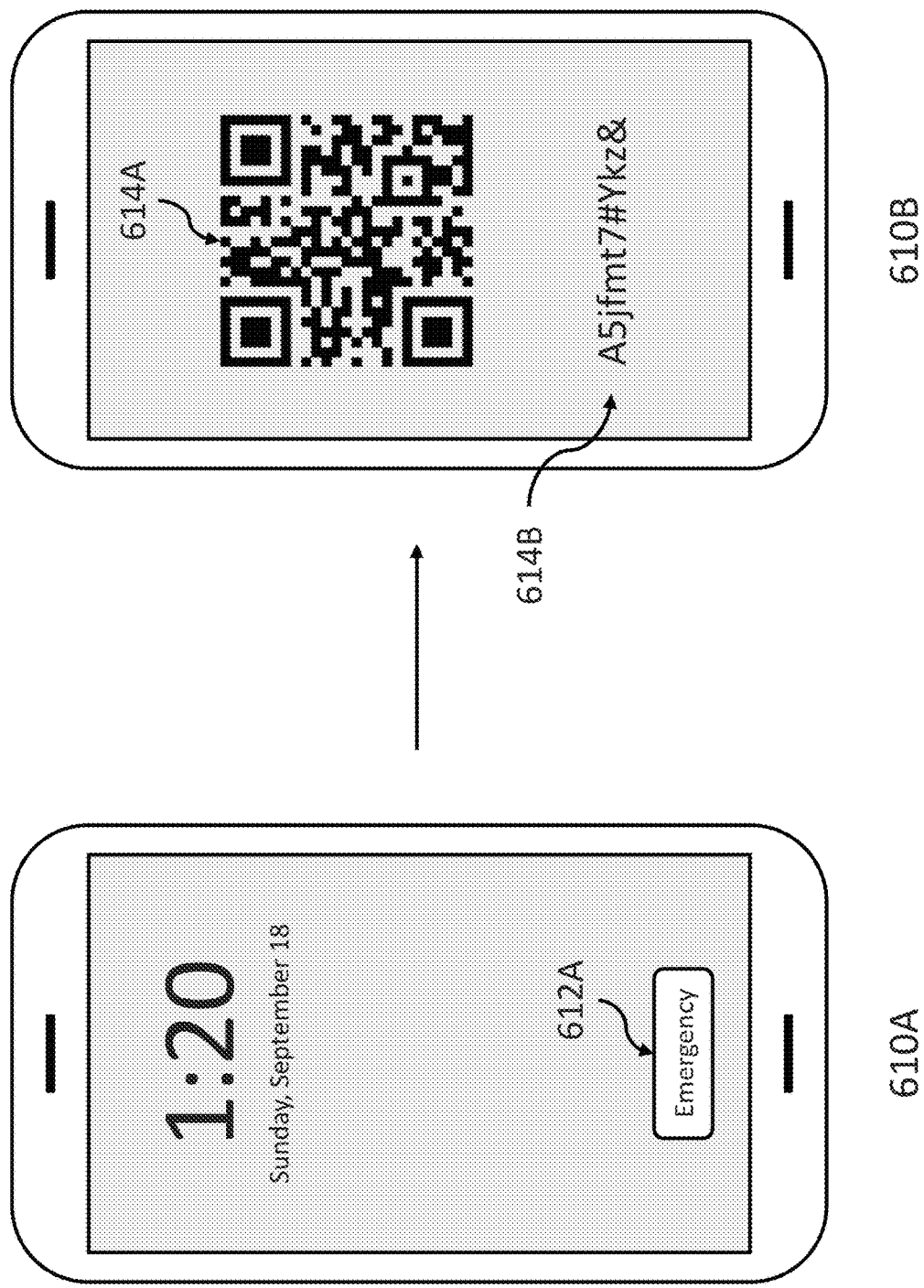
FIGS. 6A and 6B illustrate various embodiments of a victim code in accordance with one embodiment of the present disclosure.
Figure 6B:
Figure 6B:
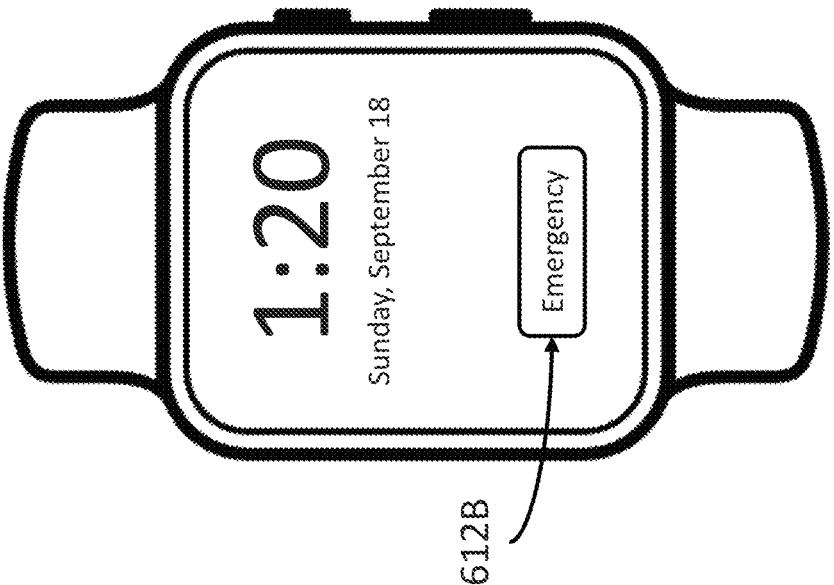

Thus, it is desirable to provide a mechanism for identifying victims when an emergency call has been made on their behalf by a bystander device 510C or when victims are found by emergency responders. FIG. 6A depicts an embodiment of a victim code provided by an emergency management system (EMS). In some embodiments, a victim code is a type of unique code or unique identifier that is associated with a victim. For example, in some embodiments, the victim code is associated with a victim device 610 or an identifier of a victim device 610, such as a phone number associated with the victim device 610. In some embodiments, the victim code is generated or displayed in the form of a barcode or a matrix barcode, such as a QR code 614A. In some embodiments, the victim code is generated or displayed in the form of an alphanumeric code 614B. In some embodiments, the victim code 614 is displayed at a victim device 610B. In some embodiments, the victim code is displayed at a victim device 610B when the victim device 610B enters an emergency mode, such as when a user navigates to a "Medical ID" screen. In some embodiments, a Medical ID screen is a screen that displays critical information about a user or owner of an electronic device that first responders can access and use in the event of an emergency, information such as name, age, date of birth, pre-existing medical conditions, allergies, medications, blood type, weight, height, emergency contacts, and whether or not the person is an organ donor. In some embodiments, a user or owner of an electronic device submits the information displayed on the Medical ID screen prior to an emergency, such as during the initial setup of the electronic device. In some embodiments, a user can navigate to a Medical ID screen from the lock screen of a victim device 610A without having to unlock the victim device 610, such as by clicking on an emergency button 612A. In some embodiments, the victim identifier 614 is locally stored on the victim device 610. In some embodiments, the victim code 614 is randomly generated and transmitted to a victim device 610 by the EMS when a user navigates to a Medical ID screen on the victim device 610. However, a victim code may be displayed within any screen on an electronic device or application executed on an electronic device. In some embodiments, the victim code 614 is temporary and expires after a predetermined duration of time after the victim code 614 is generated by the EMS, which may be important for protecting the privacy and security of a victim. In some embodiments, a victim code generated for a person is permanent or static, such that it may be printed out and worn by a victim as a tag or etched onto a bracelet. In some embodiments, as depicted by FIG. 6B, when the victim device 610 is a wearable device (e.g., a smartwatch), the victim code 614C may be displayed at the wearable device 610D. In some embodiments, a user may navigate to the victim code 614C by selecting an emergency button 612B from a main or home screen on the wearable device 610C. In some embodiments, other forms of identification may be used as a victim code, such as a driver's license number.

In some embodiments of the system 500, if a bystander happens upon a victim (or, for example, if a loved one is nearby when a relative experiences an emergency) the bystander can make an emergency call on their bystander device 510C on behalf of the victim. An ESP 530 receives the emergency call associated with the telephone number (or any other form of identifier) associated with the bystander device 510C. The ESP 530 can then send an emergency data request including the telephone number associated with the bystander device 510C to the EMS 520. The bystander can then access the victim's victim device 510A (for example, by finding the victim device 510A in the victim's bag or pocket) and navigate to a Medical ID screen on the victim device 510A. In some embodiments, when the bystander navigates to the Medical ID screen on the victim device 510A, the victim device 510A displays a victim code associated with the victim, an identifier of the victim (e.g., a telephone number or email address), or the victim device 510A. The bystander can then input the victim code into their bystander device 510C, such as by scanning the victim code with a camera or optical sensor on the bystander device 510C or by typing the victim code into an application on the bystander device 510C. In response to the bystander inputting the victim code into the bystander device 510C, the bystander device 510C sends a notification to the EMS 520 including both an identifier of the bystander device 510C (e.g., the telephone number associated with the bystander device 510C) and the victim code, which the EMS 520 can then temporarily associate with each other. The EMS 520, having received an emergency data request including the telephone number associated with the bystander device 510C from the ESP 530, then determines that the ESP 530 is requesting emergency data associated with the emergency that the victim is experiencing, gathers emergency data associated with the victim (e.g., emergency data associated with the phone number associated with the victim device), and returns the emergency data associated with the victim to the ESP 530. A bystander may also input the victim code into their bystander device 510C, thereby sending the notification including the identifier of the bystander device 510C and the victim code to the EMS 520, before the EMS 520 receives the emergency data request from the ESP 530. In some embodiments, if a bystander has not yet made an emergency call using their bystander device 510C, inputting the victim code into the bystander device 510C prompts the bystander device 510C to both send the notification including the identifier of the bystander device 510C and the victim code to the EMS 520 and initiate an emergency call simultaneously.

In some embodiments of the system 500, when a victim makes an emergency call (e.g., by calling 9-1-1) or otherwise generates an emergency alert (e.g., by selecting a panic button) from their victim device 510A, the victim device 510A sends an emergency alert to the EMS 520. The emergency alert includes an identifier of the victim or the victim device 510A (e.g., a telephone number associated with the victim device 510A or the victim's email address). In some embodiments, the emergency alert includes additional data regarding the victim or the victim's emergency, as described above. In some embodiments, the emergency alert includes a location (e.g., a location generated by the victim device 510A, also referred to as a "device location"). In some embodiments, after receiving the emergency alert, the EMS 520 determines an appropriate emergency data recipient to send emergency data associated with the victim to, gathers emergency data associated with the victim, and transmits the emergency data associated with the victim to the appropriate emergency data recipient, as described above. For example, in some embodiments, the EMS 520 uses the location included in the emergency alert to determine an appropriate ESP 530 to send the emergency data to. In some embodiments, after the EMS 520 determines an appropriate ESP 530 for the emergency data associated with the victim and transmits the emergency data to the ESP 530, the ESP 530 can then send the emergency data associated with the victim to one or more ESP devices 510B (e.g., first responder devices) associated with first responders sent to provide emergency care to the victim. In another example, in some embodiments, the EMS 520 uses the location included in the emergency alert to determine an appropriate ESP device 510B, such as a first responder's mobile phone, to send the emergency data to. In some embodiments, the EMS 520 accesses a database of first responder information and determines one or more first responders proximal to the location included in the emergency alert. The EMS 520 can then send the emergency data directly to the one or more first responders (e.g., directly to their respective ESP devices 510B). In some embodiments, the database of first responder information is included in the EMS 520. In some embodiments, the database of first responder information is included in the third-party server system 560. In some embodiments, the EMS 520 receives contact information for one or more first responders sent to provide care to a victim from the ESP 530 and then uses the contact information to transmit emergency data associated with the victim directly to the one or more first responders.

However, in some embodiments of the system 500, the EMS 520 is unable to access a database of first responder information and unable to receive contact information for first responders from an ESP 530. Furthermore, in some embodiments of the system 500, a first responder may come across a victim before an emergency alert has been sent to the EMS 520 or even without an emergency alert having been sent to the EMS 520, for example, when a first responder arrives at the scene of a car crash and there are multiple victims but only one victim called 9-1-1. In such embodiments, the EMS can use a victim code to determine an appropriate ESP device 510B (e.g., a first responder's device) to transmit emergency data to. For example, in some embodiments, when a first responder arrives at the scene of an emergency and finds a victim in need, the first responder can access the victim's victim device 510A (for example, by finding the victim device 510A in the victim's bag or pocket) and navigate to a Medical ID screen on the victim device 510A. In some embodiments, when the first responder navigates to the Medical ID screen on the victim device 510A, the victim device 510A displays a victim code associated with the victim, an identifier of the victim (e.g., a telephone number or email address), or the victim device 510A. The first responder can then input the victim code into their ESP device 510B, such as by scanning the victim code with a camera or optical sensor on the ESP device 510B or by typing the victim code into an application (e.g., an emergency response application or an electronic patient care report (ePCR) application, as described below) on the ESP device 510B. In response to the first responder inputting the victim code into the ESP device 510B, the ESP device 510B sends an emergency data request including the victim code to the EMS 520. In this way, the EMS 520 determines that the ESP device 510B is the appropriate emergency data recipient for emergency data associated with the victim. The EMS 520 can then gather emergency data associated with the victim code and transmit the emergency data associated with the victim to the ESP device 510B. The first responder can then use the emergency data associated with the victim to provide emergency care to the victim.

In some embodiments of the system 500, when the EMS 520 is gathering emergency data associated with a victim, either automatically (e.g., after receiving an emergency alert) or in response to an emergency data request from an emergency data recipient (e.g., an ESP 530 or ESP device 510B), the EMS 520 uses an identifier associated with the victim (e.g., a victim code, a phone number, an email address, etc.) to query a third-party server 560 for emergency data associated with the victim, as described above. For example, in some embodiments, the EMS 520 can query the third-party server 560 of a medical information database using an identifier associated with the victim. The third-party server 560 can then return, from the medical information database, any available medical information associated with the victim to the EMS 520. The EMS 520 can then transmit the medical information associated with the victim to an emergency data recipient, which can then use the medical information associated with the victim to provide emergency care to the victim. In some embodiments, instead of receiving emergency data associated with a victim from a third-party server 560 and then transmitting the emergency data associated with the victim to an appropriate emergency data recipient, the EMS 520 can point the third-party server 560 to the appropriate emergency data recipient (such as by providing the third-party server 560 with contact information for the appropriate emergency data recipient), and the third-party server 560 can transmit the emergency data associated with the victim to the appropriate emergency data recipient independently.

In-Network Routing

In some embodiments of the system 500 (as depicted in FIG. 5), the EMS 520 can determine preferred medical service providers for a victim experiencing an emergency. Generally, when first responders take a victim to a medical service provider (e.g., when they drive a victim to a hospital in an ambulance), a victim has the right to choose which medical service provider they are taken to, within reason. However, if a victim is in a location that they are not familiar with (e.g., if they have recently moved to the area, are vacationing, or have never had to look into the hospitals in their area), a victim may not know which medical service providers in the area are covered by the victim's medical insurance (hereinafter, "preferred medical service providers"). Or, for example, if the victim is unconscious, the victim would be unable to articulate the medical service provider that they would prefer to the first responders. Both the victim and the victim's medical insurance may prefer that the victim be taken to a medical service provider covered under the victim's medical insurance. In some embodiments, the EMS 520 can provide emergency assistance by detecting an emergency or potential emergency that a victim is experiencing; gathering a location associated with the victim; gathering medical insurance information associated with the victim; using the location associated with the victim and the medical insurance information associated with the victim to determine one or more preferred medical service providers associated with provider locations (e.g., the locations of the preferred medical service providers) proximal to the location associated with the victim; and transmitting locations of the one or more preferred medical service providers to one or more recipients, such as the victim or a first responder providing emergency care to the victim.

In some embodiments, the EMS 520 can detect an emergency or a potential emergency that a victim is experiencing in various ways. For example, in some embodiments, the EMS 520 detects an emergency or a potential emergency when a victim makes an emergency call or otherwise generates an emergency alert at a victim device 510A. In some embodiments, the EMS 520 detects an emergency or a potential emergency when a user navigates to a Medical ID screen on a victim device 510A (e.g., the victim device 510A sends a notification or an emergency alert to the EMS 520 when the user navigates to the Medical ID screen). In some embodiments, the EMS 520 detects an emergency or a potential emergency when the EMS 520 receives an emergency data request from an ESP 530 or an ESP device 510B (e.g., when a first responder inputs a victim code into their ESP device 510B, as described above). As described below, in some embodiments, a first responder can transmit an emergency data request from an ESP device 510B through an electronic patient care report (ePCR) application, such as by submitting one or more user identification elements associated with a victim. User identification elements may include (but are not limited to): a phone number, a name, a date of birth, a social security number, a driver's license number, a patient or medical ID, a medical insurance ID, or a medical insurance group ID. One or more user identification elements may be included within an emergency data request as a user identifier. In some embodiments, at least two user identification elements must be included in an emergency data request (e.g., for security and privacy purposes). Similarly, in some embodiments, the EMS 520 detects an emergency or a potential emergency when the EMS 520 receives a notification from a bystander device 510C (e.g., when a bystander inputs a victim code into their bystander device 510C, as described above). After detecting the emergency or potential emergency, the EMS 520 can then gather, retrieve, or receive a location associated with the victim. In some embodiments, the EMS 520 receives a location from the victim device 510A, such as in the payload of an emergency alert, as described above. In some embodiments, the EMS 520 retrieves an address of the victim from a user information module, as described above. In some embodiments, the EMS 520 receives a location (e.g., a device location) generated by an ESP device 510B (e.g., a first responder's device) when a victim code is inputted into the ESP device 510B. The EMS 520 can then associate the location generated by the ESP device 510B with the victim (e.g., with the victim's victim code). Similarly, in some embodiments, the EMS 520 receives a location generated by a bystander device 510C when a bystander inputs a victim code into their bystander device 510C. The EMS 520 can then associate the location generated by the bystander device with the victim (e.g., with the victim's victim code). When the EMS 520 receives an emergency data request including a victim code (or other user identifier) from an ESP device 510B or a notification including the victim code from a bystander device 510C, the EMS 520 can assume that the location of the ESP device 510B or the bystander device 510C is representative or effectively equivalent to the victim's location, because the ESP device 510B or the bystander device 510C must have received the victim code (or other identifier) from the victim or the victim device 510A.

After detecting an emergency or a potential emergency and gathering a location associated with the victim experiencing the emergency, the EMS 520 then gathers medical data or medical insurance information associated with the victim. In some embodiments, the medical insurance information includes the name of the victim's medical insurance provider (e.g., United Healthcare, Blue Cross Blue Shield, etc.). In some embodiments, the medical insurance information associated with the victim includes the type of insurance (e.g., a specific insurance plan) or the extent of the insurance coverage (e.g., which medications or medical procedures are covered by the victim's medical insurance). In some embodiments, the medical insurance information associated with the victim includes a list of medical service providers (e.g., hospitals, clinics, or urgent care centers) covered by the victim's medical insurance and an address of each of the medical service providers on the list. In some embodiments, the EMS 520 receives the medical insurance information associated with the victim in the payload of an emergency alert, as described above. In some embodiments, the EMS 520 retrieves the medical insurance information associated with the victim using an identifier associated with the victim (e.g., a victim code, a phone number, an email address, etc.). For example, in some embodiments, the EMS 520 retrieves the medical insurance information associated with the victim by parsing a module or database within the EMS 520, such as a user information module (as described above), with the identifier associated with the victim. In some embodiments, the EMS 520 retrieves the medical insurance information associated with the victim from a third-party server 560, such as by querying the third-party server 560 using the identifier associated with the victim.

Figure 7:
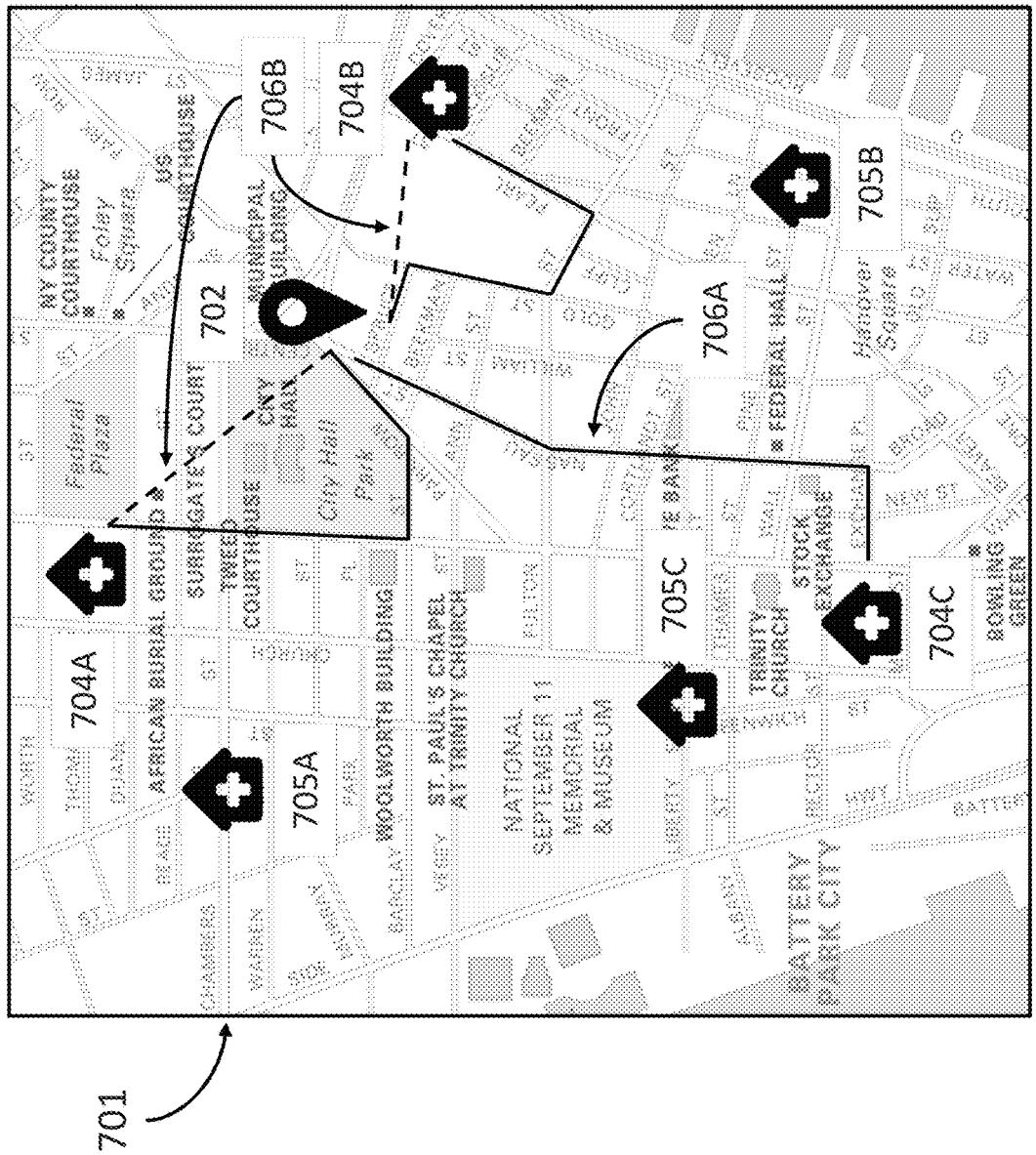
FIG. 7 illustrates information regarding preferred medical service providers in accordance with one embodiment of the present disclosure.

After gathering a location associated with a victim experiencing an emergency and gathering medical insurance information associated with the victim, the EMS 520 can then use the location associated with the victim and the medical insurance information associated with the victim to determine one or more preferred medical service providers associated with provider locations proximal to the location associated with the victim. FIG. 7 depicts a group of medical service providers in the vicinity of an emergency (e.g., a location 702 associated with a victim). A medical service provider (e.g., a hospital, a clinic, or an urgent care center) is a preferred medical service provider 704 if it is covered by the victim's medical insurance. If a medical service provider is not covered by the victim's medical insurance, the medical service provider is a non-preferred medical insurance provider 705. In some embodiments, the EMS stores a database of medical service providers and parses the database of medical service providers using the medical insurance information associated with the victim to find one or more preferred medical service providers 704. For example, as depicted by FIG. 7, the EMS finds six medical service providers in the vicinity of a location 702 associated with a victim. However, only three of the medical service providers are preferred medical service providers (704A-704C). Then, the EMS determines a route 706A or a distance 706B from the location associated with the victim to the address of the one or more preferred medical service providers 704 and compares the lengths of the routes or the distances and determines one or more preferred medical service providers 704 proximal to the location associated with the victim. In some embodiments, the EMS selects a single preferred medical service provider nearest to the location associated with the victim (e.g., 704B). In some embodiments, the EMS selects multiple preferred medical service providers associated with provider locations proximal to the location associated with the victim, such as the two or three preferred medical service providers nearest to the location associated with the victim (e.g., 704A and 704B). In some embodiments, a provider location is proximal to the location associated with the victim if the provider location is within a threshold distance from the location associated with the victim.

In some embodiments, one or more preferred medical service providers are determined by a third-party and transmitted to the EMS 520. For example, in some embodiments, after detecting an emergency or potential emergency and gathering a location associated with the victim experiencing the emergency, the EMS 520 can transmit a query including an identifier of the victim (e.g., user identifier) and the location associated with the victim to a third-party server 560 that stores or is otherwise able to access medical insurance information associated with the victim. The third-party server 560 can then use the identifier of the victim, the location associated with the victim, and medical insurance information associated with the victim to determine one or more preferred medical service providers proximal to the location associated with the victim. After determining the one or more preferred medical service providers proximal to the location associated with the victim, the third-party server 560 can then transmit information regarding the one or more preferred medical service providers to the EMS 520.

Once the EMS 520 has determined or received information regarding one or more preferred medical service providers associated with provider locations proximal to the location associated with a victim, the EMS 520 can then transmit information regarding the one or more preferred medical service providers (e.g., the names of the medical service providers, the locations of the medical service providers, routes from the location associated with the victim to the medical service providers, etc.) to one or more appropriate emergency data recipients, such as an ESP 530 or an ESP device 510B, or to the victim (e.g., to the victim's victim device 510A). In some embodiments, the EMS 520 transmits the information regarding the one or more preferred medical service providers associated with provider locations proximal to a location associated with a victim to the victim (e.g., to their victim device 510A) in response to a user navigating to a Medical ID screen on the victim device 510A. In some embodiments, the EMS 520 determines the one or more appropriate emergency data recipients automatically, such as by using the location associated with the victim, as described above. In some embodiments, the EMS 520 determines the one or more appropriate emergency data recipients by receiving an emergency data request including an identifier associated with the victim (e.g., a victim code, a phone number, an email address, etc.), as described above. For example, in some embodiments, the EMS 520 transmits the information regarding the one or more preferred medical service providers proximal to a location associated with a victim to an ESP device 510B associated with a first responder after the first responder inputs a victim code associated with the victim into their ESP device 510B (e.g., the ESP device 510B sends an emergency data request including the victim code to the EMS 520, as described above). In some embodiments, the EMS 520 transmits the information regarding the one or more preferred medical service providers associated with provider locations proximal to a location associated with a victim to an ESP 530 in response to receiving an emergency data request including an identifier of the victim from the ESP 530. In some embodiments, after receiving the information regarding the one or more preferred medical service providers, the ESP 530 can transmit the information regarding the one or more preferred medical service providers to one or more first responders (e.g., to one or more ESP devices 510B associated with the one or more first responders).

In some embodiments, in addition to determining one or more preferred medical service providers associated with provider locations proximal to the location associated with a victim, the EMS 520 further use contextual information to determine which of the preferred medical service providers is the most appropriate for the emergency. For example, in some embodiments, the EMS 520 uses real-time traffic data to determine which of the preferred medical service providers is likely to be reached the fastest. In another example, if the EMS 520 receives additional data that can be used to determine the nature of the victim's emergency (e.g., heart rate data from the victim's smartwatch or an emergency description submitted by a first responder into their ePCR application), the EMS 520 can use the additional data and contextual information regarding the one or more preferred medical service providers (e.g., capabilities or specialties of the individual preferred medical service providers) to determine which of the one or more preferred medical service providers is the most appropriate for the nature of the victim's emergency. For example, some hospitals may be better equipped to respond to a heart attack than others. In some embodiments, the EMS 520 ranks the one or more preferred medical service providers from most appropriate to least appropriate. In some embodiments, contextual information regarding one or more preferred medical service providers is stored in a database within the EMS 520. In some embodiments, contextual information regarding one or more preferred medical service providers is provided to the EMS 520 by a third-party server 560.

In some embodiments, additional data is received as part of an emergency alert. In some embodiments, the EMS 520 queries a device or a third-party server 560 for additional data associated with a victim. In some embodiments, additional data is received by the EMS 520 as part of an emergency data request. For example, in some embodiments, an emergency data request generated by an ESP device 510B includes additional data, such as a description of the nature of a victim's emergency (e.g., a first responder may submit a description of the victim's emergency into an ePCR application before the ePCR application generates and transmits an emergency data request). In some embodiments, the EMS 520 requests additional data from one or more parties, such as from a party from which an emergency data request was received. For example, in some embodiments, when the EMS 520 receives an emergency data request from an ESP device 510B (e.g., through an ePCR application, as described above), the EMS 520 can transmit a request for additional data to the ESP device 510B or prompt a user of the ESP device 510B to submit additional data through the ESP device 510B (e.g., through an ePCR application).

Figure 8:
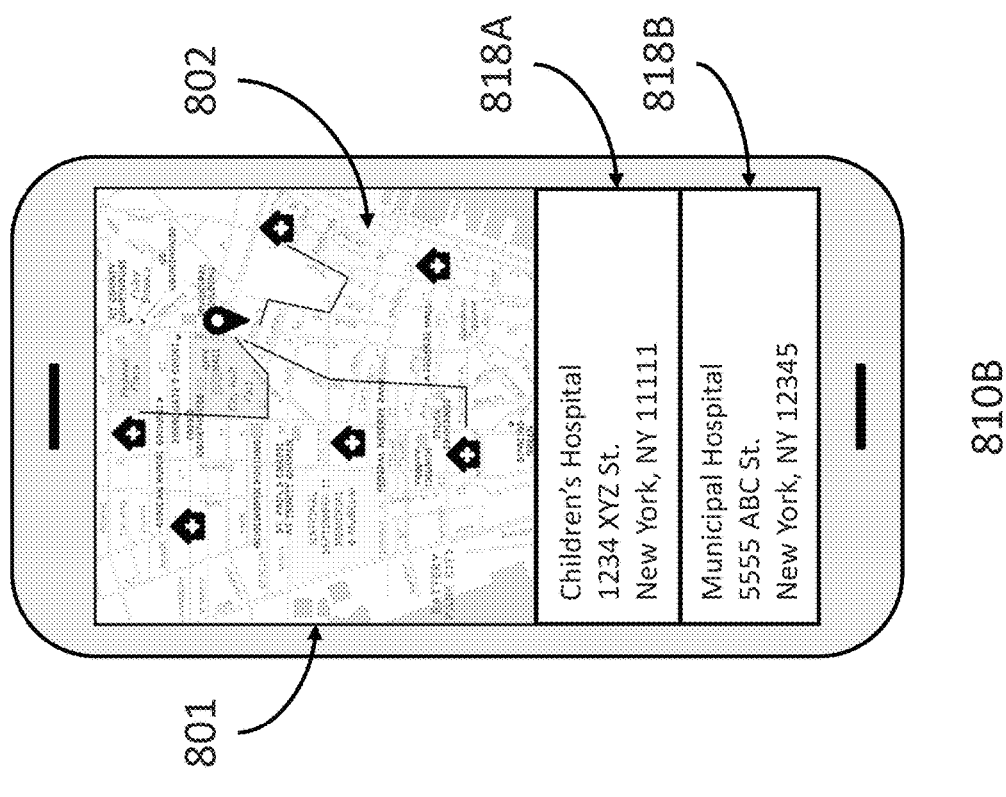
FIG. 8 illustrates electronic devices displaying information regarding preferred medical service providers in accordance with one embodiment of the present disclosure.
Figure 8:
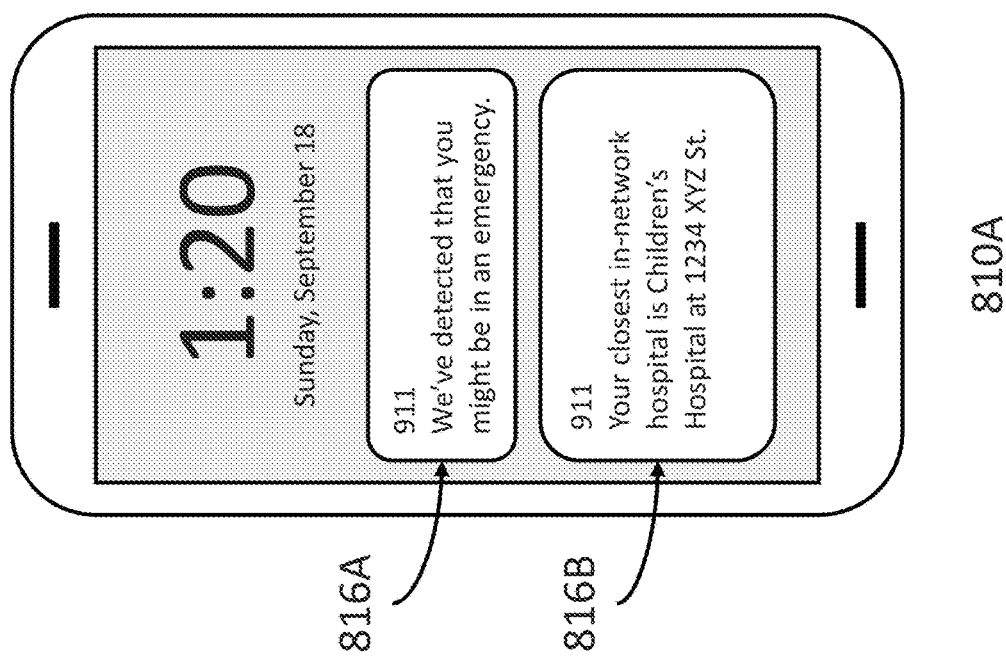

FIG. 8 illustrates examples of information regarding one or more preferred medical service providers transmitted to a recipient (e.g., a victim device, an ESP, or an ESP device). As described above, in some embodiments, an emergency management system (EMS) can gather a location associated with the victim; gather medical insurance information associated with the victim; use the location associated with the victim and the medical insurance information associated with the victim to determine one or more preferred medical service providers associated with provider locations proximal to the location associated with the victim; and transmit information regarding the one or more preferred medical service providers to one or more recipients, such as the victim or a first responder providing emergency care to the victim. Information regarding the one or more preferred medical service providers may include (but is not limited to) the name of a preferred medical service provider, the address, the distance from the location associated with the victim, the estimated driving time from the location associated with the victim, and capabilities or specialties of the preferred medical service provider. In some embodiments, the EMS transmits information regarding preferred medical service providers to an electronic device 810A in the form of text messages (e.g., SMS text messages). For example, as depicted in FIG. 8, after detecting that a victim is potentially experiencing an emergency, gathering a location associated with the victim and medical insurance information associated with the victim, and determining one or more preferred medical service providers associated with provider locations proximal to the location associated with the victim (as described above), the EMS can send one or more messages to the victim's device 810A. For example, in some embodiments, the EMS sends two messages, a first message 816A alerting the victim that the EMS has detected that they may be in an emergency and then a second message 816B informing the victim where the nearest hospital covered by their medical insurance is. The EMS may transmit information regarding preferred medical service providers in the form of text messages both victim devices and ESP devices. Informing the victim of preferred medical service providers proximal to their location empowers the victim to decide where they would like first responders to take them. For example, they can choose to be taken to a hospital covered by their medical insurance, which may be preferred by the victim or their medical insurance provider.

Figure 9:
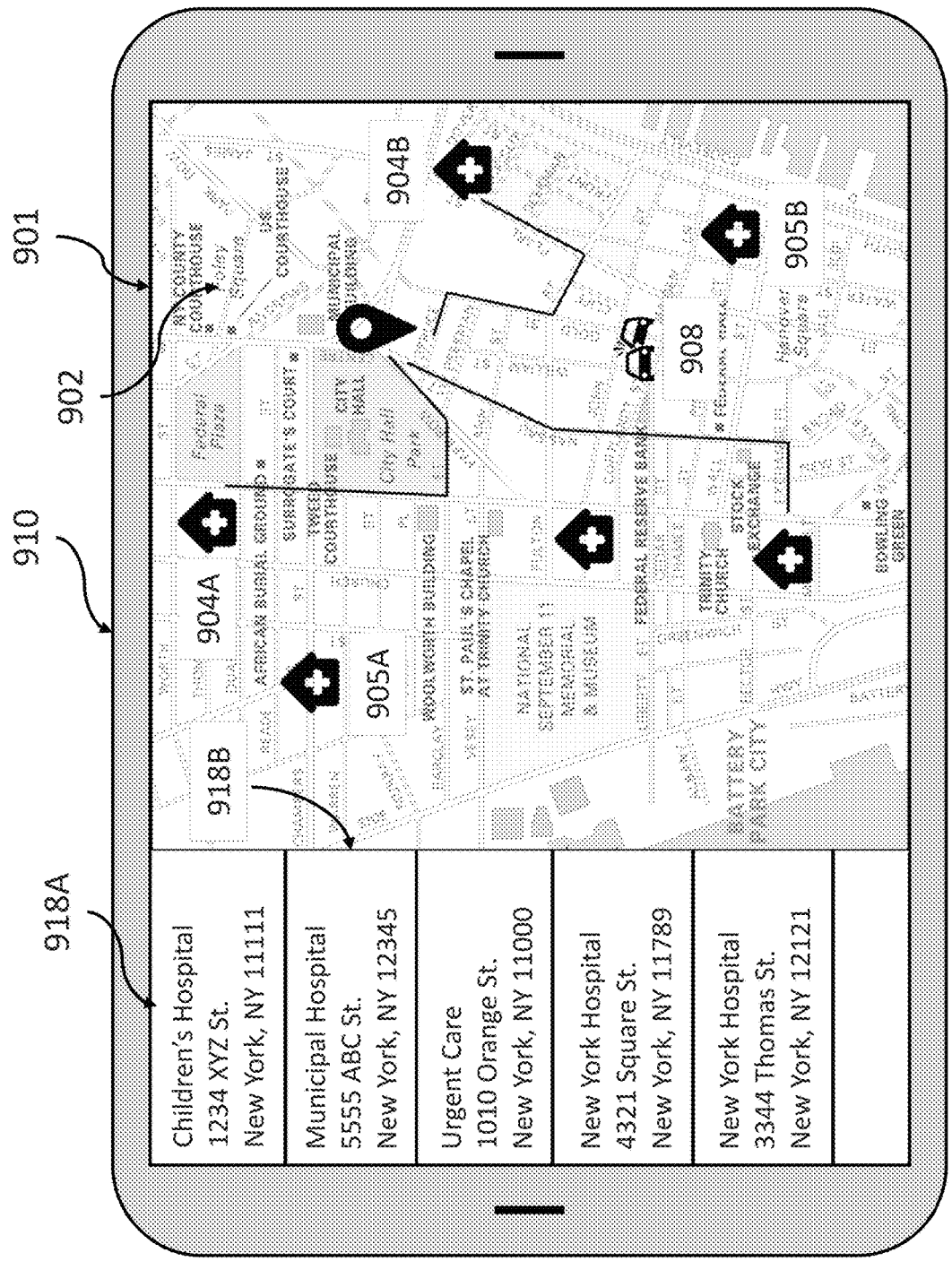
FIG. 9 illustrates an electronic device displaying information regarding preferred medical service providers in accordance with one embodiment of the present disclosure.

In some embodiments, the EMS transmits information regarding preferred medical service providers to an electronic device 810B through an application 801 installed on the electronic device 810B. In some embodiments, when the EMS transmits information regarding preferred medical service providers to an electronic device 810B through an application 801 installed on the electronic device 810B, the application 801 displays the preferred medical service providers in a graphical format, such as within a virtual map 802. In some embodiments, the application 801 is an emergency response application. In some embodiments, the application 801 is provided by the EMS. In some embodiments, the application 801 is a mobile map application, such as Google Maps. In some embodiments, the application 801 is an electronic patient care report (ePCR) application, as described below. In some embodiments, the application 801 alternatively or additionally displays information regarding preferred medical service providers in a textual format. For example, FIG. 8 depicts an electronic device 810B running an application 801 displaying, in a textual format, information regarding a first preferred medical service provider 818A, Children's Hospital, and information regarding a second preferred medical service provider 818B, Municipal Hospital. FIG. 9 depicts an embodiment of an ESP device 910 (e.g., a first responder's electronic device, such as a tablet device) running an application 901 displaying information regarding one or more preferred medical service providers 904. In some embodiments, the application 901 displays information regarding medical service providers in a graphical format, such as within a map 902. In some embodiments, the application 901 can additionally display traffic information 908 within the map 902. As depicted in FIG. 9, in some embodiments, the application 901 may display information regarding both preferred medical service providers 904 and non-preferred medical service providers 905. In some embodiments, the application 901 additionally or alternatively displays information regarding medical service providers in a textual format, such as the information regarding Children's Hospital 918A or the information regarding Municipal Hospital 918B.

Automatic Population of Incident Reports

In some embodiments of the system 500 (as depicted in FIG. 5), the EMS 520 can transmit emergency data associated with a victim to an ESP device 510B and automatically populate one or more fields of an incident report at the ESP device 510B. Generally, an emergency service provider (ESP) creates one or more incident reports for each emergency that the ESP responds to. For example, when a public safety answering point (PSAP) receives an emergency call and responds to a corresponding emergency, the PSAP may create an incident report documenting the details of the emergency. For example, an incident report may document information about an emergency such as the identities of people involved in the emergency, demographic information about the people involved in the emergency, medical information about the people in the emergency, the location of the emergency, the date and time of the emergency, the identities of first responders dispatched to respond to the emergency, or any other information regarding the emergency. In another example, when a first responder arrives at the scene of an emergency and provides emergency care to a victim, the first responder may create an incident report commonly called a patient care report (PCR), which documents details about the victim and the victim's emergency, such as demographic information about the victim, medical information about the victim, the severity of the emergency or the victim's condition, or any other information regarding the victim or the victim's emergency. A patient care report is often created electronically, such as by using an application on an ESP device 510B. Such a patient care report is referred to as an electronic patient care report (ePCR). Various companies produce and provide emergency response applications for first responder devices that allow for the creation of an ePCR. In many cases, a first responder is legally required to create a patient care report every time the first responder responds to an emergency. Patient care reports are saved by ESPs as records that can be used for various purposes, such as providing legal protection to first responders. A patient care report may also be sent to a hospital before they receive a victim to provide the hospital with situational context so that they may be better prepared to provide care to the victim.

However, for a first responder, creating and filling out a patient care report often takes time away from providing emergency care to a victim. Thus, it is desirable to automatically fill out or create electronic patient care reports (ePCRs), in order to eliminate or ease the need for first responders to create and fill out ePCRs manually, to save first responders time that they could be using to provide emergency care to victims, and also to reduce human error in filling out ePCRs. In many cases, the emergency management system (EMS) stores or can automatically gather much if not all of the information necessary to create and fill out an ePCR for a victim, as long as a link between the victim and a first responder (e.g., the first responder's ESP device) can be made. In some embodiments, an emergency management system (EMS) automatically populates an incident report, such as an ePCR, by providing a victim code to a victim device, receiving an emergency data request including the victim code from an ESP device associated with a first responder, gathering emergency data associated with the victim (e.g., associated with the victim code), transmitting the emergency data associated with the victim to the ESP device, and automatically populating one or more fields of the incident report at the ESP device.

Figure 10A:
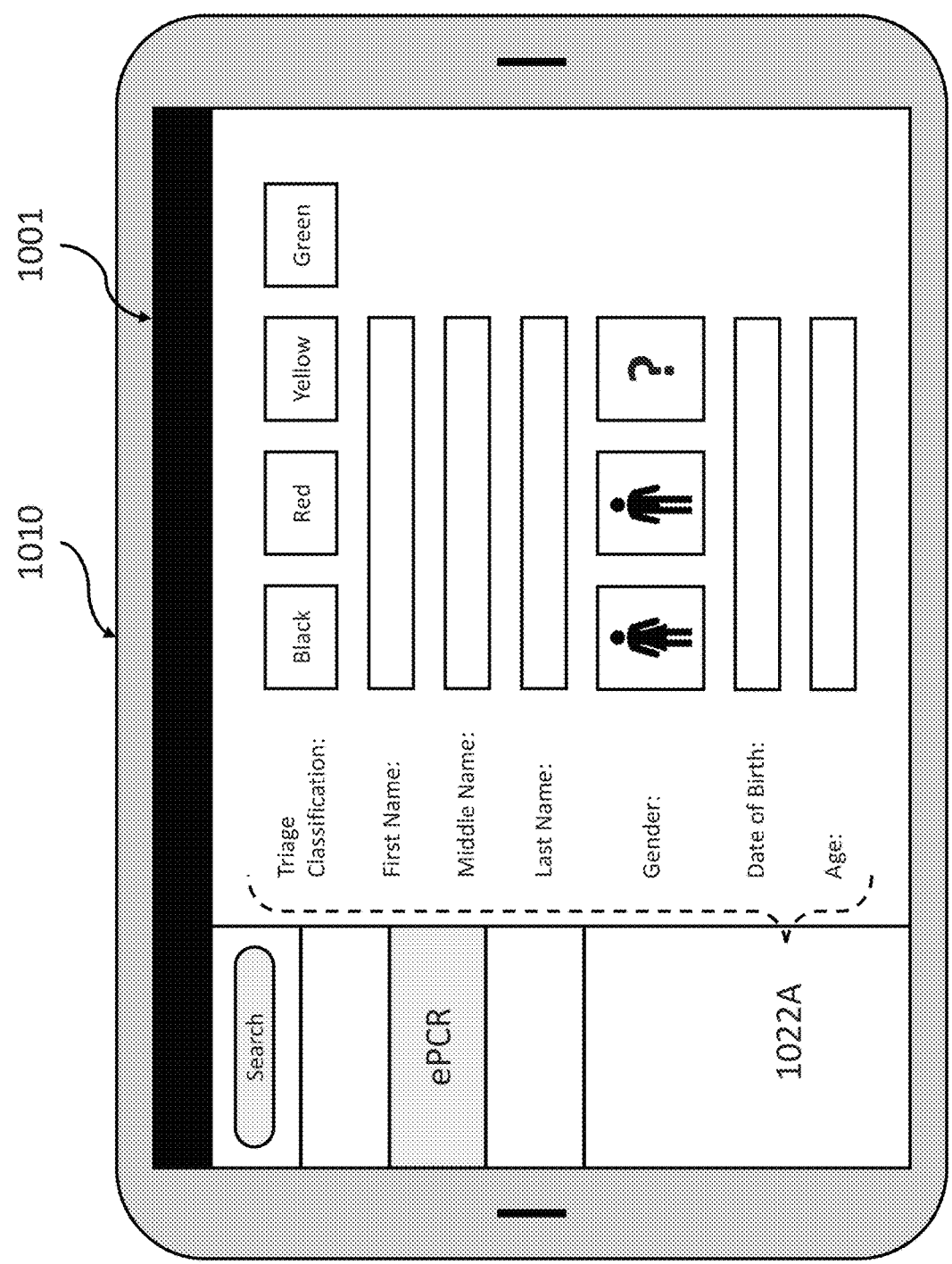
FIGS. 10A and 10B illustrate various embodiments of an electronic patient care report (ePCR) in accordance with one embodiment of the present disclosure.
Figure 10B:
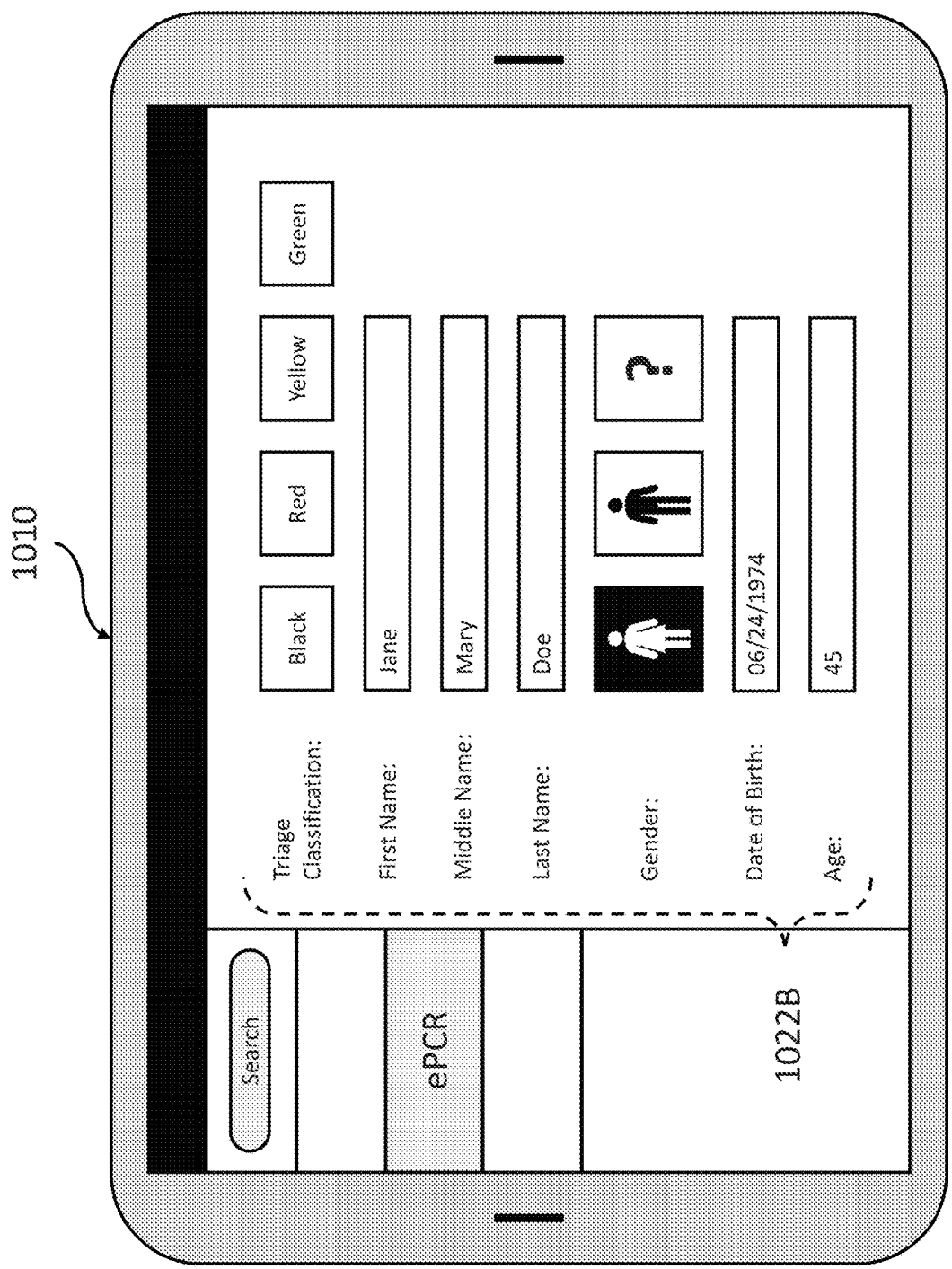

FIGS. 10A and 10B illustrate embodiments of an electronic patient care report (ePCR) being created and filled out within an application running on an ESP device. In some embodiments, when a first responder arrives at the scene of an emergency and finds a victim in need of emergency assistance, the first responder can use a victim code to receive emergency data associated with the victim from an emergency management system (EMS). For example, in some embodiments, the victim is wearing a bracelet with their victim code on it, and the first responder can scan or otherwise input the victim code into their ESP device 1010. Or for example, in some embodiments, the first responder can access the victim's victim device (for example, by finding the victim device in the victim's bag or pocket) and navigate to a Medical ID screen on the victim device. When the first responder navigates to the Medical ID screen on the victim device, the victim device displays the victim code associated with the victim that the first responder can scan or otherwise input into their ESP device 1010. In some embodiments, as described above, the victim code is generated and transmitted to the victim device by the EMS when a user navigates to the Medical ID screen on the victim device. In some embodiments, the first responder inputs the victim code into their ESP device 1010 through an application 1001 (e.g., an emergency response application) running on the ESP device 1010. In some embodiments, the application 1001 is provided by the EMS. In some embodiments, the application 1001 is not provided by the EMS. In some embodiments, the application 1001 is an electronic patient care report (ePCR) application. In some embodiments, after the first responder inputs the victim code into the ESP device 1010, the ESP device 1010 sends an emergency data request including the victim code to the EMS, thereby creating a link between the victim and the first responder. In some embodiments, as mentioned above, an ePCR application can generate an emergency data request including one or more user identification elements associated with a victim. User identification elements may include (but are not limited to): a phone number, a name, a date of birth, a social security number, a driver's license number, a patient or medical ID, a medical insurance ID, or a medical insurance group ID. One or more user identification elements may be included within an emergency data request as a user identifier. The EMS may use a user identifier to retrieve emergency data associated with a victim in the same way that the EMS may use a victim code, as described above and below. In some embodiments, at least two user identification elements must be included in an emergency data request (e.g., for security and privacy purposes). In response to receiving the emergency data request, the EMS can gather emergency data associated with the victim, such as demographic, personal, or medical information about the victim, as described above. In some embodiments, the EMS gathers emergency data associated with the victim by retrieving the emergency data from a user information module or a database within a clearinghouse. In some embodiments, the EMS gathers emergency data associated with the victim by receiving the emergency data from the victim device or other electronic devices associated with the victim. In some embodiments, the EMS gathers emergency data associated with the victim by querying a third-party server, as described above.

After gathering the emergency data associated with the victim, the EMS then transmits the emergency data associated with the victim to the ESP device 1010. In some embodiments, the EMS transmits and displays the emergency data associated with the victim through the application 1001. In some embodiments, the first responder can then use the emergency data associated with the victim to provide emergency care to the victim. For example, the emergency data associated with the victim may include information about the victim's medical history that may help the first responder diagnose the victim's emergency or inform the first responder on how to address the victim's emergency. In some embodiments, the emergency data associated with the victim can be used to automatically populate one or more fields within an electronic patient care report (ePCR). As depicted in FIG. 10A, an ePCR may have one or more fields 1022A that must be filled out by a first responder when responding to a victim's emergency, fields such as triage classification, first name, middle name, last name, gender, date of birth, age, or any other information regarding the victim or the victim's emergency. In some embodiments, after the EMS receives the emergency data request including the victim code, gathers emergency data associated with the victim, and transmits the emergency data associated with the victim to the ESP device 1010, the emergency data associated with the victim is used to automatically populate one or more of the fields 1022A of the ePCR. For example, as depicted in FIG. 10B, the EMS has gathered emergency data associated with a victim Jane Doe, and one or more of the fields 1022B of an ePCR created for Jane Doe on the ESP device 1010 have been automatically populated using the emergency data received from the EMS. Automatically populating fields of an ePCR saves time for first responders. Instead of having to spend time completing a patient care report during an emergency, a first responder can use that time to provide emergency care to a victim.

Emergency Response Application

FIG. 11 depicts an example of graphical user interface of an emergency response application provided by an emergency management system (EMS). As described above, in some embodiments of the system 500 (as depicted in FIG. 5), the EMS 520 can transmit emergency data associated with a victim to an emergency data recipient such as an ESP 530 or an ESP device 510B. In some embodiments, as described above, the EMS 520 can identify a victim by receiving an emergency data request from an ESP device 510B including a victim code associated with the victim. The EMS 520 can then transmit emergency data associated with the victim to the ESP device 510B to aid a first responder (or other ESP personnel) in providing emergency response services to the victim. However, in some embodiments, after receiving an emergency data request including a victim code associated with a victim from an ESP device 510B, the EMS 520 can transmit emergency data associated with the victim to a separate device associated with the ESP device 510B or an ESP 530 associated with the ESP device 510B. For example, in some embodiments, a computing device at an ESP 530 accesses an emergency response application 1101 (as depicted in FIG. 11). When an ESP device 510B associated with the ESP 530 transmits an emergency data request including a victim code to the EMS 520, the EMS 520 can transmit emergency data associated with the victim code to the computing device at the ESP 530 and display the emergency data through the emergency response application 1101.

In some embodiments, an ESP may have multiple devices associated with the ESP. In one example, a PSAP is associated with one or more computing devices (e.g., PSAP consoles) permanently installed on the premises of the PSAP that call takers and dispatchers at the PSAP use to respond to emergencies. The PSAP may also be associated with one or more ESP devices (e.g., mobile computing devices such as cell phones and tablets) that first responders use to respond to emergencies in the field. An ESP may be associated with electronic devices in various ways. For example, an ESP may be associated with any ESP device with a device location within a geofence associated with the ESP. Or, for example, an ESP device may be hardcoded to be associated with an ESP. In another example, an ESP device is associated with an ESP if the ESP device is communicatively connected to a communication network associated with the ESP, such as the ESP's WiFi or LAN network. However, an ESP and an electronic device may be associated in any way.

As mentioned above, in some embodiments, when a first ESP device (e.g., a mobile phone) associated with an ESP transmits an emergency data request including a victim code to the EMS, the EMS can transmit emergency data associated with the victim code to a second ESP device (e.g., a desktop computer or tablet) associated with the ESP. In some embodiments, the emergency data associated with the victim code is displayed through an emergency response application accessed by the second ESP device. FIG. 11 depicts an example of a graphical user interface of an emergency response application 1101. In some embodiments, an emergency response application 1101 is an application (e.g., a mobile app or a web application) provided by the EMS. In some embodiments, an emergency response application 1101 is not provided by the EMS but is integrated with the EMS.

In one example, an ESP is a hospital that has multiple computers and tablet devices associated with the hospital (e.g., registered to the hospitals communication network). One or more of the computers is running an emergency response application 1101 integrated with or provided by the EMS. For example, in some embodiments, the emergency response application 1101 is a software program used by doctors and nurses at the hospital is integrated with the EMS and has a tab or window 1105 for additional data provided by the EMS, as depicted in FIG. 11. In this example, when a person having a medical emergency (hereinafter, "victim") arrives at the hospital (e.g., transported to the hospital by an ambulance), a nurse can access the victim's victim device (e.g., by finding the victim's personal cell phone) and obtain a victim code from the victim device. The nurse can then input the victim code into an ESP device (e.g., a tablet device) associated with the hospital, such as by scanning the victim code displayed on the victim device using the ESP device (as described above). Once the nurse inputs the victim code into the ESP device, the ESP device generates and transmits an emergency data request including the victim code to the EMS. In response to receiving the emergency data request including the victim code from the ESP device associated with the hospital, the EMS gathers emergency data associated with the victim code and transmits the emergency data associated with the victim code to one or more of the computers associated with the hospital and running the emergency response application 1101 integrated with or provided by the EMS. The emergency data associated with the victim code is then displayed through the graphical user interface of the emergency response application 1101. In some embodiments, the EMS additionally or alternatively transmits the emergency data associated with the victim code to the ESP device that generated the emergency data request. A doctor, for example, can then access the emergency data associated with the victim code at the computer through the emergency response application 1101 and use the emergency data associated with the victim to provide the victim with faster or more efficient emergency care.

FIG. 11 depicts an example of emergency data displayed within a graphical user interface of an emergency response application 1101. In this example, the emergency response application 1101 is a software program running on a computer at a hospital. The software program is integrated with the EMS and includes a tab or window 1105 through which additional data provided by the EMS is displayed. As described above, in some embodiments, when the EMS receives an emergency data request including a victim code from an ESP device (e.g., a tablet device used by a nurse at a hospital) associated with an ESP (e.g., a hospital that is associated with a tablet device used by a nurse), the EMS can gather emergency data associated with the victim code and transmit the emergency data associated with the victim code to one or more other electronic devices associated with the ESP (e.g., a computer associated with a hospital) for display within a graphical user interface of an emergency response application 1101. In some embodiments, as depicted in FIG. 11, the graphical user interface includes a list of victims 1110 that includes an entry 1112 for each victim for which the computer has received emergency data from the EMS. In the example depicted by FIG. 11, the computer has received emergency data for five victims from the EMS and the list of victims 1110 shows five entries 1112A-1112E accordingly. The entry 1112B for victim James Jones is selected, and the graphical user interface displays emergency data received from the EMS associated with the victim James Jones. In this example, the emergency data associated with the victim James Jones includes Medical Information 1118A and Contact Information 1118B. In some embodiments, as depicted by FIG. 11, Medical Information 1118A may include (but is not limited to) information such as allergies, birthday, blood type, disabilities, gender, height, medical conditions, and medical notes. In some embodiments, as depicted by FIG. 11, Contact Information 1118B may include (but is not limited to) emergency contact names, emergency contact relationships, and emergency contact phone numbers. In some embodiments, a user of the emergency response application 1101 may search for a particular victim for which emergency data has been received from the EMS by using the entry field 1187A and the search button 1187B, such as by entering a victim's name (or any other identifier of the victim) in the entry field 1187A and selecting the search button 1187B.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device. In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random-access memory (FRAM). In some embodiments, the non-volatile memory comprises phase-change random access memory (PRAM). In some embodiments, the non-volatile memory comprises magneto resistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, trackpad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable compiled applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, a "device" is a digital processing device designed with one or more functionality. A "triggering device" refers to a communication device with a communication component, which will allow it to send and receive information over a wireless channel, a wired channel, or any combination thereof (e.g., sending/receiving information over the Internet). Examples of triggering devices include a mobile phone (e.g., a smartphone), a laptop, a desktop, a tablet, a radio (e.g., a two-way radio), and a vehicular communication system. In some embodiments, a triggering device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, a triggering device is an Internet of Things (IoT) device. In some embodiments, the triggering device is a sensor for sensing environmental or health indicators. In some embodiments, the sensor may include a sensing component and a communication component. In some embodiments, the triggering device is a sensor in a sensor network or a device that controls a sensor network.

In some embodiments, a triggering device is a wearable device (e.g., a communication device worn by a user). In some embodiments, a triggering device (e.g., a wearable device) comprises one or more sensors. As used herein, a "mobile wireless device" refers to a device that is portable and communicates wirelessly. In some embodiments, a user wears or carries the mobile wireless device on the user's person or in the user's vehicle. Examples of mobile wireless devices include mobile or cellular phones, wearable devices (e.g., smart watch, fitness tracker, wearable sensor, smart glasses, etc.).

As used herein, an "associated device" refers to a communication device that is associated with the triggering device. For example, a user may be using several communication devices such as a mobile phone, a wearable, a home security system, a car computer. The user may have registered these devices with his or her account and linked these devices with a user name, user number(s), email address(es), home or other physical address(es). In some embodiments, associated devices may include communication devices of a second user who is associated with user, e.g., a husband and wife, a father and son, a victim and doctor, friends, work colleagues, etc. In some cases, the user may have added the second user as an emergency contact, a member of a group, etc. In some cases, user may have agreed to share location and other data with the second user. In some embodiments, the second user may be someone who is frequently contacted by the user and the communication device identifies the second user from the "Recently called" or "Frequently called" list. In some embodiments, the associated devices may be devices that are proximal or near-by to the triggering device such as obtained through a WiFi scan. In some embodiments, an associated device is proximal to the triggering device when the location of the associated device is within 1, 5, 10, 15, 20, 25, 30, 35, 40, 45, 50, 60, 70, 80, 90, 100, 200, 300, 400, or 500 meters of the location of the triggering device.

As used herein, the "list of associated devices" refers to a list of communication devices that are associated with the user or the triggering device (e.g., a second resident in a smart home). The list of associated devices may be listed by user name, phone number, email address, physical address, coordinates etc. The device entry in the list may include phone number, email address, physical address, coordinates, BSSID, SSID or MAC address. The list may be user defined or generated by the device or the EMS.

As used herein, a "request for assistance" refers to a request or message sent to a recipient asking for help. In some embodiments, a request for assistance is an emergency request for assistance (e.g., the request is associated with an emergency situation) such as, for example, an emergency alert. In some embodiments, an emergency alert comprises a request for assistance. In some embodiments, a request for assistance is associated with an emergency situation. In some embodiments, a request for assistance comprises an emergency indication. In further embodiments, an emergency indication is selected from one or more of the group consisting of traffic accident, police emergency, medical emergency, and fire emergency. In some embodiments, a request for assistance is associated with a non-emergency situation (e.g., request for a tow truck after car breaks down). In some embodiments, a request for assistance is associated with a device sending the request. In other embodiments, a request for assistance is associated with a device not sending the request (e.g., a proxy request on behalf of a second device and/or a member device in a group of devices). As used herein, a request is "associated" with a device or user when the request relates to an emergency or non-emergency situation involving the device or user. In some embodiments, a request comprises data associated with a device (or user thereof). In some embodiments, a request comprises a data set associated with a device. For example, in some embodiments, a request comprises a data set associated with a device, wherein the data set comprises current location data. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency.

As used herein, a "first responder" refers to any person or persons responsible for addressing an emergency situation. In some embodiments, a first responder refers to government personnel responsible for addressing an emergency situation. In some embodiments, a first responder is responsible for a particular jurisdiction (e.g., a municipality, a township, a county, etc.). In some embodiments, a first responder is assigned to an emergency by an emergency dispatch center. In some embodiments, a first responder responds to a request for emergency assistance placed by a user via a user communication device. In some embodiments, a first responder includes one or more fire fighters, police officers, emergency medical personnel, community volunteers, private security, security personnel at a university, or other persons employed to protect and serve the public and/or certain subsets of the population.

As used herein, an "emergency service provider" (ESP) is a public or private organization or institution responsible for providing emergency services. For example, in some embodiments, an EDC (e.g., a public safety answering point (PSAP)), a fire department, a police department, and a hospital may all be considered emergency service providers. In some embodiments, an emergency responder is a member of an ESP. In some embodiments, an ESP personnel is a person who works at an ESP. For example, an ESP personnel may be a call-taker at a PSAP or a first responder at a fire department.

As used herein, a "recipient" refers to one or more persons, services, or systems that receive a request for assistance (e.g., an emergency alert). The recipient varies depending on the type of request. In some embodiments, a recipient is an emergency service. In some embodiments, a recipient is an emergency service when he requests for assistance pertains to an emergency (e.g., a tier 2 emergency). In some embodiments, a recipient is an emergency management system. In some embodiments, a recipient is an emergency dispatch center. In some embodiments, a recipient is an emergency dispatch center, wherein the request is first routed through an emergency management system (e.g., request is sent to the EMS, but ultimately is sent to an EDC). In some embodiments, a recipient is a first responder (e.g., a communication device of a first responder). In some embodiments, a recipient is a non-emergency service or personnel, for example, a relative or friend. In such situations, a user of a communication device (or member device or second device) does not require emergency assistance, but does need help. As an example, a user of a member device in a group of devices is a child who is lost in a theme park. The parent of the child has a communication device in the same group of devices as the child's member device. The parent uses the communication device to send a request for assistance on behalf of the child's member device to theme park security guards who are closer to the child than the parent. Security is then able to pick up the child quickly using the data set associated with the member device, which they are given authorization to access by the parent's communication device.

As used herein, an "emergency data source" refers to any device, server, or system that can produce, generate, or communicate information or data pertinent to an emergency. In some embodiments, an emergency data source is a communication device, a wearable device, an internet of things (IoT) device, or any other type of device. In some embodiments, an emergency data source is a network server. As used herein, an "emergency data recipient" refers to any device, server, or system or user of any device, server, or system that can receive information or data pertinent to an emergency. In some embodiments, an emergency data recipient is an emergency service provider (ESP), ESP personnel, or an electronic device associated with an ESP. In some embodiments, an emergency data recipient is a person in an emergency or an electronic device associated with a person in an emergency.

As used herein, a "victim" refers to a person experiencing an emergency. As used herein, a "medical service provider" is a facility that provides people with medical services, such as a hospital, healthcare clinic, emergency room, urgent care center, etc. As used herein, a "preferred medical service provider" is a medical service provider covered under a victim's medical insurance or a medical service provider or has better (e.g., more optimal or less expensive) coverage under the victim's medical insurance than another medical service provider. In some embodiments, a preferred medical service provider may be referred to as an "in-network hospital" or "in-network medical service provider." As used herein, a medical service provider is "proximal" to a location if the medical service provider is within the vicinity of the location (e.g., within 1 mile, 2 miles, 3 miles, 4 miles, or 5 miles of the location).

As used herein, a "user" refers to one or more person or persons associated with a device (e.g., communication device, member device, second device, device of a first responder, etc.). In some embodiments, a user utilizes a device to place a request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, "data" refers to a collection of information about one or more entities (e.g., user of a user communication device) and/or an environment that pertains to characteristics of the one or more entities. In some embodiments, an entity is a person. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by the current emergency situation. As an example, two unrelated users are involved in a vehicular collision, and each user sends a separate emergency request (for traffic accident) using his/her communication device. In this example, the separate emergency requests are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location information from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

As used herein, "communication link" refers to a communication pathway from a device (e.g., communication device) to another device or to an intermediate device (e.g., a router) on a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). A communication link refers to the point-to-point communication channels, point-to-point and end-to-end data sessions, and the physical hardware facilitating the communication channel(s) (e.g., antennas used to communicate/transmit information). In some embodiments, a data session comprises session parameters and the network route taken from one device to another device.

As used herein, a "data channel" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g., a previously agreed upon protocol). In some embodiments, the data session is routed through an EMS, which stores the multi-media, voice, and/or other data from any of the devices that are part of the data session. In further embodiments, the EMS shares the data from the data session with the other device (e.g., device of a first responder). In some embodiments, the EMS manages the data session.

As used herein, a "Received Signal Strength Indicator (RSSI)" refers to a measurement of the power present in a received radio signal. In some embodiments, the RSSI refers to a number assigned to the signal levels (e.g., power level) of packets as detected by a device receiving the packets from a device sending the packets. For example, an RSSI value may be a number within an arbitrary range such as from 0 to 100. In some embodiments, the RSSI refers to the decibel level of the power of the received data packets. In other embodiments, the RSSI refers to the actual power, for example measured in mW, as detected by the receiver. In some embodiments, RSSI is replaced with received channel power indicator (RCPI), which is a measure of the received radio signal power in a selected channel over the preamble and the entire received frame.

As used herein, "voice or speech recognition software" refers to computer programs that can recognize a person's speech to identify trigger phrases (e.g., iListen, Voice Navigator, Google Now, LilySpeech, etc.). In some embodiments, the software may be able to recognize the identity of the speaker. As used herein, "voice command" refers to words or phrases that a user may use to give command to the triggering device. The trigger phrases may be user-defined or may be from a library of phrases on the trigger device or at a remote server.

As used herein, "sound detection software" refers to computer programs for detecting trigger sounds in and around the triggering device. The trigger sounds may be user-defined or may be from a library of phrases on the trigger device or at a remote server. The trigger sounds may be sounds (alarms, breakage, gunshots, explosion, fire, car crash, etc.) or absence of sound (e.g., no heartbeat, etc.). For example, a glass break detector software may use the microphone in the trigger device to monitor any noise or vibrations to detect burglaries in a smart home. If the vibrations exceed a baseline, they may be analyzed by the software. The software may analyze frequencies typical of glass shattering and trigger an emergency alert if the sound is above a trigger threshold. In some cases, the software may compare detected sounds with glass-break profiles analysis and trigger an alert if the amplitude threshold and/or statistically expressed similarity threshold are breached. In some embodiments, an emergency is detected or triggered when a trigger sound exceeds a threshold. In some embodiments, a trigger sound threshold is about 50, 55, 60, 65, 70, 75, 80, 85, 90, 95, 100, 110, 120, 130, 140, 150, 160, 170, 180, 190, or 200 decibels. In some embodiments, a trigger sound threshold is at least about 50, 55, 60, 65, 70, 75, 80, 85, 90, 95, 100, 110, 120, 130, 140, 150, 160, 170, 180, 190, or 200 decibels. In some embodiments, a trigger sound threshold is no more than about 50, 55, 60, 65, 70, 75, 80, 85, 90, 95, 100, 110, 120, 130, 140, 150, 160, 170, 180, 190, or 200 decibels.

Modern communication devices, for example, smart phones, tablet computers, wearable communication devices, smart sensor devices and/or systems are often equipped with a variety of features for determining location information of the communication device using, for example, GPS, or triangulation with cellular phone towers. Modern communication devices also often include functionality to store data regarding a user of the communication device, for example, health information about the user.

In some embodiments, the communication device (or communication module of the device) communicates with a recipient through one or more data channels. In some embodiments, the recipient is an emergency management system. In some embodiments, the EMS routes communications to an EDC. In further embodiments, the EMS establishes a first data channel with the communication device and a second data channel between the EMS and the EDC, wherein the EMS bridges the first and second data channels to enable the communication device and the EDC to communicate. In some embodiments, the EMS converts data (e.g., data set) from the communication device into a format suitable for the EDC (e.g., analog or digital, audio, SMS, data, etc.) before sending or routing the formatted data to the EDC. In some embodiments, the EMS routes communications to a device associated with a first responder. In some embodiments, the communication device relays additional communications, information, and/or data sent or shared between member devices in the group of devices to the EMS or EDC after a request for assistance has been sent. In further embodiments, the additional information is relayed to the EMS or EDC after the request for assistance has been sent in order to provide current information that is relevant to the request. For example, in some instances, communications between member devices contain information relevant to the emergency (e.g., information that the user of member device who is experiencing a medical emergency suffers from diabetes). Accordingly, in some embodiments, the information is sent autonomously, at request of a user of the communication device, or at request of the recipient (e.g., EMS, EDC, first responder, etc.).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

EXAMPLES

The following illustrative examples are representative of embodiments of the invention described herein and are not meant to be limiting in any way.

Just In Time, an emergency response company, aids emergency service providers (such as public safety answering points (PSAPs) and first responders) by gathering emergency data from a variety sources and delivering the data directly to the emergency personnel. Traditionally, PSAPs are only technologically capable of receiving telephone calls with no additional data. Thus, when an emergency call is made to a PSAP from a mobile phone (with a dynamic and uncertain location), PSAP operators often must speak directly to a person implicated in an emergency to determine the person's location. Unfortunately, many people implicated in emergencies are unable to articulate their location or do not even know it—and even if they do, the time spent articulating their location to the PSAP operator can often be the difference between life and death. Similarly, PSAP operators and the first responders they send to respond to emergencies are forced to respond to emergencies with little or no information about the implicated persons (e.g., health data or medical histories) or emergency contexts (e.g., type of emergency, audio/video of the surroundings, etc.). Just In Time knows just how critical it is to quickly and accurately provide locations and situational/contextual information during emergencies to emergency service providers.

To aid emergency personnel, Just In Time provides an Emergency Clearinghouse (hereinafter, "clearinghouse") that receives and stores data and information from a plurality of sources, such as mobile phones and mobile applications, IoT devices, intelligent vehicle systems and other electronic devices. While responding to an emergency, an emergency service provider or emergency service provider personnel (e.g., a first responder) can receive data relevant to the emergency directly from the Emergency Clearinghouse. However, when a first responder responds to an emergency, Just In Time must match the first responder with the emergency in order to provide the first responder with emergency data regarding the emergency. Thus, in order to further aid emergency service providers, Just In Time provides unique victim codes that first responders can use to match themselves with people in emergencies (hereinafter "victims") so that they can receive relevant emergency data from the Emergency Clearinghouse.

Example 1—in-Network Routing

Generally, when first responders take a victim to a medical service provider (e.g., when the drive a victim to a hospital in an ambulance), a victim has the right to choose which medical service provider they are taken to, within reason. However, if a victim is in a location that they are not familiar with (e.g., if they have recently moved to the area, are vacationing, or have never had to look into the hospitals in their area), a victim may not know which medical service providers in the area are covered by the victim's medical insurance (hereinafter, "preferred medical service providers"). Or, for example, if the victim is unconscious, the victim would be unable to articulate the medical service provider that they would prefer to the first responders. Both the victim and the victim's medical insurance may prefer that the victim be taken to a medical service provider covered under the victim's medical insurance.

In one example, a man from Kentucky, Joshua, is visiting relatives on a rainy day in New York City. His relatives live on the fifth floor of an apartment building with no elevator. Halfway up the stairs to his relatives' apartment, Joshua slips on the stairs and falls, breaking his hip in the process. Joshua uses his cell phone to call his cousin, who comes down the stairs from the apartment on the fifth floor and finds Joshua fallen on the stairs and unable to move. His cousin then calls 9-1-1 from their own cell phone on Joshua's behalf. An ambulance arrives shortly after Joshua's cousin calls 9-1-1 and two first responders make their way up the stairs to carry Joshua down the stairs and into the ambulance.

Once in the ambulance, one of the first responders, Benny, asks Joshua if he has any preference on the hospital he is taken to. Although Joshua knows who his medical insurance provider is, Joshua is only visiting New York from Kentucky and is not familiar with the hospitals in the area, or which ones might be covered by his medical insurance provider. Benny tells Joshua not to worry and asks Joshua for his cell phone. From the lock screen of Joshua's cell phone, Benny navigates to a Medical ID screen. When the Medical ID screen is accessed, Joshua's cell phone sends an emergency alert including Joshua's current location and medical insurance information to Just In Time's Emergency Clearinghouse. In response to receiving the emergency alert, Just In Time generates a victim code in the form of a QR code and delivers the victim code to Joshua's cell phone, which displays the QR code on the Medical ID screen. Benny then uses his first responder device (e.g., a cell phone or tablet) to scan the QR code displayed on Joshua's cell phone. In response to scanning the QR code representing Joshua's victim code, Benny's first responder device sends an emergency data request to the Emergency Clearinghouse, which informs Just In Time that Benny is a first responder responding to Joshua's emergency. Then, Just In Time uses Joshua's current location and medical insurance information to find one or more hospitals covered under Joshua's medical insurance (e.g., preferred medical service providers) nearest to Joshua's current location. Just In Time finds only one preferred medical service provider within a five mile radius of Joshua's current location. Just In Time then sends information regarding the preferred medical service provider (e.g., the name and address of the hospital) to both Joshua's cell phone and Benny's first responder device. Benny then tells Joshua that the preferred medical service provider is a mile and a half further away than the hospital nearest to their current location (which is not covered under Joshua's medical insurance) and asks Joshua which one he would like to be taken to. Although Joshua's broken hip is quite painful, it is not life threatening, so Joshua tells Benny that he would like to be taken to the preferred medical service provider that accepts his insurance.

Example 2—Auto ePCR

In many places, when a first responder arrives at the scene of an emergency and provides emergency care to a victim, the first responder is legally required to create an incident report commonly called a patient care report (PCR), which documents details about the victim and the victim's emergency, such as demographic information about the victim, medical information about the victim, the severity of the emergency or the victim's condition, or any other information regarding the victim or the victim's emergency. A patient care report is often created electronically, such as by using an application on first responder's device (e.g., a cell phone or tablet). Such a patient care report is referred to as an electronic patient care report (ePCR). Patient care reports are created and saved by emergency service providers as records that can be used for various purposes, such as providing legal protection to first responders. A patient care report may also be sent to a hospital before they receive a victim to provide the hospital with situational context so that they may be better prepared to provide care to the victim. However, for a first responder, creating and filling out a patient care report often takes critical time away from providing emergency care to a victim.

A month after providing emergency care to Joshua (see Example 1), Benny, a first responder, is dispatched to respond to an emergency in Central Park. While jogging through the park, a woman named Jennifer passed by another woman who had fallen on the jogging path and was unconscious. Jennifer called 9-1-1 on the unconscious woman's behalf. Benny arrives at the scene of the emergency and confirms that the woman that had fallen on the jogging path is still unconscious. Benny would like to begin providing emergency care to the unconscious woman as quickly as possible but knows that he must create and fill out an ePCR on his first responder device first. Benny, knowing about Just In Time's Emergency Clearinghouse, quickly finds the unconscious woman's cell phone in her bag and navigates to a Medical ID screen on the unconscious woman's cell phone. He finds out through the Medical ID screen that the woman's name is Rebecca.

When the Medical ID screen is accessed, Rebecca's cell phone sends an emergency alert to Just In Time's Emergency Clearinghouse. In response to receiving the emergency alert, Just In Time generates a victim code in the form of a QR code and delivers the victim code to Rebecca's cell phone, which displays the QR code on the Medical ID screen. Benny then uses an ePCR application on his first responder device (e.g., a cell phone or tablet) to scan the QR code displayed on Rebecca's cell phone. In response to scanning the QR code representing Rebecca's victim code, Benny's first responder device sends an emergency data request (e.g., through the ePCR application) to the Emergency Clearinghouse, which informs Just In Time that Benny is a first responder responding to Rebecca's emergency. The Emergency Clearinghouse then gathers information associated with Rebecca (e.g., Rebecca's personal information, demographic information, or medical history) and delivers the information to the ePCR application on Benny's first responder device. The ePCR application then uses the information associated with the Rebecca to create and automatically fill out most, if not all, of the fields required by a patient care report for Rebecca in an instant, allowing Benny to waste as little time as possible before providing emergency care to Rebecca. The information that Benny's ePCR application receives from the Emergency Clearinghouse also indicates that Rebecca is acutely allergic to bee stings and carries an EpiPen, which Benny finds in her bag and injects her with, allowing her airways to reopen.

What is claimed is:

1. An emergency communication system comprising:
a) an emergency information database comprising a plurality of datasets associated with a plurality of user identifiers;
b) a server comprising a processor, a network element, and non-transitory computer readable storage medium having instructions that, when executed by the processor, cause the processor to:
  i) receive a communication signal comprising an emergency data request from an emergency responder communication device, wherein the emergency data request comprises a user identifier and an emergency location;
  ii) query the emergency information database to retrieve a dataset associated with the user identifier, wherein the dataset comprises one or more emergency response parameters;
  iii) determine, using the emergency location and the one or more emergency response parameters, one or more medical service providers having one or more provider locations in proximity to the emergency location; and
  iv) transmit a communication signal comprising the one or more provider locations associated with the one or more medical service providers to the emergency responder communication device.

2. The system of claim 1, wherein the emergency location is a device location for a second communication device associated with the user identifier, wherein the processor is caused to receive the device location for the second communication device and determine the one or more medical service providers having one or more provider locations in proximity to the device location.

3. The system of claim 1, wherein the communication signal comprising the one or more provider locations further comprises a map showing the one or more provider locations, the emergency location, and an estimated time to arrival or distance based on the one or more provider locations and the emergency location.

4. The system of claim 3, wherein the emergency location is provided to the communication device as a dispatch location.

5. The system of claim 1, wherein the emergency location is a current location of a second communication device provided to the emergency responder communication device as a dispatch location after the emergency responder communication device scans a victim code presented on a display of the second communication device, wherein the second communication device is associated with the user identifier.

6. The system of claim 1, wherein the data request comprises at least two user identifiers.

7. The system of claim 1, wherein the processor is further caused to transmit the one or more provider locations to the emergency responder communication device within one or more SMS text messages.

8. The system of claim 1, wherein processor is further caused to receive the communication signal comprising the data request as generated by a mobile application or web application on the emergency responder communication device.

9. The system of claim 8, wherein the mobile or web application is an electronic patient care report (ePCR) application.

10. The system of claim 8, wherein the one or more provider locations are provided to the emergency responder communication device for display within a graphical user interface (GUI) of the mobile or web application on the emergency responder communication device.

11. The system of claim 10, wherein the one or more provider locations are provided to the emergency responder communication device for display within an interactive map within the GUI of the mobile or web application.

12. The system of claim 1, wherein the user identifier received from the emergency responder communication device is associated with a victim code presented on a display of a second communication device for scanning by the emergency responder communication device.

13. The system of claim 12, wherein the processor is further caused to provide the victim code for display by the second communication device.

14. The system of claim 13, wherein the victim code is locally stored on the second communication device.

15. The system of claim 13, wherein the processor is further caused to generate the victim code in response to receiving an emergency alert from the second communication device.

16. The system of claim 15, wherein the emergency communications system receives the emergency alert after the emergency alert is generated in response to a user accessing a medical ID screen on the second communication device.

17. The system of claim 12, wherein the victim code is presented on the display of the second communication device in the form of a matrix barcode.

18. The system of claim 1, wherein the one or more medical service providers associated with one or more respective provider locations proximal to the device location is determined by:
   a) retrieving a list of medical service providers and filtering the list of medical service providers using the device location and the one or more emergency parameters associated with the user identifier to identify one or more medical service providers suitable for addressing an emergency; and
   b) calculating a distance from the device location to the provider location for each of the medical service providers on the list of medical service providers that is preferred under medical insurance information associated with the user identifier.

19. A computer-implemented method comprising:
   a) providing an emergency information database comprising a plurality of datasets associated with a plurality of user identifiers;
   b) receiving a communication signal comprising a data request from an emergency responder communication device, wherein the emergency data request comprises a user identifier and an emergency location;
   c) querying the emergency information database to retrieve a dataset associated with the user identifier, wherein the dataset comprises one or more emergency response parameters;
   d) determining, using the emergency location and the one or more emergency response parameters, one or more medical service providers having one or more provider locations in proximity to the emergency location; and
   e) transmitting a communication signal comprising the one or more provider locations associated with the one or more medical service providers to the emergency responder communication device.

20. Non-transitory computer readable storage medium comprising instructions that, when executed by a processor, cause the processor to:
   a) maintain an emergency information database comprising a plurality of datasets associated with a plurality of user identifiers;
   b) receive a communication signal comprising a data request from an emergency responder communication device, wherein the emergency data request comprises a user identifier and an emergency location;
   c) query the emergency information database to retrieve a dataset associated with the user identifier, wherein the dataset comprises one or more emergency response parameters;
   d) determine, using the emergency location and the one or more emergency response parameters, one or more medical service providers having one or more provider locations in proximity to the emergency location; and
   e) transmit a communication signal comprising the one or more provider locations associated with the one or more medical service providers to the emergency responder communication device.

* * * * *